United States Patent
Lee et al.

(10) Patent No.: US 9,569,098 B2
(45) Date of Patent: Feb. 14, 2017

(54) MOBILE TERMINAL AND DISPLAY CONTROLLING METHOD THEREOF

(75) Inventors: Choonjae Lee, Gwangju-si (KR); Hyungtae Jang, Seoul (KR); Jiyoun Lee, Seoul (KR); Minjeong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 13/372,415

(22) Filed: Feb. 13, 2012

(65) Prior Publication Data

US 2013/0021273 A1 Jan. 24, 2013

(30) Foreign Application Priority Data

Jul. 19, 2011 (KR) .................. 10-2011-0071469

(51) Int. Cl.
*G06F 3/041* (2006.01)
*G06F 3/0488* (2013.01)

(52) U.S. Cl.
CPC . G06F 3/04883 (2013.01); *G06F 2203/04101* (2013.01); *G06F 2203/04104* (2013.01)

(58) Field of Classification Search
CPC .... G06F 3/0481; G06F 3/0486; G06F 3/0488; G06F 3/04886; G06F 2203/04104; G06F 2203/04803; G06F 2203/04808; G06F 3/0483; G06F 3/04883
See application file for complete search history.

(56) References Cited

U.S. PATENT DOCUMENTS

| | | | |
|---|---|---|---|
| 8,473,862 B1* | 6/2013 | Davidson | 715/790 |
| 2009/0193351 A1* | 7/2009 | Lee | G06F 3/0482 715/769 |
| 2010/0100841 A1* | 4/2010 | Shin et al. | 715/784 |
| 2010/0302179 A1* | 12/2010 | Ahn et al. | 345/173 |
| 2011/0072344 A1* | 3/2011 | Harris et al. | 715/702 |
| 2011/0134047 A1* | 6/2011 | Wigdor et al. | 345/173 |
| 2011/0191704 A1* | 8/2011 | Hinckley et al. | 715/764 |
| 2011/0197153 A1* | 8/2011 | King et al. | 715/769 |
| 2011/0246918 A1* | 10/2011 | Henderson | 715/769 |
| 2012/0088477 A1* | 4/2012 | Cassidy | G11B 27/102 455/414.1 |

\* cited by examiner

*Primary Examiner* — Kathy Wang-Hurst
*Assistant Examiner* — Peijie Shen
(74) *Attorney, Agent, or Firm* — Lee, Hong, Degerman, Kang & Waimey PC

(57) ABSTRACT

A mobile terminal and display controlling method thereof are disclosed. The present invention includes receiving an input of a $1^{st}$ touch action on a prescribed point on a screen, receiving an input of a $2^{nd}$ touch action to select a specific object from a plurality of objects displayed on the screen while a touch by the $1^{st}$ touch action is maintained, and displaying the specific object selected by the $2^{nd}$ touch action with reference to an input point of the $1^{st}$ touch action while the touch by the $1^{st}$ touch action is maintained.

12 Claims, 74 Drawing Sheets

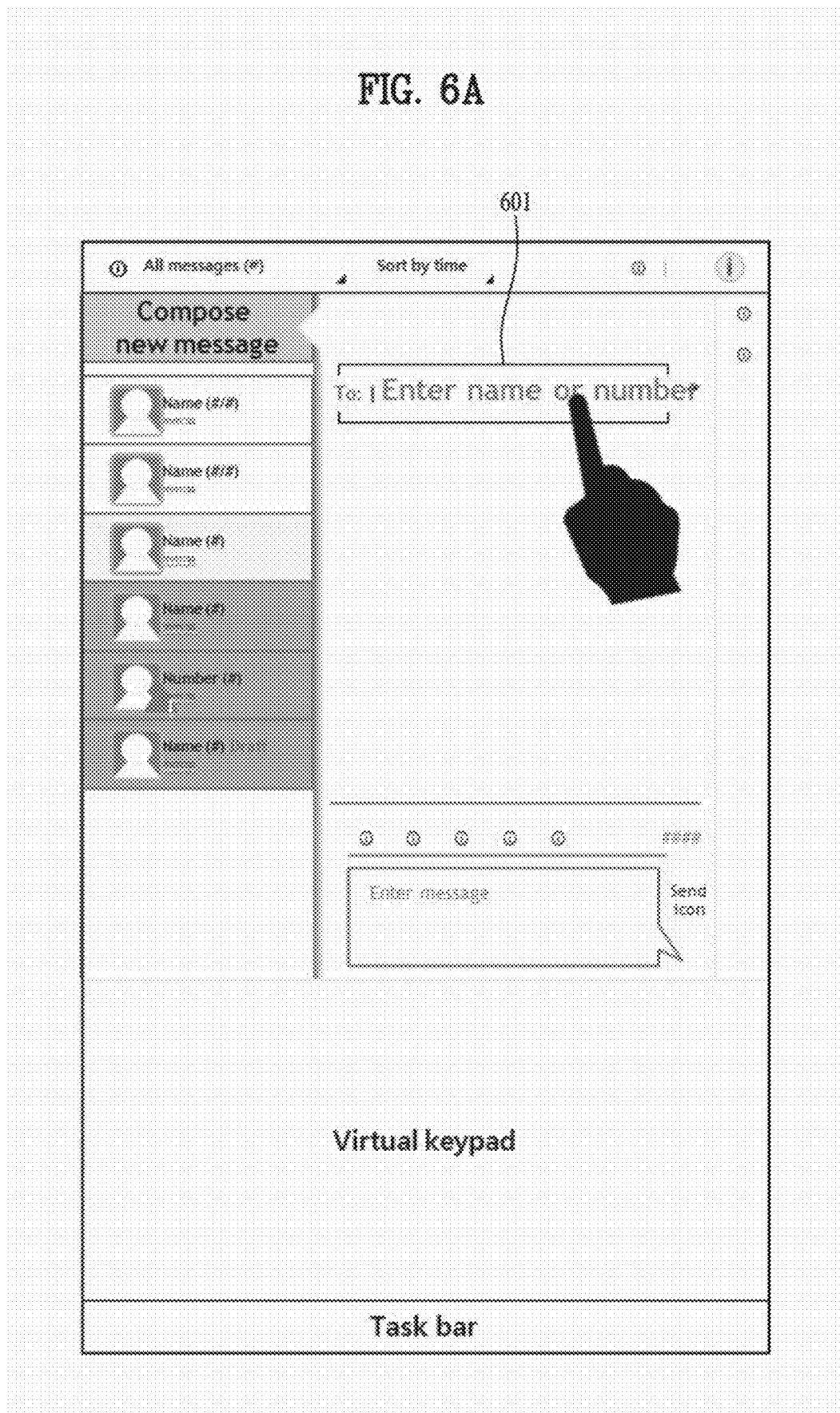

FIG. 9C

| Additional play list |
|---|
| 1st audio file |
| 2nd audio file |
| 4th audio file |
| All |

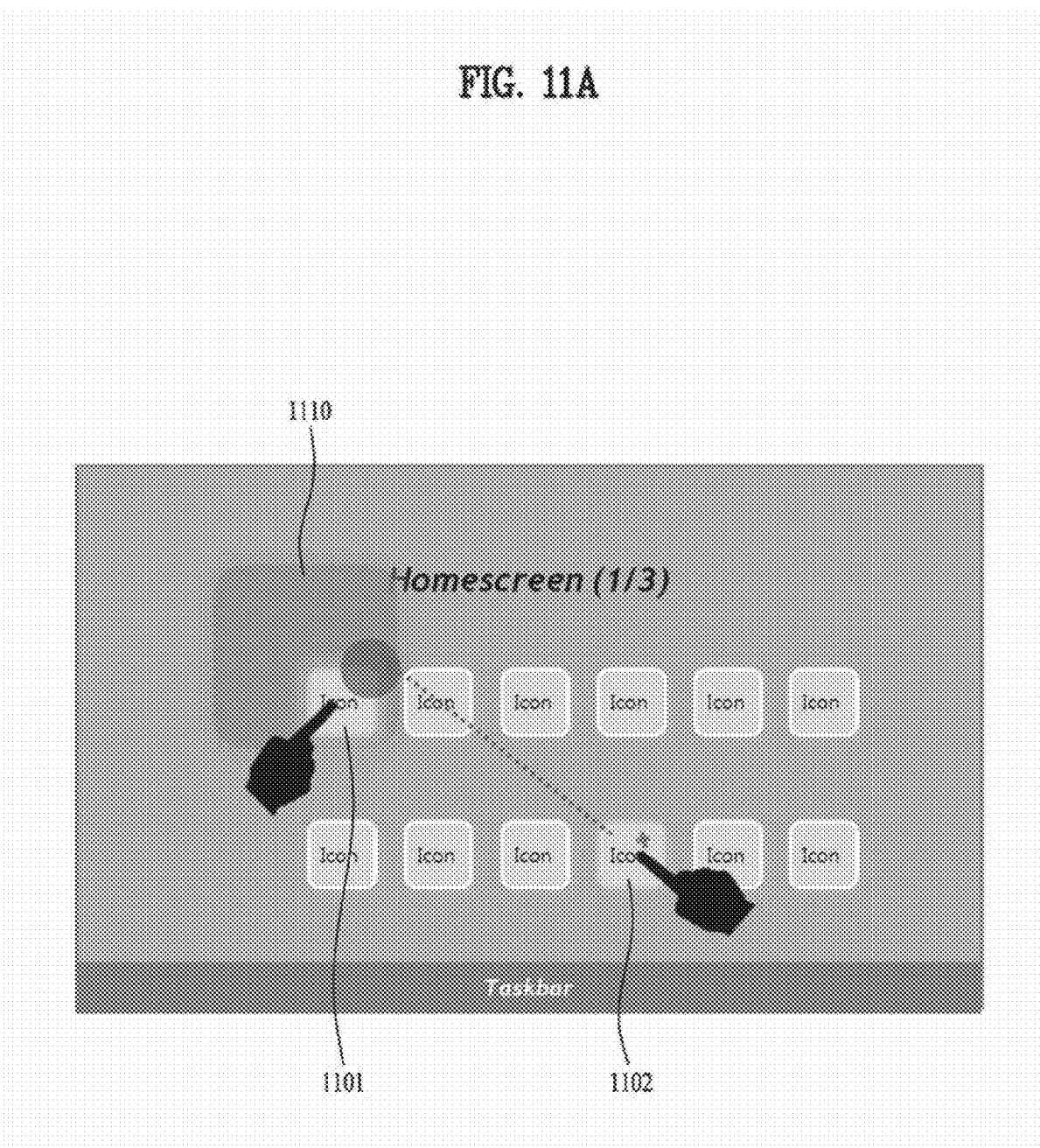

(a)

(b)

(a)

(b)

(a)

(b)

(a)

(b)

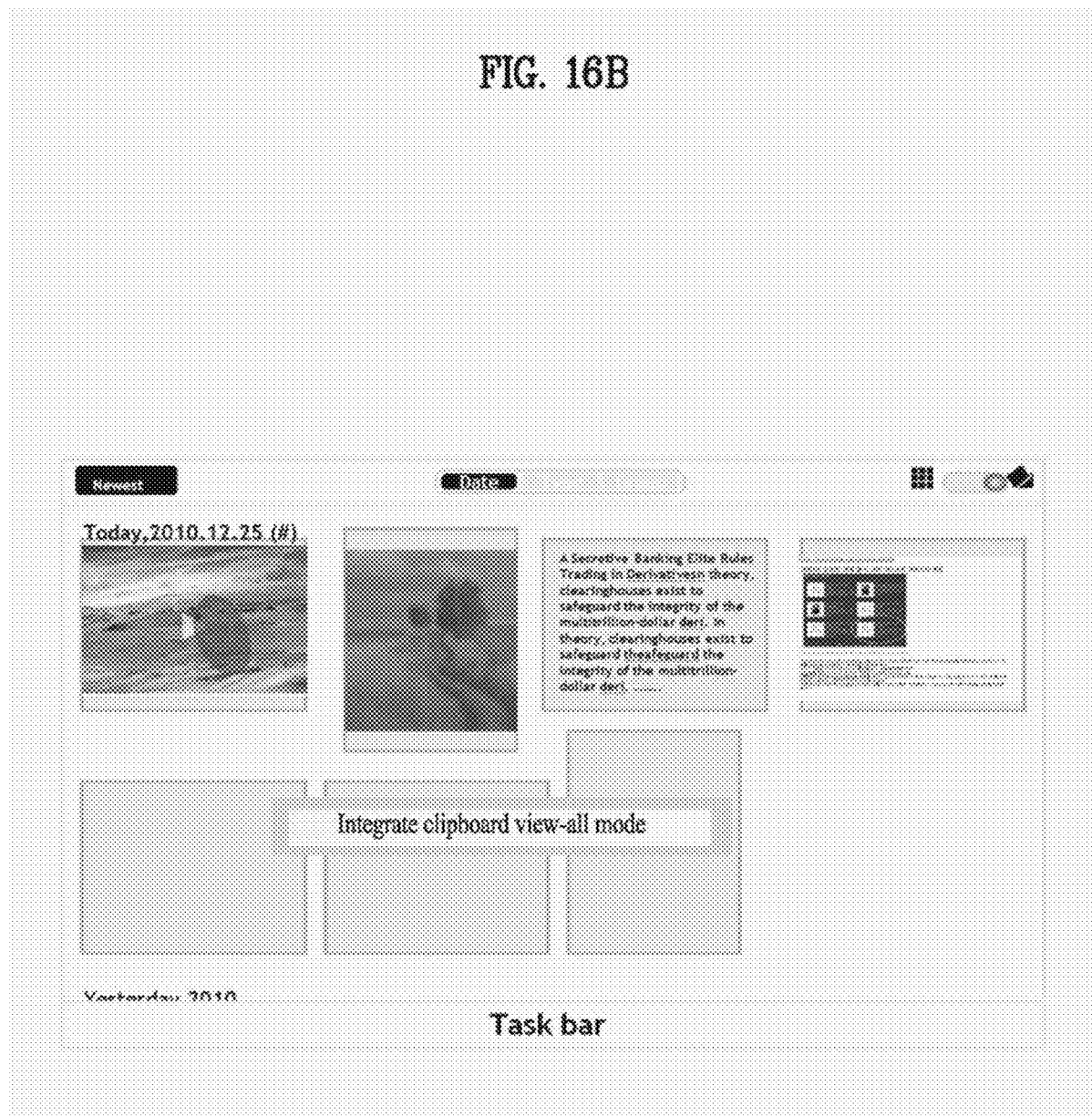

(a)

(b)

2020   (a)

(b)   2001  2002  2003

(a)

(b)

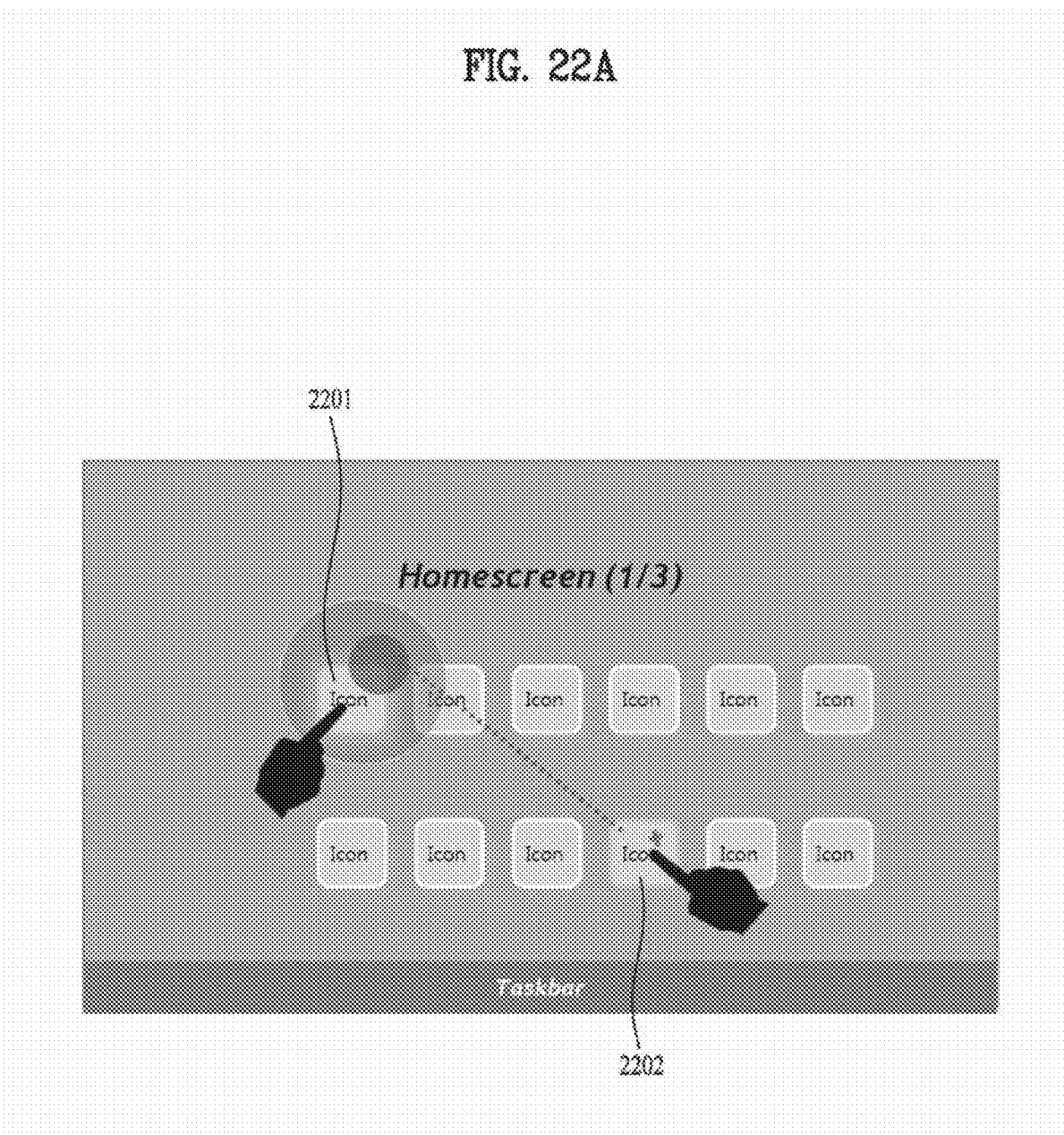

(a)

(b)

(a)

(b)

(a)

(b)

(a)

(b)

(a)

(b)

MOBILE TERMINAL AND DISPLAY CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0071469, filed on Jul. 19, 2011, the contents of which are hereby incorporated by reference herein in its entirety.

BACKGROUND OF THE INVENTION

Field of the Invention

The present invention relates to a mobile terminal, and more particularly, to a mobile terminal and display controlling method thereof. Although the present invention is suitable for a wide scope of applications, it is particularly suitable for receiving a multi-touch via a touchscreen.

Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, a mobile terminal can receive a multi-touch using a touchscreen provided to a mobile terminal.

However, the related art fails in providing a method of controlling an operation of a mobile terminal in various ways in case of receiving an input of one of multiple touches by maintaining another one of the multiple touches.

SUMMARY OF THE INVENTION

Accordingly, the present invention is directed to a mobile terminal and display controlling method thereof that substantially obviate one or more problems due to limitations and disadvantages of the related art.

An object of the present invention is to provide a mobile terminal and display controlling method thereof, by which a terminal operation corresponding to a $2^{nd}$ touch action may be controlled in case of receiving an input of the $2^{nd}$ touch action by maintaining a $1^{st}$ touch action.

Another object of the present invention is to provide a mobile terminal and display controlling method thereof, by which a specific object selected by a $2^{nd}$ touch action may be displayed on a specific region created by a $1^{st}$ touch action in case of receiving an input of the $2^{nd}$ touch action by maintaining the $1^{st}$ touch action.

Another object of the present invention is to provide a mobile terminal and display controlling method thereof, by which a specific object selected by a $2^{nd}$ touch action may be displayed with reference to an input point of a $1^{st}$ touch action in case of receiving an input of the $2^{nd}$ touch action by maintaining the $1^{st}$ touch action.

A further object of the present invention is to provide a mobile terminal and display controlling method thereof, by which a specific function may be performed using a specific object selected by a $2^{nd}$ touch action, if an input point of a $1^{st}$ touch action belongs to a command region of the specific function, in case of receiving an input of the $2^{nd}$ touch action by maintaining the $1^{st}$ touch action.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to receive an input of a $1^{st}$ touch action on a prescribed point on a screen, and to receive an input of a $2^{nd}$ touch action to select a specific object from a plurality of objects displayed on the screen while a touch by the $1^{st}$ touch action is maintained, a controller configured to create a specific region on the screen according to the $1^{st}$ touch action, and to control the touchscreen to display the specific object selected by the $2^{nd}$ touch action on the specific region, while the touch by the $1^{st}$ touch action is maintained.

In another aspect of the present invention, a mobile terminal includes a touchscreen configured to receive an input of a $1^{st}$ touch action on a prescribed point on a screen, and to receive an input of a $2^{nd}$ touch action to select a specific object from a plurality of objects displayed on the screen while a touch by the $1^{st}$ touch action is maintained, and a controller configured to control the touchscreen to display the specific object selected by the $2^{nd}$ touch action with reference to an input point of the $1^{st}$ touch action while the touch by the $1^{st}$ touch action is maintained.

In another aspect of the present invention, a method of controlling a display in a mobile terminal includes the steps of receiving an input of a $1^{st}$ touch action on a prescribed point on a screen, receiving an input of a $2^{nd}$ touch action to select a specific object from a plurality of objects displayed on the screen while a touch by the $1^{st}$ touch action is maintained, and displaying the specific object selected by the $2^{nd}$ touch action with reference to an input point of the $1^{st}$ touch action while the touch by the $1^{st}$ touch action is maintained.

In a further aspect of the present invention, a method of controlling a display in a mobile terminal includes the steps of receiving an input of a $1^{st}$ touch action on a prescribed point on a screen, receiving an input of a $2^{nd}$ touch action to select a specific object from a plurality of objects displayed on the screen while a touch by the $1^{st}$ touch action is maintained, and displaying the specific object selected by the $2^{nd}$ touch action with reference to an input point of the $1^{st}$ touch action while the touch by the $1^{st}$ touch action is maintained.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 6A to 6C are diagrams for selecting and displaying a specific reception counterpart on a specific region, while a message application is activated, according to the present invention;

FIGS. 9A to 9C are diagrams for selecting and displaying a specific audio file on a specific region, while an audio play application is activated, according to the present invention;

FIGS. 11A to 11D are diagrams for selecting and displaying an application indicator on a specific region according to the present invention;

FIG. 16A and FIG. 16B are diagrams for displaying an integrated region according to the present invention;

FIGS. 22A to 22D are diagrams for displaying a specific application indicator selected with reference to an input point of a $1^{st}$ touch action in the course of editing application indicators according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
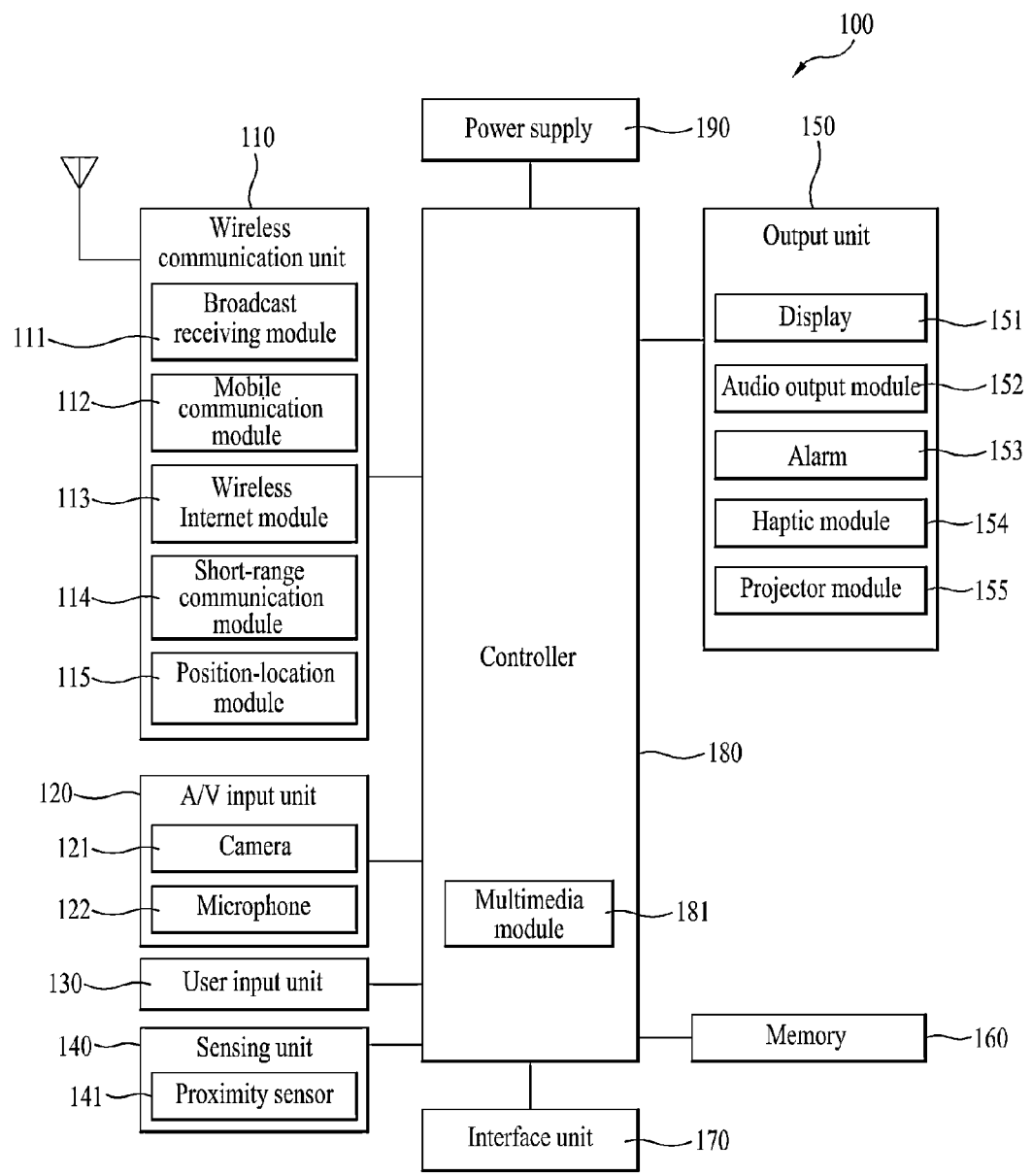
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
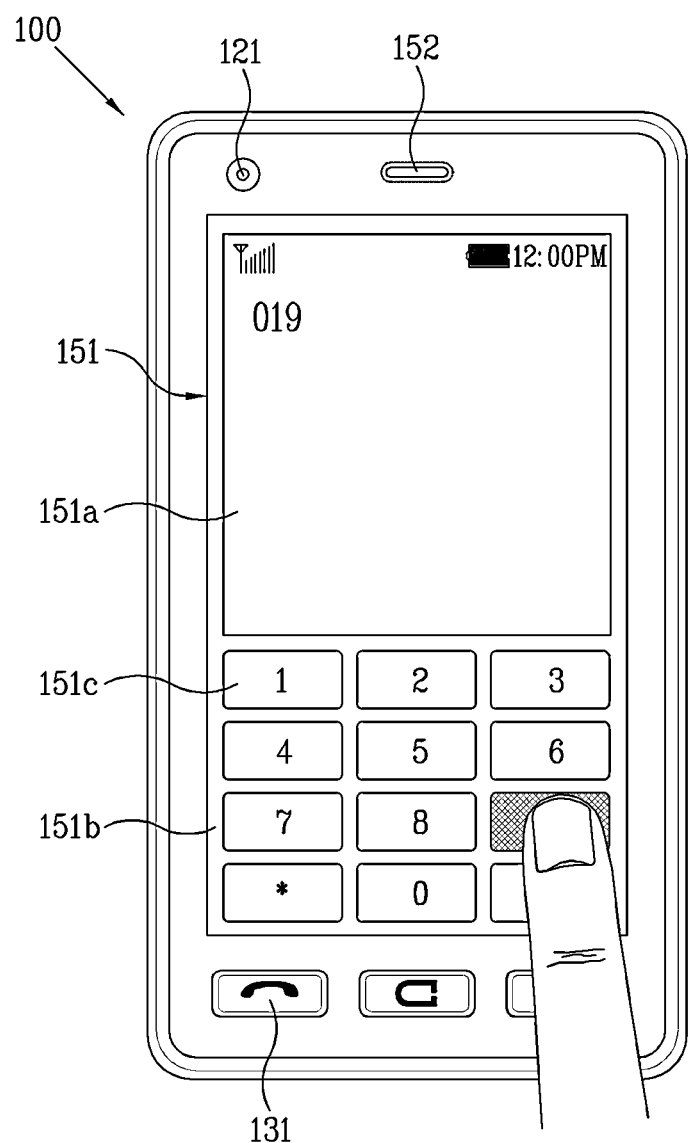
FIG. 2A and FIG. 2B are front diagrams of a mobile terminal according to one embodiment of the present invention for explaining one operational status of the mobile terminal, respectively.
Figure 2B:
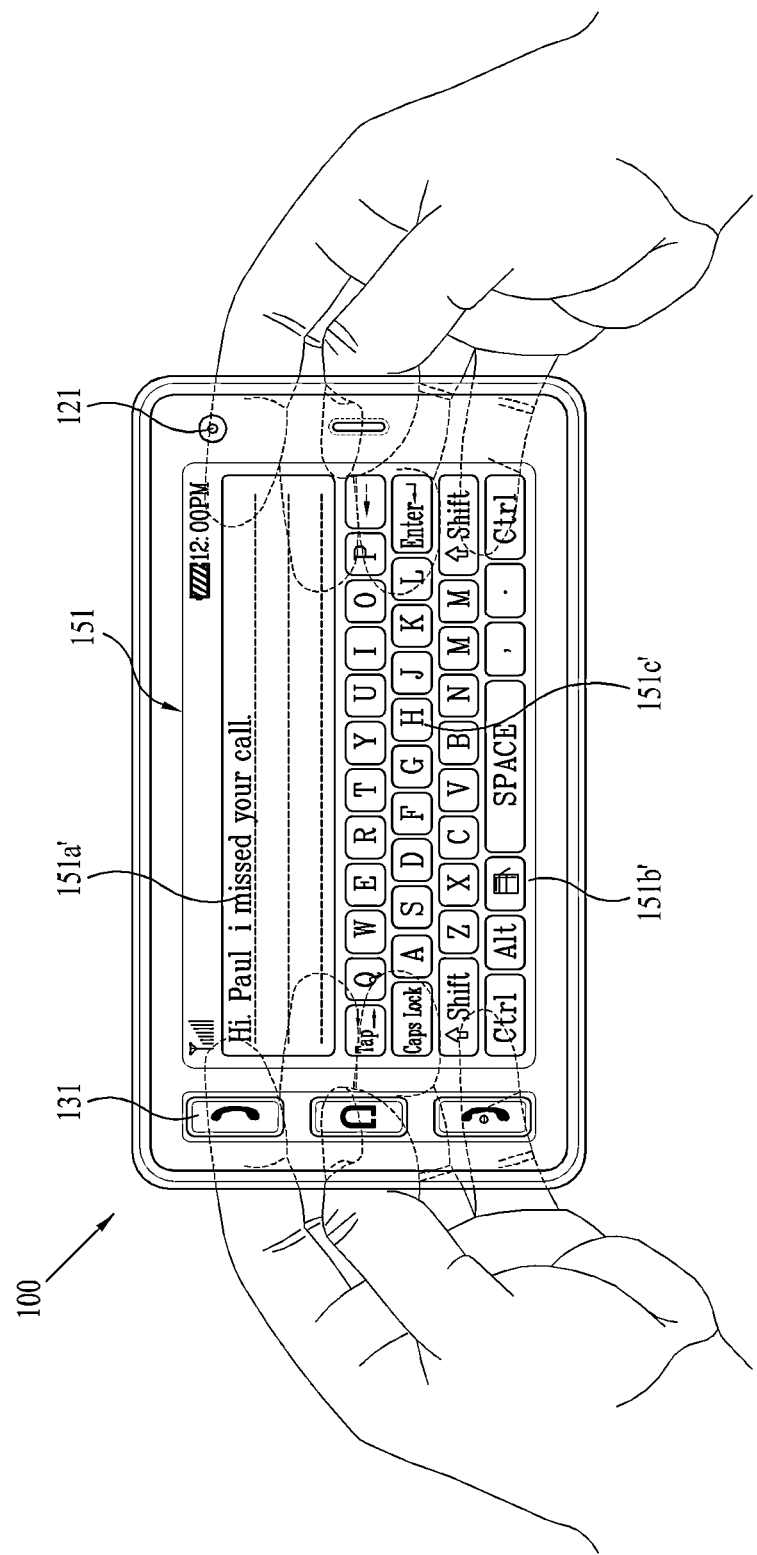

FIG. 2A and FIG. 2B are front-view diagrams of a terminal according to one embodiment of the present invention for explaining an operational state thereof.

First of all, various kinds of visual informations can be displayed on the display unit 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 2A shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

FIG. 2B shows that a touch applied to a soft key is inputted through a rear face of a terminal body. If FIG. 2A shows a case that the terminal body is vertically arranged (portrait), FIG. 2B shows a case that the terminal body is horizontally arranged (landscape). And, the display unit 151 can be configured to change an output picture according to the arranged direction of the terminal body.

FIG. 2B shows that a text input mode is activated in the terminal.

An output window 151a' and an input window 151b' are displayed on the display unit 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad, the characters, symbols and digits corresponding to the touched soft keys are outputted to the output window 151a'. Thus, the touch input via the touchpad is advantageous in that the soft keys 151c' can be prevented from being blocked by a finger in case of touch, which is compared to the touch input via the display unit 151. In case that the display unit 151 and the touchpad are configured transparent, it is able to visually check fingers located at the backside of the terminal body. Hence, more correct touch inputs are possible.

Besides, the display unit 151 or the touchpad can be configured to receive a touch input by scroll. A user scrolls the display unit 151 or the touchpad to shift a cursor or pointer located at an entity (e.g., icon or the like) displayed on the display unit 151. Furthermore, in case that a finger is shifted on the display unit 151 or the touchpad, a path of the shifted finger can be visually displayed on the display unit 151. This may be useful in editing an image displayed on the display unit 151.

To cope with a case that both of the display unit (touchscreen) 151 and the touchpad are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad.

The mobile terminal mentioned in this specification may include at least one of the former components shown in FIG. 1. In particular, the mobile terminal may include a touchscreen as a display unit. In the following description, the touchscreen may be indicated by the same reference number of the display unit.

According to the present invention, the mobile terminal 100 may receive an input of a $2^{nd}$ touch action for selecting a specific object while a touch by a $1^{st}$ touch action is maintained. The mobile terminal 100 may display the specific object selected by the $2^{nd}$ touch action on a specific region created to correspond to the $1^{st}$ touch action or may display the selected specific object with reference to an input point of the $1^{st}$ touch action.

In the following description, a method of controlling a display in a mobile terminal to correspond to an input of a $1^{st}$ touch action and an input of a $2^{nd}$ touch action according to the present invention may be explained in detail with reference to the accompanying drawings.

First of all, a method of displaying a specific object selected by a $2^{nd}$ touch action on a specific region created to correspond to a $1^{st}$ touch action according to a $1^{st}$ embodiment of the present invention is described as follows.

Figure 3:
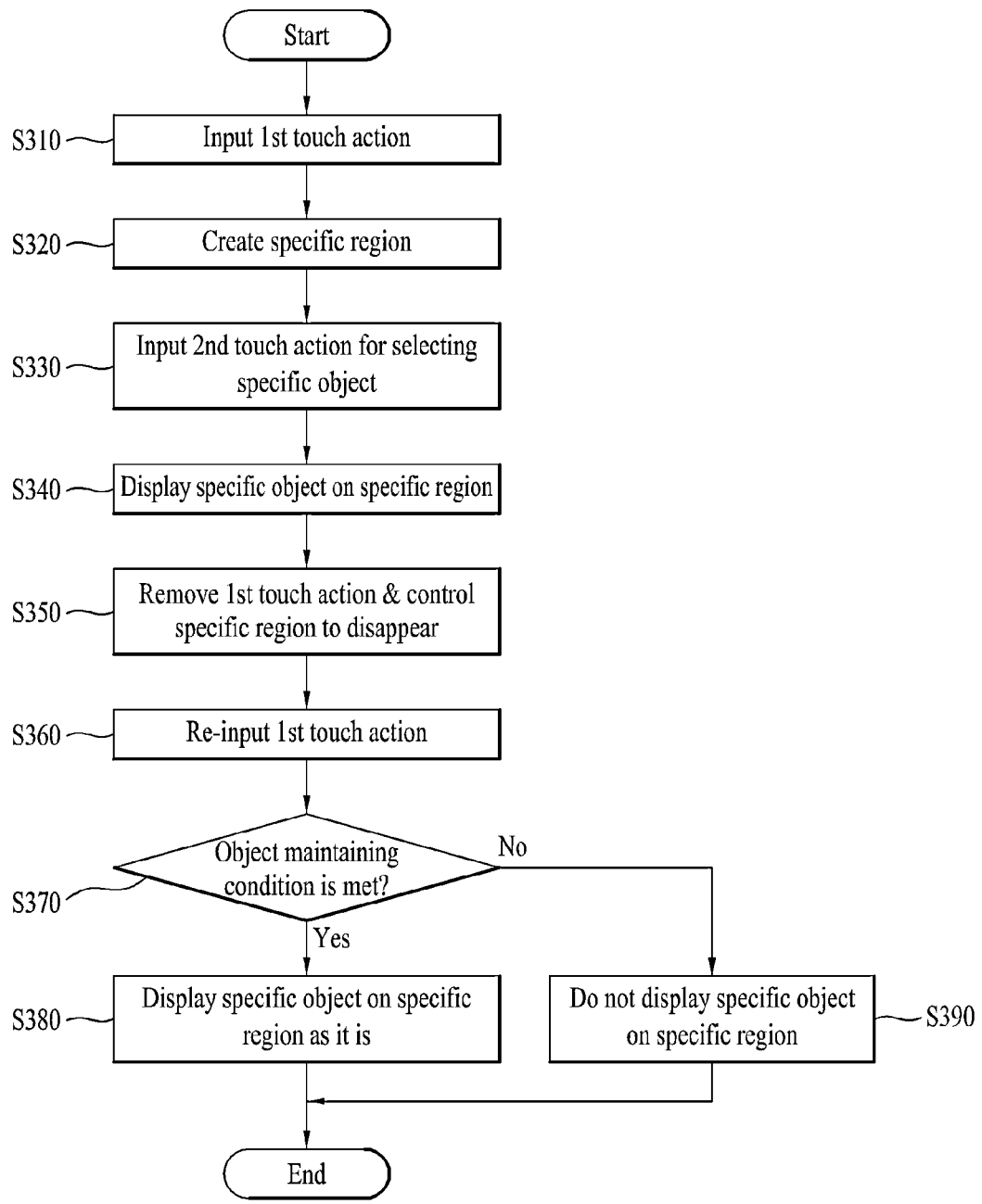
FIG. 3 is a $1^{st}$ flowchart for a method of controlling a display in a mobile terminal according to one embodiment of the present invention.

FIG. 3 is a $1^{st}$ flowchart for a method of controlling a display in a mobile terminal according to one embodiment of the present invention.

Referring to FIG. 3A, the mobile terminal 100 may receive an input of a $1^{st}$ touch action on a prescribed point on a screen using the touchscreen 151 [S310].

In this case, the $1^{st}$ touch action may mean a touch action for commanding a creation of a specific region to display a specific object selected from a plurality of objects displayed on the screen.

For instance, the $1^{st}$ touch action may include one of a touch to a key zone or a specific point corresponding to a specific region creation command, a touch to a random point on the screen for predetermined duration, a predetermined number of touches to a random point on the screen. In this case, the predetermined duration may mean a touch time corresponding to the specific region creation command and the predetermined number may mean a touch count corresponding to the specific region creation command. Moreover, the $1^{st}$ touch action may include one of a touch & drag action in a predetermined direction and a flicking action in a predetermined direction. In particular, in case of the touch & drag action, a predetermined drag distance may be required, a touch start point may be specified as a specific point, or the touch start point may be requested to belong to a specific region.

In more particular, the $1^{st}$ touch action may include a touch & drag action starting with a point in the vicinity of a bezel of the touchscreen 151 toward an inside of the screen. Alternatively, the $1^{st}$ touch action may include a touch & drag action starting with a point in the vicinity of a bezel of the touchscreen 151 in a horizontal direction irrespective of a current viewing direction (e.g., a landscape view, a portrait view).

The above-mentioned examples are just exemplary. And, no limitation is put on a type of the $1^{st}$ touch action that matches a specific region creation command.

Subsequently, the mobile terminal 100 may create a specific region to correspond to the $1^{st}$ touch action [S320].

In this case, the specific region may include a region for displaying a specific object selected from a plurality of objects displayed on the screen. And, the specific object displayed on the specific region may be temporarily stored in the memory 160. For instance, the specific region may be named a clipboard region.

In case of receiving an input of the 1$^{st}$ touch action in the creating step S320, the mobile terminal 100 may create the specific region to have a previously specified size and location. In this case, the size and location of the specific region may be arbitrarily determined by the controller 180 or may be determined in accordance with a user selection.

In the creating step S320, if the 1$^{st}$ touch action includes a touch & drag action, the mobile terminal 100 may create the specific region to have a size matching a touch & drag distance or a touch & drag speed.

Assuming that the 1$^{st}$ touch action includes a touch & drag action in the creating step S320, if a touch & drag direction is a horizontal direction toward an inside of the screen from a vertical side of the bezel, the mobile terminal 100 may create a specific region in a manner that a vertical side of the specific region is in the vicinity of the vertical side of the bezel. Alternatively, if a touch & drag direction is a vertical direction toward an inside of the screen from a horizontal side of the bezel, the mobile terminal 100 may create a specific region in a manner that a horizontal side of the specific region lies in the vicinity of the horizontal side of the bezel.

In the creating step S320, if the 1$^{st}$ touch action includes a touch to a specific point on the screen, the mobile terminal 100 may create a specific region at the specific point. In particular, the mobile terminal 100 may be able to determine a size of the specific region in proportion to a touch duration or a touch count.

Of course, if the 1$^{st}$ touch action is removed, the controller 180 may control the created specific region to disappear from the screen. So to speak, in order to maintain the created specific region, the touch by the 1$^{st}$ touch action may need to be continuously maintained.

In the creating step S320, the controller 180 may create a specific region as a popup window, may create a specific region by overlaying, may create a specific region as a transparent screen against a main screen, or may create a specific region on a prescribed partitioned screen by screen partition. The above examples are just exemplary and no limitation is put on a specific region creating method.

In the creating step S320, the controller 180 may identifiably create a specific region to correspond to at least one of an application, a function, a web browser, a term and a user specification. Moreover, even if a specific region is identifiably created with reference to the above-mentioned reference, the controller 180 may be able to create a specific region (hereinafter named an integrated region) in common irrespective of a current terminal status (e.g., a specific application activation, a specific function activation, a specific web browser activation, etc.).

For instance, since the controller 180 may create a common region per application, function or web browser, if a 1$^{st}$ application is currently activated, the controller 180 may create a specific region corresponding to the 1$^{st}$ application. Alternatively, if a 1$^{st}$ function is currently activated, the controller 180 may create a specific region corresponding to the 1$^{st}$ function. Alternatively, if a 1$^{st}$ web browser is currently activated, the controller 180 may create a specific region corresponding to the 1$^{st}$ web browser. Since the controller 180 identifiably creates the common region per term (e.g., day, week, user-specific term, etc.), the controller 180 may create a specific region corresponding to a term selected by a user or a term to which a current hour belongs. If a user specifies or designates a specific region (e.g., a user-favorite specific region, a specific region arbitrarily sorted by a user, etc.), the controller 180 may create the specific region specified by the user.

The specific region creation may be described in detail with reference to FIG. 4A and FIG. 4B as follows.

Figure 4A:
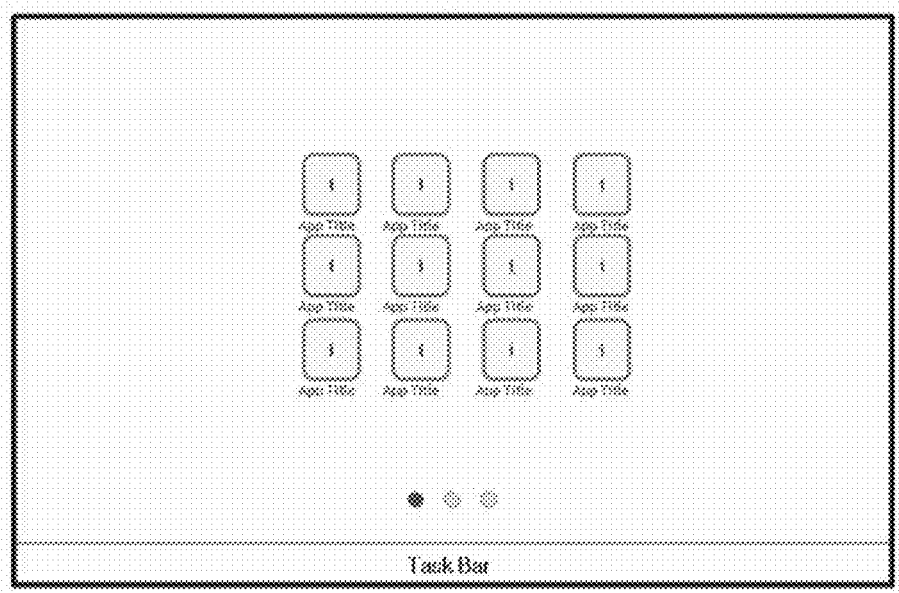
FIG. 4A and FIG. 4B are diagrams of screen configuration for creating a specific region to correspond to a $1^{st}$ touch action according to the present invention.
Figure 4B:
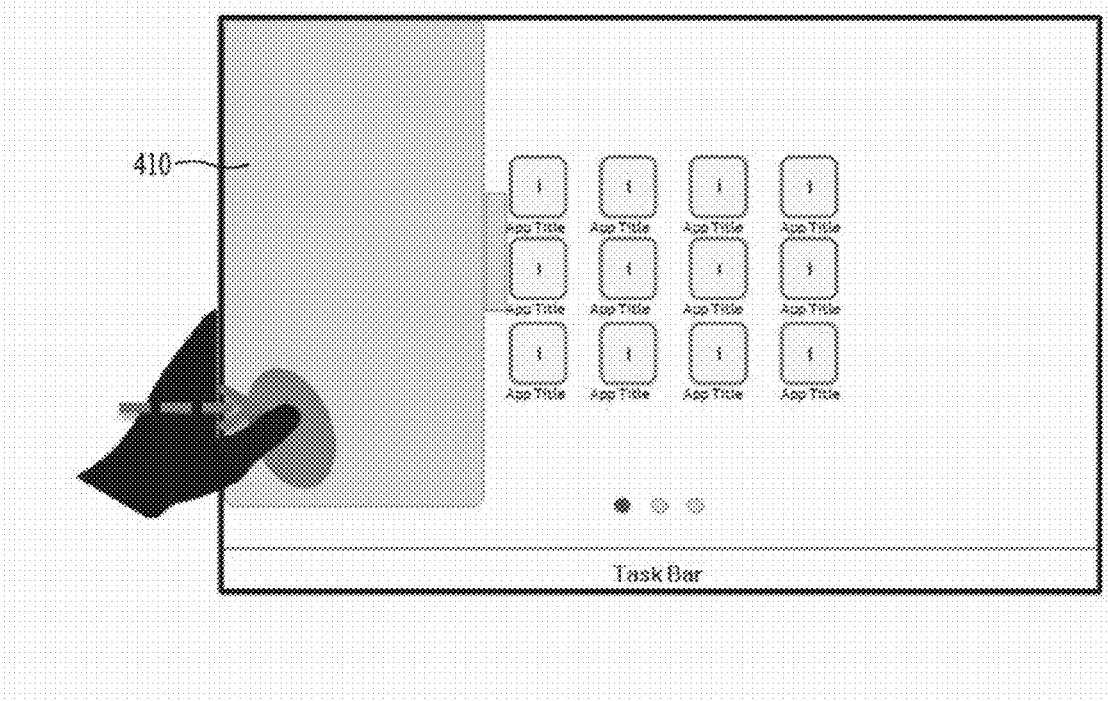

FIG. 4A and FIG. 4B are diagrams of screen configuration for creating a specific region to correspond to a 1$^{st}$ touch action according to the present invention.

Referring to FIG. 4A and FIG. 4B, while a plurality of objects are displayed, if a user inputs a touch & drag action (i.e., example of 1$^{st}$ touch action) starting with a point in the vicinity of a left bezel in a horizontal direction toward a screen inside, the mobile terminal 100 may create a specific region 410 having a vertical side lie in the vicinity of the left bezel.

If the specific region 410 is a clipboard region, the user may select a specific object to temporarily save from a plurality of the objects displayed on the screen. The selected specific object may be then displayed on the specific region 410. This shall be described in detail later.

Referring now to FIG. 3, while the touch by the 1$^{st}$ touch action is maintained, the mobile terminal 100 may receive an input of a 2$^{nd}$ touch action to select a specific one of a plurality of the objects displayed on the screen using the touchscreen 151 [S330].

For instance, the 2$^{nd}$ touch action may include one of a touch to a specific object (cf. a predetermined touch duration or a predetermined touch count may be requested if necessary.), a flicking action on a specific object, a touch & drag action starting with a prescribed point of a specific object to a prescribed point of a specific region, and the like.

Of course, since the above examples are just exemplary, no limitation is put on a type of the 2$^{nd}$ touch action if a function of selecting a specific object is executable. Moreover, at least one or more specific objects may be selectable.

When a plurality of pages are configured, the mobile terminal 100 may shift a current page to a specific page to correspond to a page turning touch action inputted by a user. The mobile terminal 100 may then receive an input of a 2$^{nd}$ touch action for selecting a specific one of a plurality of objects contained in a current page.

While the touch by the 1$^{st}$ touch action is maintained, the mobile terminal 100 may display the specific object selected by the 2$^{nd}$ touch action on the created specific region under the control of the controller 180 [S340].

When the specific object is displayed, the controller 180 may copy the specific object [Copy] and may display the copied specific object on the specific region [Keep displaying the specific object among a plurality of the objects]. Moreover, the controller 180 may shift the specific object [Cut] and may display the shifted specific object on the specific region [Stop displaying the specific object among a plurality of the objects].

In particular, when the specific object is displayed on the specific region, a display type of the specific object may be different from that of the rest of the objects. For instance, at least one of a size, a color, a display information and the like of the specific object may be differentiated.

The display of the specific object in the specific region may be described in detail with reference to the accompanying drawings as follows.

Figure 5A:
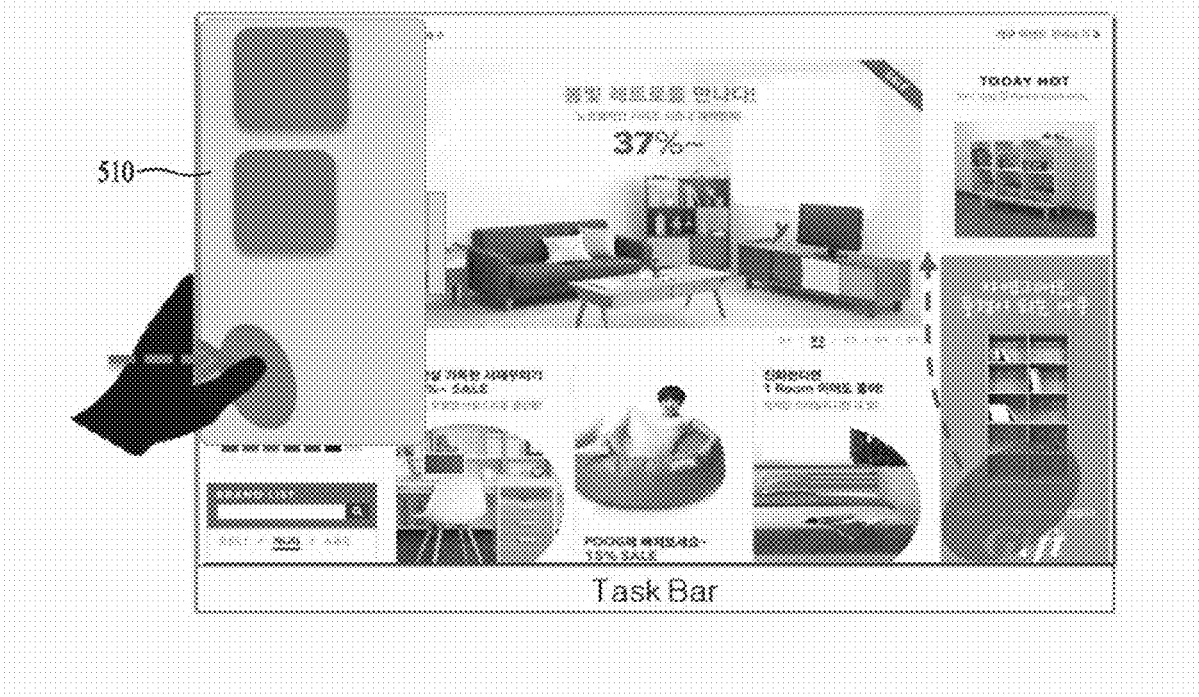
FIGS. 5A to 5C are diagrams for selecting and displaying a specific image on a specific region, while a web application is activated, according to the present invention.
Figure 5B:
Figure 5C:
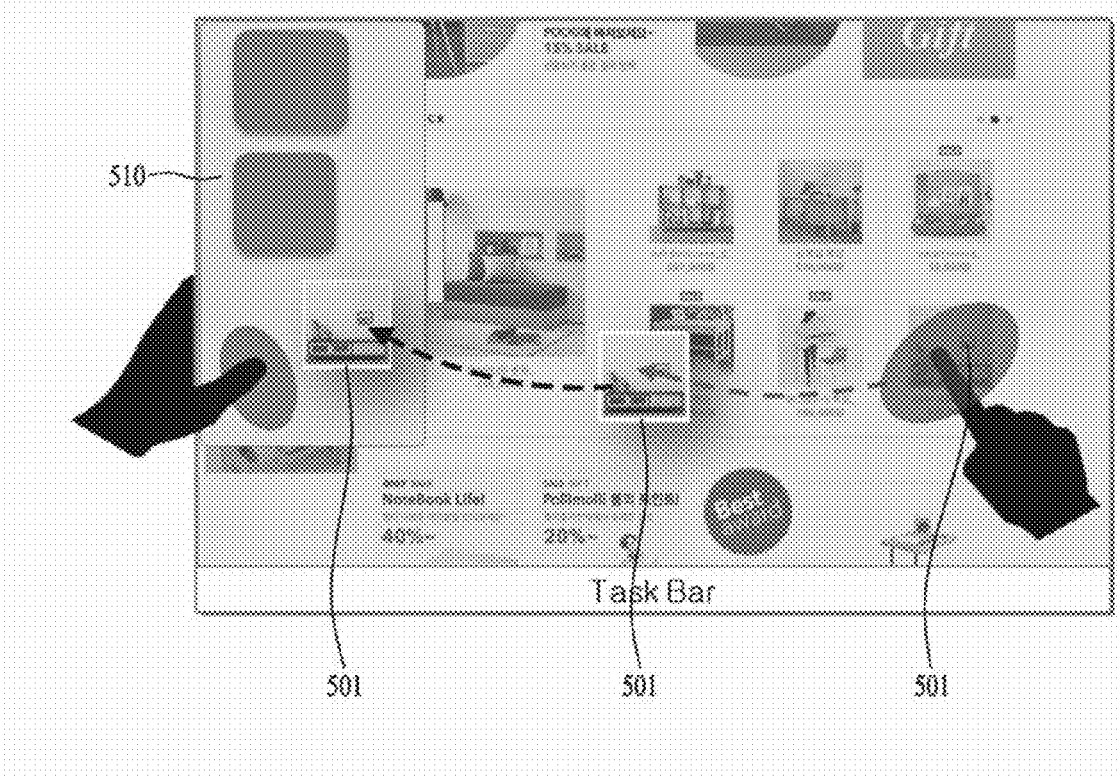

FIGS. 5A to 5C are diagrams for selecting and displaying a specific image on a specific region, while a web application is activated, according to the present invention.

Referring to FIG. 5A, while a webpage containing a plurality of images (i.e., example of objects) in accordance with web application activation, if a user inputs a touch & drag action (e.g., example of $1^{st}$ touch action) starting with a bezel in a horizontal direction toward a screen inside, the mobile terminal 100 may create a specific region 510.

Referring to FIG. 5A and FIG. 5B, while the touch by the $1^{st}$ touch action is maintained, if a touch action for performing a webpage turning operation or a webpage scroll operation is inputted, the mobile terminal 100 may perform the webpage turning operation or the webpage scroll operation.

Referring to FIG. 5C, in case of receiving an input of a touch & drag action (i.e., example of $2^{nd}$ touch action) starting with a specific image 501 among a plurality of the images displayed on the webpage to the specific region 510, the mobile terminal 100 may display the specific image 501 on the specific region 510.

Figure 6B:
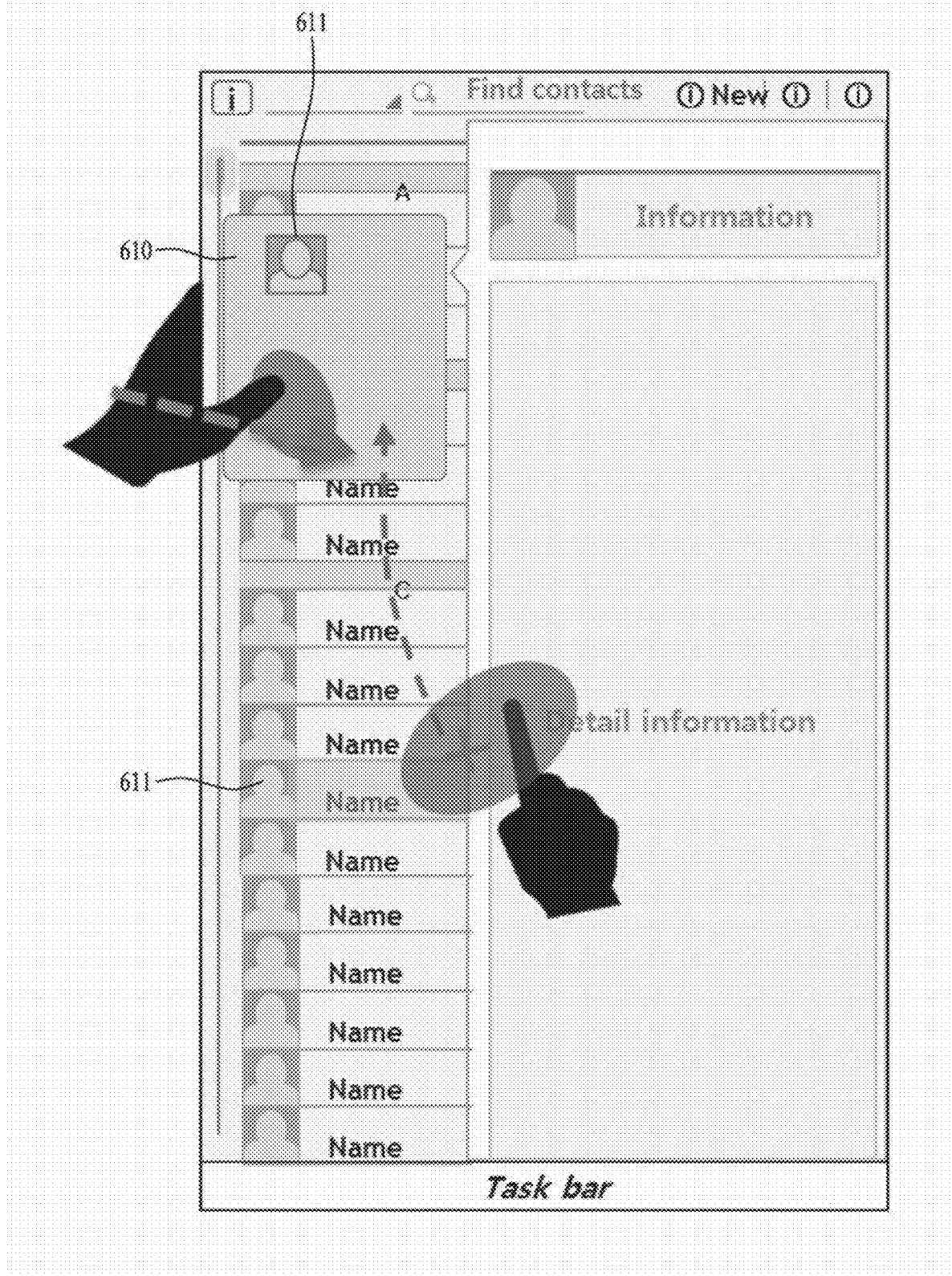
Figure 6C:
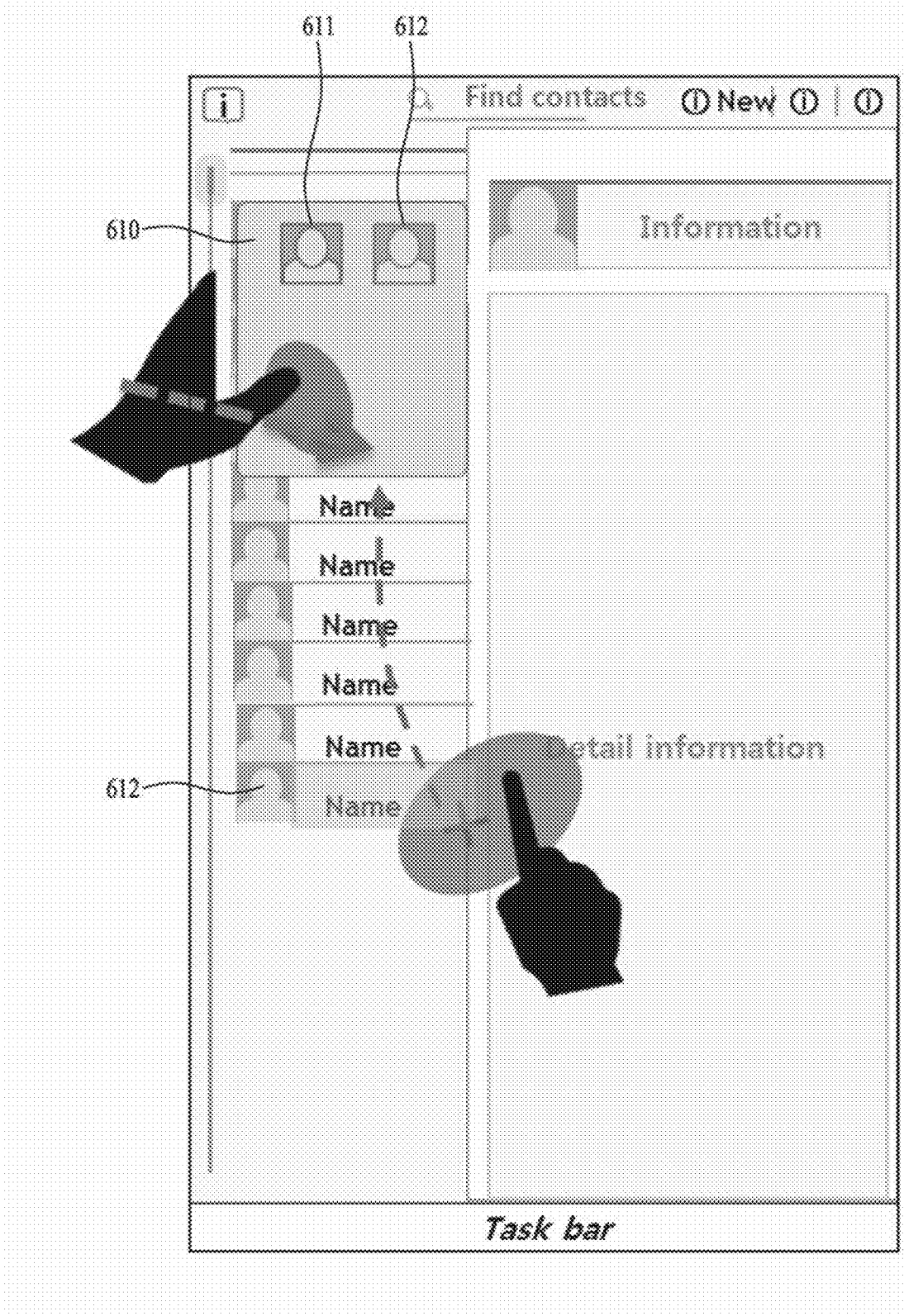

FIGS. 6A to 6C are diagrams for selecting and displaying a specific reception counterpart on a specific region, while a message application is activated, according to the present invention.

Referring to FIG. 6A, while a message write window is displayed in accordance with message application activation, in case of receiving an input of a touch action on a reception counterpart region 601 contained in the message write window, the mobile terminal 100 may display a counterpart list containing counterparts settable as reception counterpart(s) of a currently written message on the screen.

Referring to FIG. 6B, if a touch (i.e., example of $1^{st}$ touch action) for predetermined duration is inputted to a random point on the screen, the mobile terminal 100 may create a specific region 610. Alternatively, the specific region 610 may be created at the touch-inputted random point. Optionally, if a touch point is changed, a location of the specific region 610 may be changed to correspond to the changed touch point. Optionally, a region for displaying the counterpart list may be changed not to be blocked by the specific region 610.

Referring to FIG. 6B and FIG. 6C, while the touch to the random point is maintained (e.g., the touch is not removed despite that the touch point is changed.), in case of receiving an input of a touch & drag action (i.e., example of $2^{nd}$ touch action) starting with a $1^{st}$ counterpart 611 among the counterparts (i.e., corresponding to a plurality of objects) contained in the counterpart list to the specific region 610 and an input of a touch & drag action (i.e., example of $2^{nd}$ touch action) starting with a $2^{nd}$ counterpart 612 among the counterparts (i.e., corresponding to a plurality of objects) contained in the counterpart list to the specific region 610, the mobile terminal 100 may display the $1^{st}$ counterpart 611 and the $2^{nd}$ counterpart 612 on the specific region 610. Hence, the $1^{st}$ and $2^{nd}$ counterparts 611 and 612 displayed on the specific region 610 may be designated as the reception counterparts of the currently written message.

After the $1^{st}$ counterpart 611 or the $2^{nd}$ counterpart 612 has been selected, detail information on the $1^{st}$ or $2^{nd}$ counterpart 611 or 612 may be displayed before inputting a touch & drag action or in the course of the touch & drag action.

Besides, the above-described embodiment may be applicable to reception counterpart designation in case of writing an email or chat counterpart designation in case of a chat by IMS.

Figure 7A:
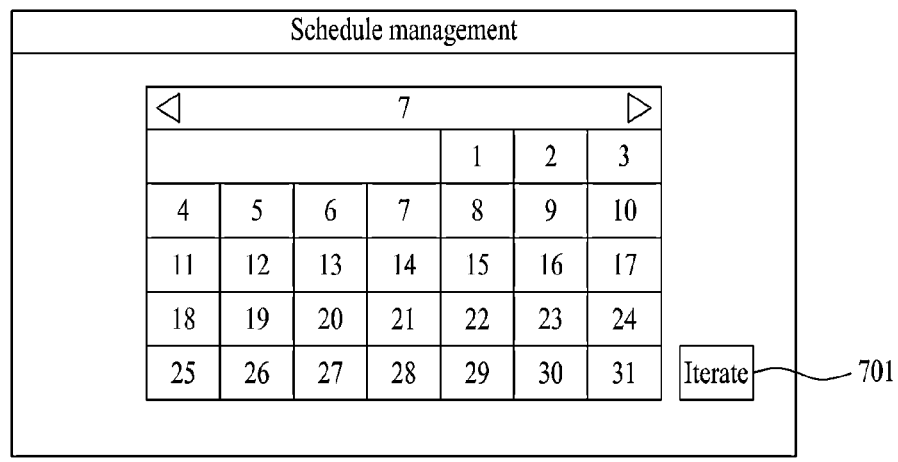
FIGS. 7A to 7C are diagrams for selecting and displaying a specific date on a specific region, while a schedule management application is activated, according to the present invention.
Figure 7B:
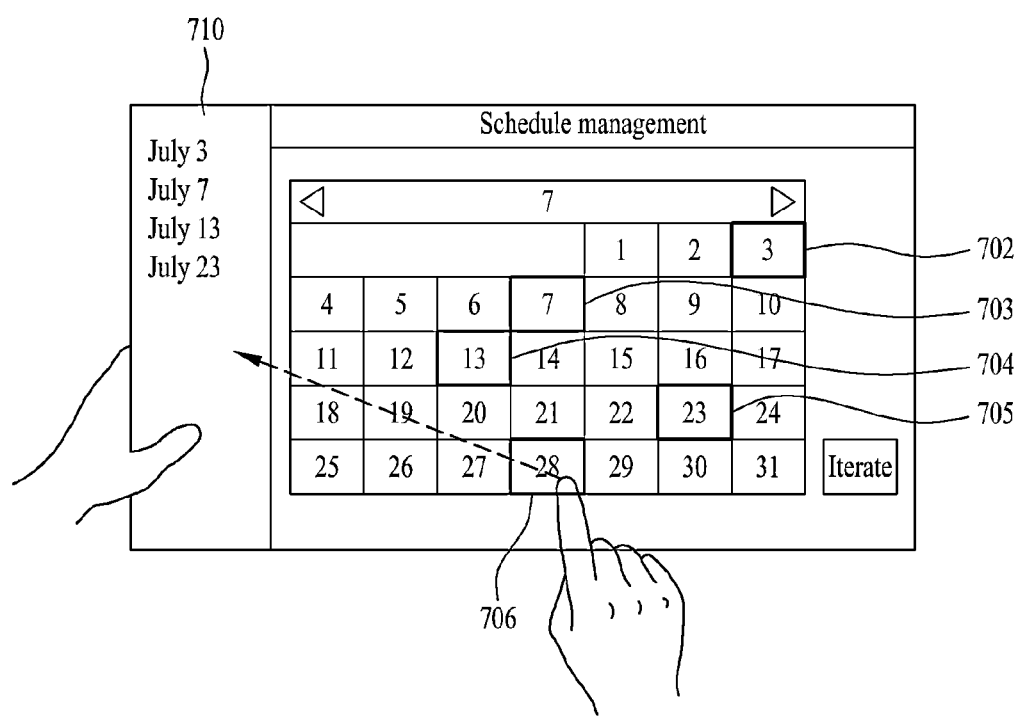
Figure 7C:
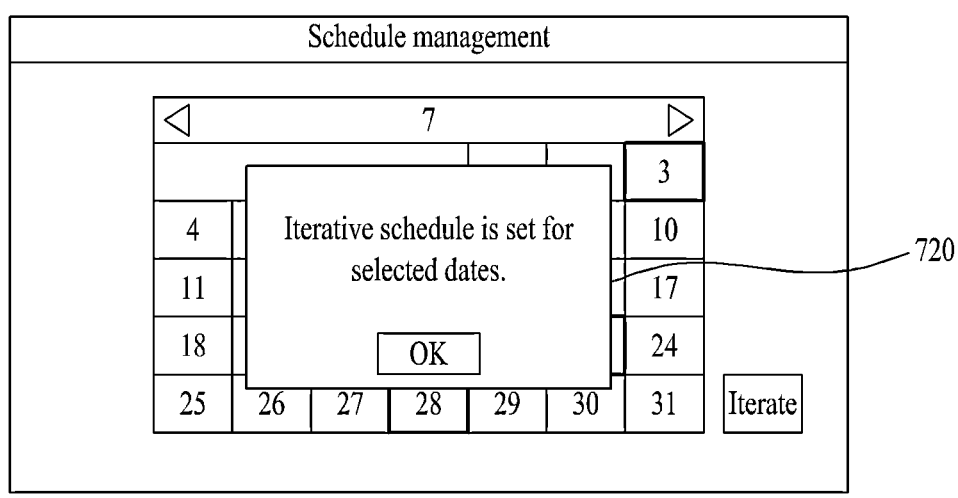

FIGS. 7A to 7C are diagrams for selecting and displaying a specific date on a specific region, while a schedule management application is activated, according to the present invention.

Referring to FIG. 7A, the mobile terminal 100 may display a calendar image in accordance with schedule management application activation. In case of attempting to set an iterative schedule (or an identical schedule) for a plurality of dates, the mobile terminal 100 may receive an input of a touch action on a zone 'Iterate' 701 from a user. And, the touch action on the zone 'Iterate' 701 may be inputted after the creation of the specific region 710 or after the selection of the dates on which the iterative schedule is going to be set.

Referring to FIG. 7B, as the $1^{st}$ touch action is inputted, the mobile terminal 100 may create a specific region 710. while the touch by the $1^{st}$ touch action is maintained, in case of receiving a touch & drag action starting with each of a plurality of the dates 702 to 706 (i.e., example of specific objects) contained in the calendar image to the specific region 710, the mobile terminal 100 may display a plurality of the dates 702 to 706 on the specific region 710. Hence, the mobile terminal 100 may be able to set the iterative schedule on each of a plurality of the dates 702 to 706 displayed on the specific region 710.

In particular, referring to FIG. 7C, if the $1^{st}$ touch action is removed in FIG. 7B, the mobile terminal 100 may control the specific region 710 to disappear from the screen and may display a screen for setting the iterative schedule on each of a plurality of the dates 702 to 706 used to be displayed on the specific region 710.

Figure 8A:
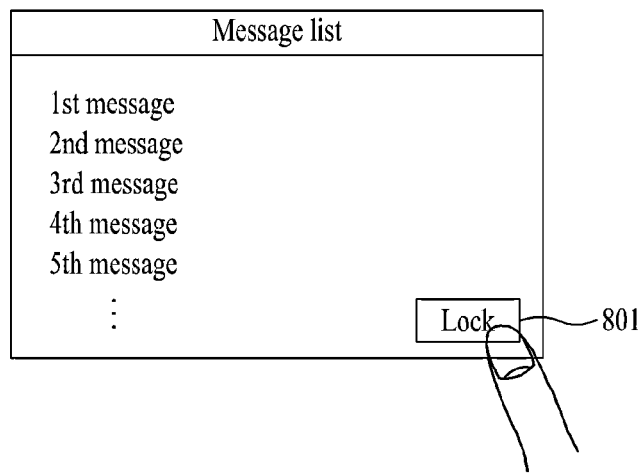
FIGS. 8A to 8C are diagrams for selecting and displaying a specific message item on a specific region, while a message application is activated, according to the present invention.
Figure 8B:
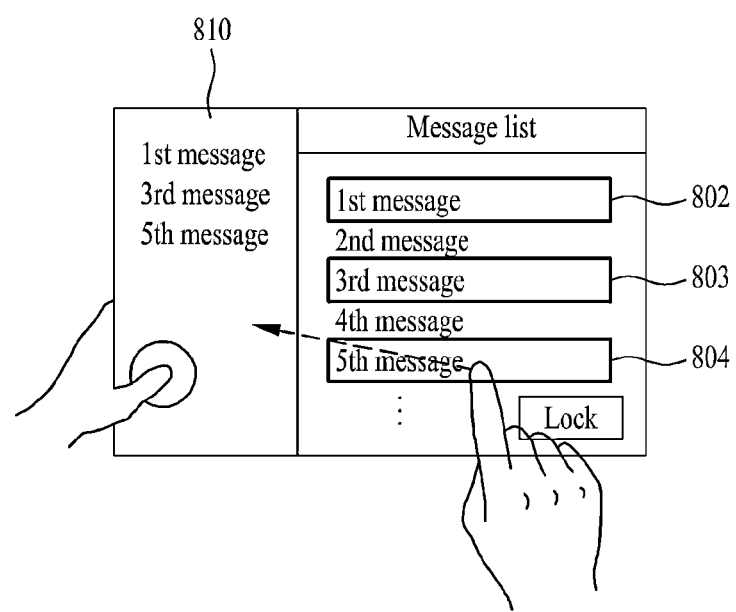
Figure 8C:
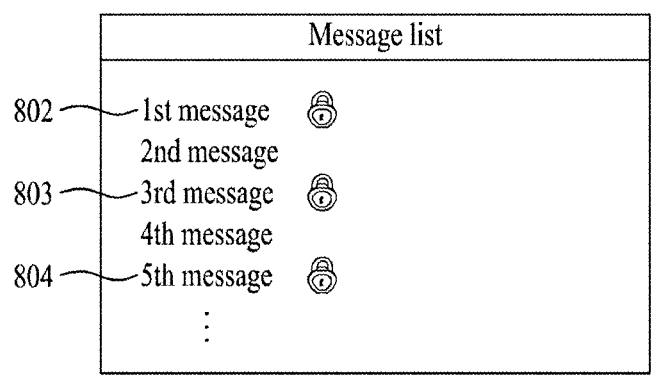

FIGS. 8A to 8C are diagrams for selecting and displaying a specific message item on a specific region, while a message application is activated, according to the present invention.

Referring to FIG. 8A, the mobile terminal 100 may display a message list containing message items respectively indicating transmitted/received messages in accordance with message application activation. In case of attempting to lock a specific message, the mobile terminal 100 may receive a touch action on a lock zone 801. In particular, the touch action on the lock zone 801 may be inputted after creation of a specific region 810 or after selection of a specific message to lock.

Referring to FIG. 8B, in case of receiving an input of a $1^{st}$ touch action, the mobile terminal 100 may create a specific region 810. While a touch by the $1^{st}$ touch action is maintained, in case of receiving a touch & drag action starting with each of a plurality of message items 802 to 804 (i.e., example of specific objects) contained in the message list to the specific region 810, the mobile terminal 100 may display a plurality of the message items 802 to 804 on the specific region 810. Hence, the mobile terminal 100 may be able to lock a plurality of messages respectively indicated by a plurality of the message items 802 to 804 displayed on the specific region 810.

In particular, referring to FIG. 8C, if the $1^{st}$ touch action is removed in FIG. 8B, the mobile terminal 100 may control the specific region 810 to disappear from the screen and may be able to display a message list in which a lock setting indicator (e.g., a padlock type) is marked on each of a plurality of the message items 802 to 804.

Figure 9A:
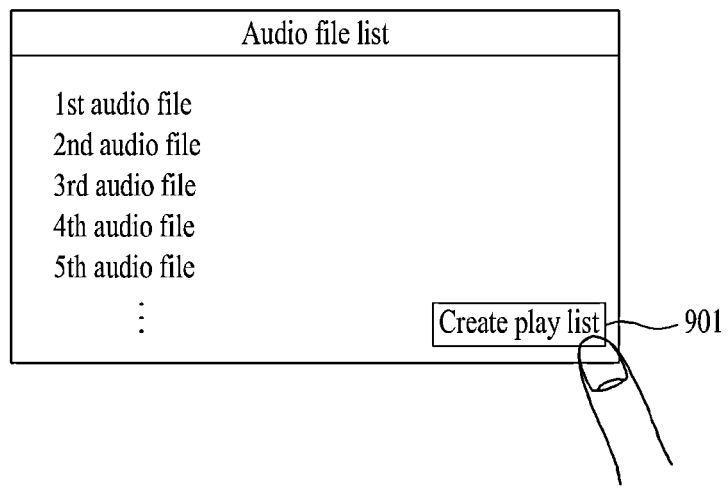
Figure 9B:
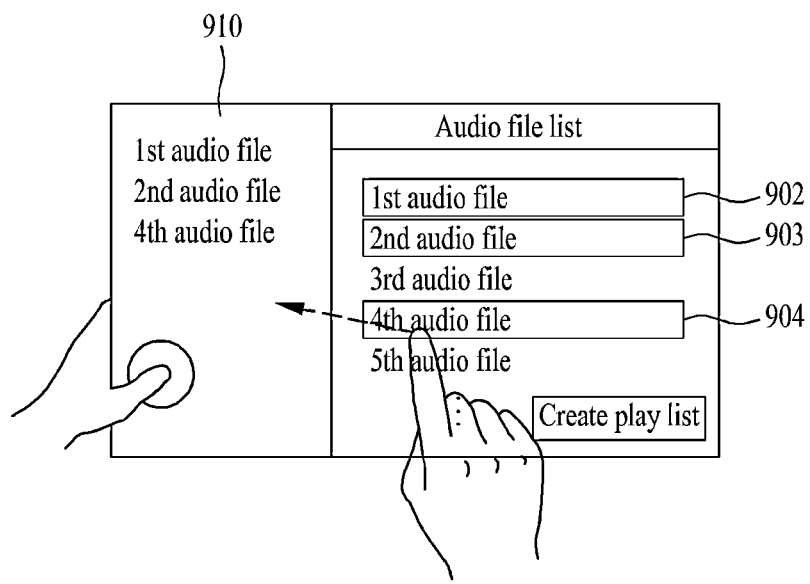

FIGS. 9A to 9C are diagrams for selecting and displaying a specific audio file on a specific region, while an audio play application is activated, according to the present invention.

Referring to FIG. 9A, the mobile terminal 100 may be able to display an audio file list containing audio file items respectively indicating a plurality of audio files in accordance with audio play application activation. In case of attempting to create a new play list containing a specific audio file, the mobile terminal 100 may receive a touch action on a play list zone 901. In particular, the touch action on the play list zone 901 may be inputted after creation of a specific region 910 or after selection of the specific audio file to contain in the new play list.

Referring to FIG. 9B, in case of receiving an input of a $1^{st}$ touch action, the mobile terminal 100 may create a specific region 910. While a touch by the $1^{st}$ touch action is maintained, in case of receiving a touch & drag action starting with each of a plurality of audio file items 902 to 904 (i.e., example of specific objects) contained in the audio file list to the specific region 910, the mobile terminal 100 may display a plurality of the audio file items 902 to 904 on the specific region 910. Hence, the mobile terminal 100 may be able to create a new play list containing a plurality of audio files respectively indicated by a plurality of the audio file items 902 to 904 displayed on the specific region 910.

In particular, referring to FIG. 9C, if the $1^{st}$ touch action is removed in FIG. 9B, the mobile terminal 100 may control the specific region 910 to disappear from the screen and may be able to display a new play list containing a plurality of the audio file items 902 to 904.

Figure 10A:
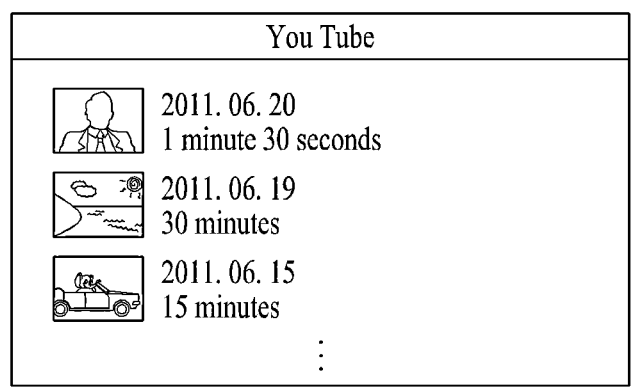
FIGS. 10A to 10C are diagrams for selecting and displaying a specific video on a specific region, while Youtube application is activated, according to the present invention.
Figure 10B:
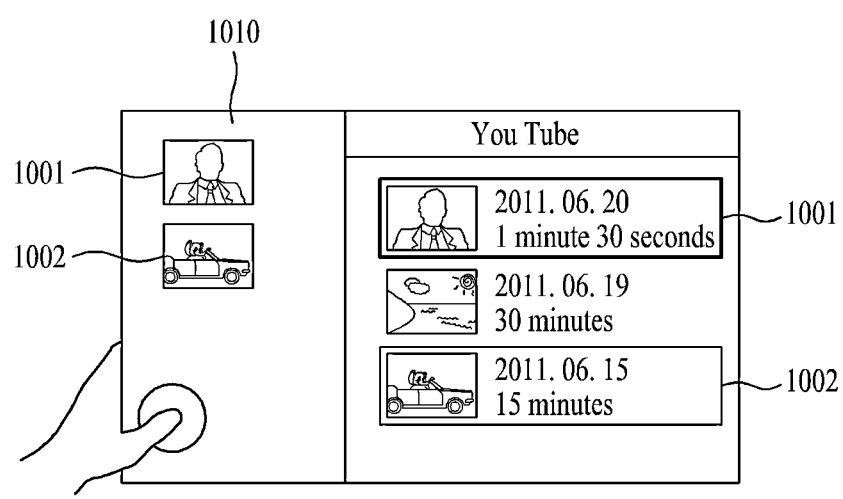
Figure 10C:
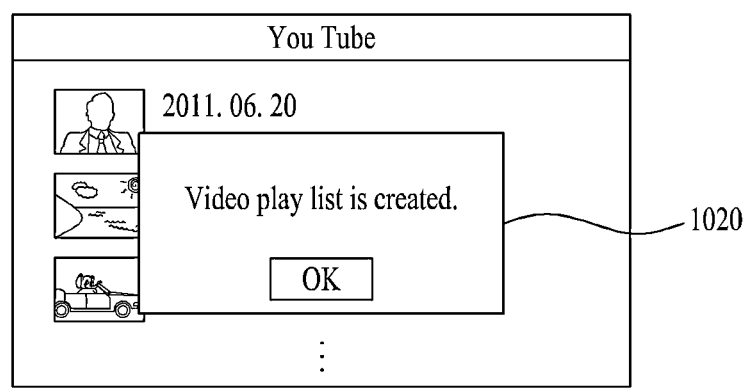

FIGS. 10A to 10C are diagrams for selecting and displaying a specific video on a specific region, while Youtube application is activated, according to the present invention.

Referring to FIG. 10A, the mobile terminal 100 accesses Youtube in accordance with Youtube application activation and may be then able to display video items respectively indicating a plurality of videos provided by Youtube.

Referring to FIG. 10B, in case of receiving an input of a $1^{st}$ touch action, the mobile terminal 100 may create a specific region 1010. While a touch by the $1^{st}$ touch action is maintained, in case of receiving a touch & drag action starting with each of a plurality of specific video items 1001 and 1002 (i.e., example of specific objects) respectively indicating specific videos among a plurality of the videos provided by Youtube to the specific region 1010, the mobile terminal 100 may display the specific video items 1001 and 1002 on the specific region 1010. Hence, the mobile terminal 100 may be able to create a video play list containing the specific videos respectively indicated by a plurality of the specific video items 1001 and 1002 displayed on the specific region 1010.

In particular, referring to FIG. 10C, if the $1^{st}$ touch action is removed in FIG. 10B, the mobile terminal 100 may control the specific region 1010 to disappear from the screen and may output a window 1020 for announcing that a video play list including the specific video items 1001 and 1002 has been created. Alternatively, the mobile terminal 100 may be able to display a video play including the specific video items 1001 and 1002.

FIGS. 11A to 11D are diagrams for selecting and displaying an application indicator on a specific region according to the present invention. For clarity and convenience of the following description, the mobile terminal 100 may configure a plurality of pages and may then display at least one application indicator on each of a plurality of the pages.

Referring to FIG. 11A, in case of receiving an input of a touch (i.e., example of $1^{st}$ touch action) on a $1^{st}$ application indicator 1101 displayed on a $1^{st}$ page, the mobile terminal 100 may create a specific region 1110 containing a $1^{st}$ application indicator 1101 and may also display the $1^{st}$ application indicator 1101 on the specific region 1110. In this case, the touch to the $1^{st}$ application indicator 1101 may include a touch action for selecting a specific object as well as the former touch action for creating the specific region.

Moreover, while the touch to the $1^{st}$ application indicator 1101 is maintained, the mobile terminal 100 may receive an input of a touch & drag action (i.e., example of $2^{nd}$ touch action) starting with a $2^{nd}$ application indicator 1102 to the specific region 1110 and may be able to further display the $2^{nd}$ application indicator 1102 on the specific region 1110. In this case, 'maintaining the touch to the $1^{st}$ application indicator' may include 'shifting the touch point without removing the touch after the touch to the $1^{st}$ application indicator 1101'.

Of course, the mobile terminal 100 may be able to receive an input of a touch to a point, at which an application indicator is not displayed, as a $1^{st}$ touch action. And, the mobile terminal 100 may be able to create a specific region at the touch inputted point.

Figure 11B:
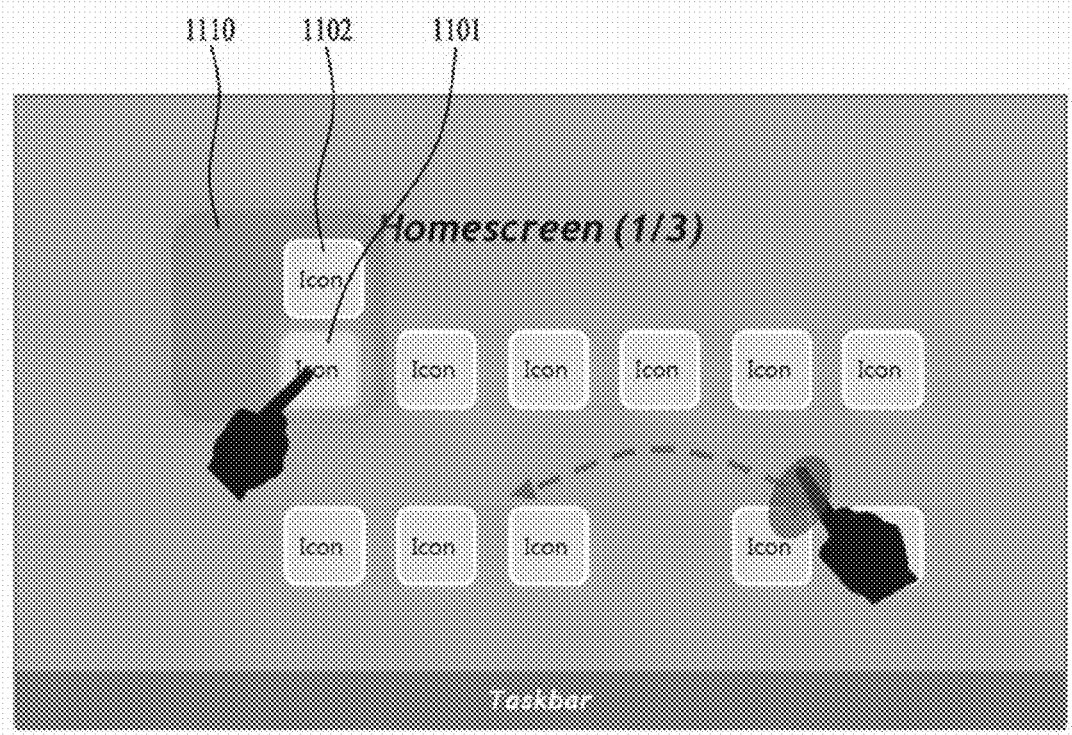
Figure 11C:
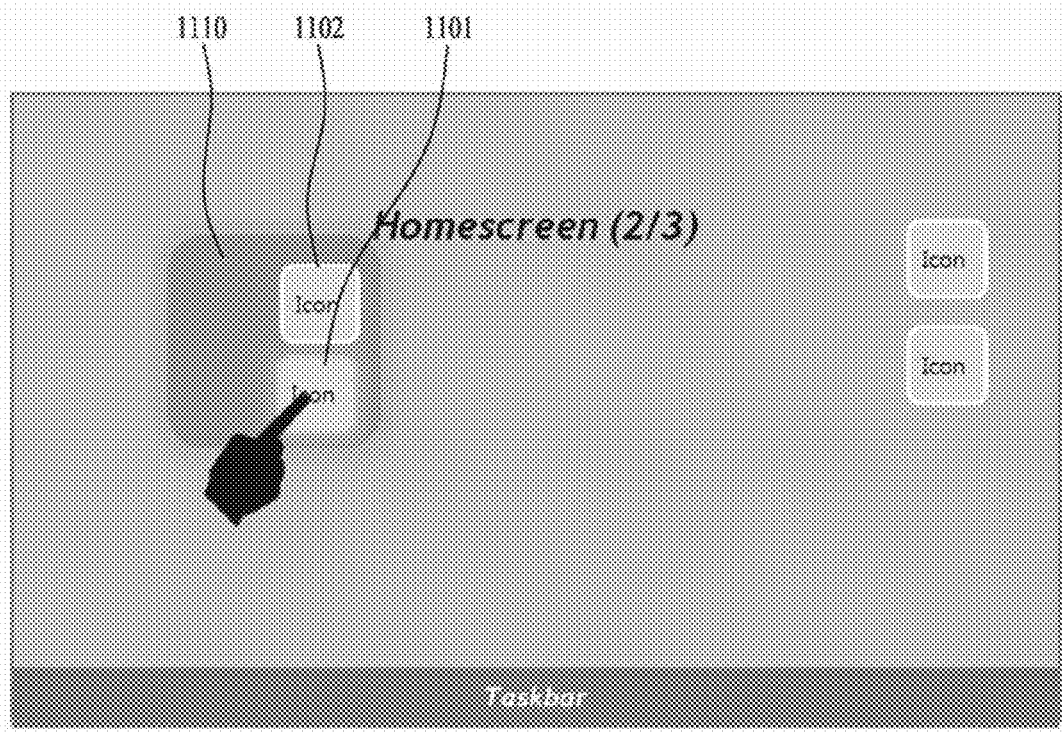

Referring to FIG. 11B and FIG. 11C, while the touch to the $1^{st}$ application indicator 1101 is maintained, if a user inputs a touch action (e.g., a flicking action in a prescribed direction) for a page turning, the mobile terminal 100 may turn a current page to a different page and may keep the specific region 1110 displayed on the different page.

For instance, the touch action for the page turning may include an action for shifting a pointer having performed the touch to the $1^{st}$ application indicator 1101 to a point in the vicinity of a screen edge as well as a flicking action using a different pointer that is not the pointer having performed the touch to the $1^{st}$ application indicator 1101. In this case, the latter action may be accompanied by a shift of the specific region 1110.

Figure 11D:
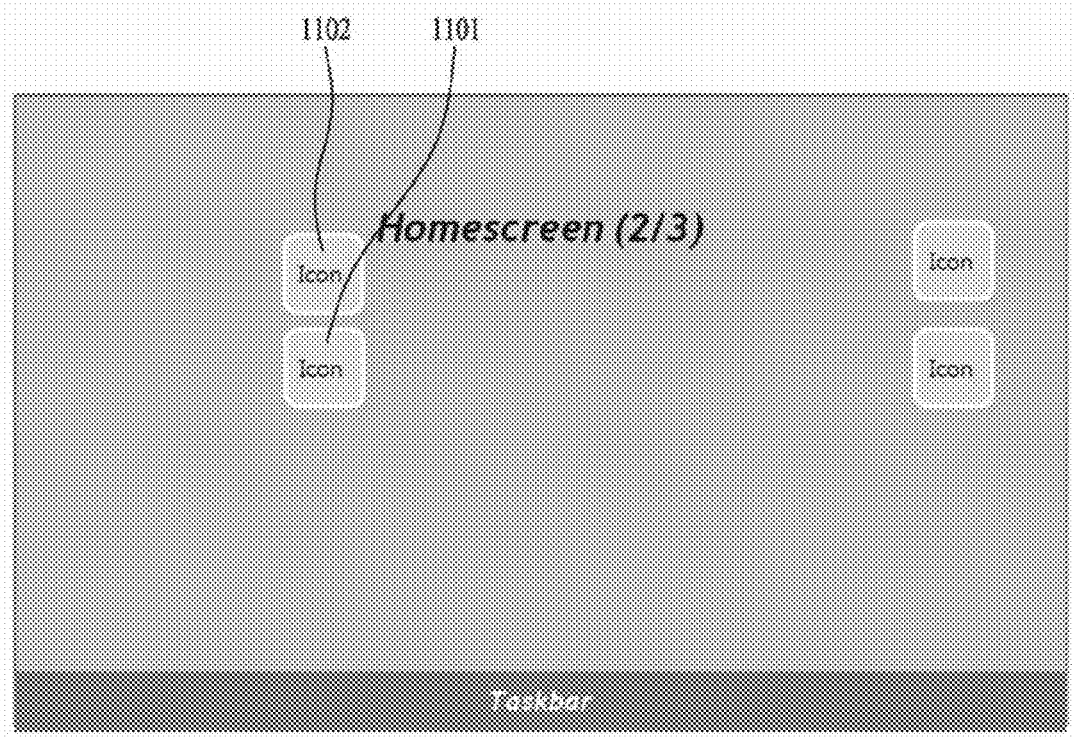

Referring to FIG. 11D, if the touch to the $1^{st}$ application indicator 1101 is removed, the mobile terminal 100 may control the specific region 1110 to disappear from the screen and may be also able to display the $1^{st}$ and $2^{nd}$ application indicators 1101 and 1102, which were used to be displayed on the specific region 110, on a current page.

The above-mentioned embodiment may be useful for a case of shifting a plurality of application indicators displayed on a prescribed page to another page all at once.

In the following description, a process for controlling a display of a specific region or a specific object displayed on the specific region may be explained in detail with reference to the accompanying drawings.

Figure 12A:
FIG. 12A and FIG. 12B are diagrams for activating a specific region fixing function according to the present invention.
Figure 12B:
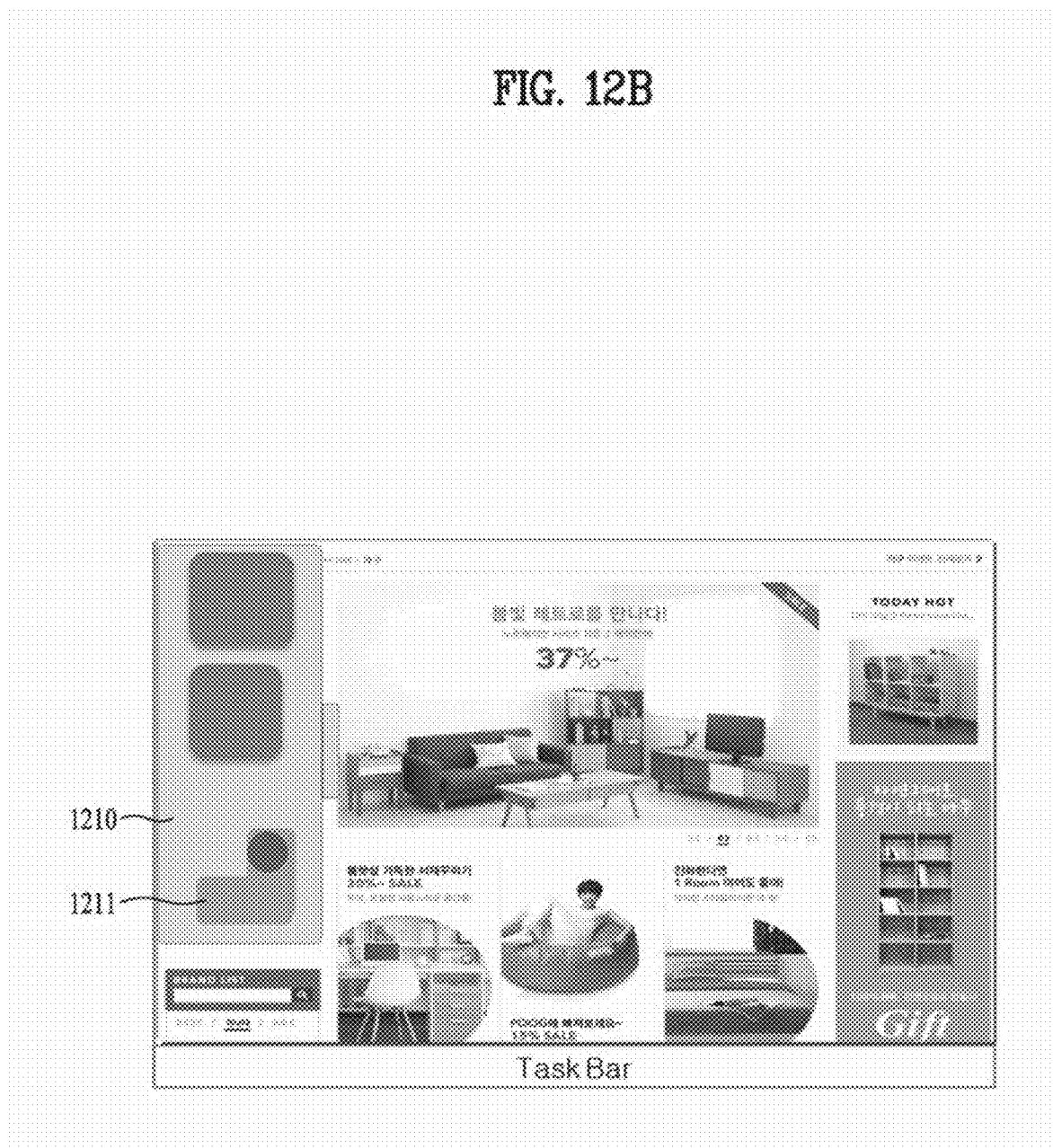

FIG. 12A and FIG. 12B are diagrams for activating a specific region fixing function according to the present invention.

Referring to FIG. 12A and FIG. 12B, while a touch by a $1^{st}$ touch action is maintained, if a touch action for commanding a specific region fixing is inputted to a specific region 1210, the mobile terminal 100 may be able to keep displaying the specific region 1210 despite that the touch by the $1^{st}$ touch action is removed. In doing so, on the specific region 1210, it may be able to display an indicator 1211 (e.g., a latch type cue) indicating that the display of the specific region 1210 is maintained despite the removal of the $1^{st}$ touch action.

Besides, when a touch action for canceling the specific region fixing is inputted to the indicator 1211 by a user, the mobile terminal 100 may return to the status of displaying the specific region 1210 only if the touch by the $1^{st}$ touch action is maintained.

The command for fixing or canceling the specific region fixing may be executed by one of a specific terminal motion (e.g., forward inclination for a command for fixing, backward inclination for a command for canceling the fixing, etc.), a specific speech input (e.g., input of speech 'command fixing', input of speech 'cancel fixing', etc.) as well as the above-mentioned touch action [not shown in the drawings].

Figure 13A:
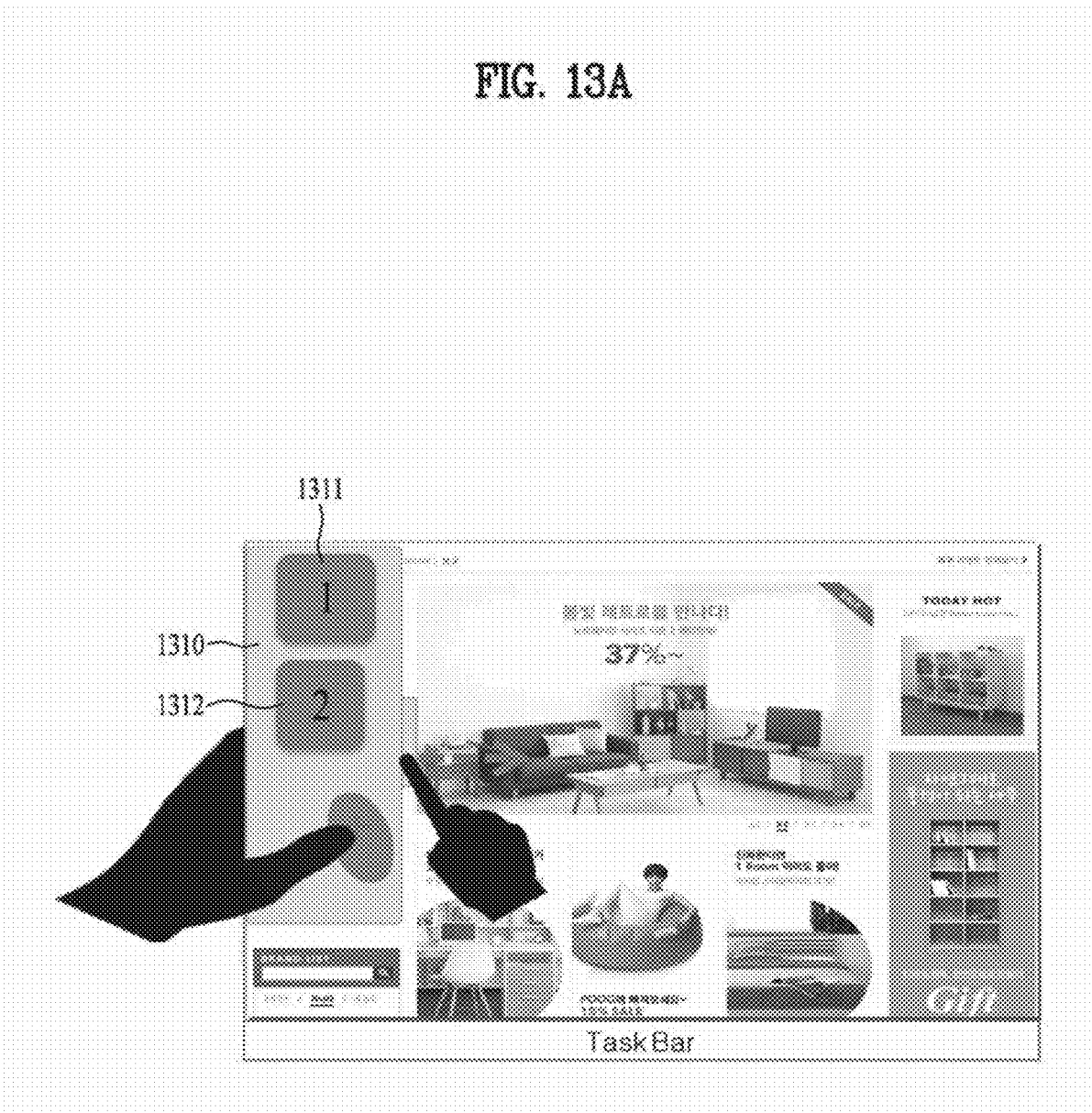
FIG. 13A and FIG. 13B are diagrams for displaying a previously selected specific object on a specific region according to the present invention.
Figure 13B:
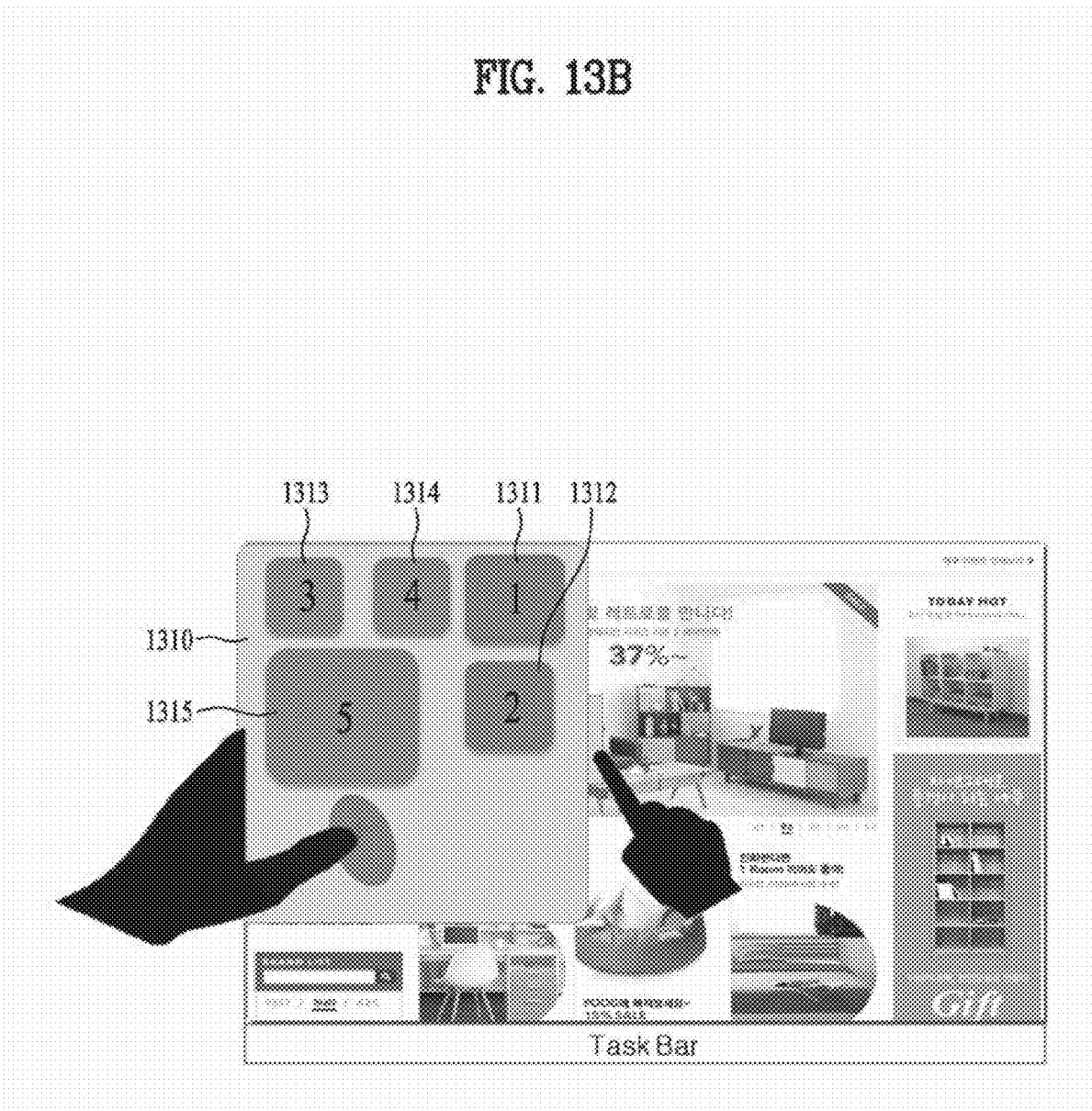

FIG. 13A and FIG. 13B are diagrams for displaying a previously selected specific object on a specific region according to the present invention.

Referring to FIG. 13A, the mobile terminal 100 may access a specific website in accordance with web application activation and may be then able to display image-1 1311 and image-2 1312, which are selected from a plurality of images contained in a webpage provided by the accessed website, on a specific region 1310.

Referring to FIG. 13B, if a user inputs a touch action (e.g., a touch & drag action from an inside of a specific region to an outside of the specific region, a touch & drag action for dragging an outline of a specific region) to extend a specific region, the mobile terminal 100 may extend the specific region 1310. The mobile terminal 100 may be then able to further display previously selected images (3) to (5) 1313 to 1315 within the extended specific region 1310 as well as currently selected images (1) and (2) 1311 and 1312.

In this case, if a specific website is currently accessed, the currently selected image may include an image selected in the course of the current access to the specific website. If a web application is currently activated, the currently selected image may include an image selected in the course of the current activation of the web application. On the other hand, if a specific website is currently accessed, the previously selected image may include an image selected in the course of the previous access to the specific website. If a web application is currently activated, the previously selected image may include an image selected in the course of the previous activation of the web application.

Moreover, the larger the extent of the extension of the specific region 1310 gets, the higher the number of the previously selected images displayed within the specific region 1310 becomes.

Meanwhile, if a specific application is currently activated, the currently selected image may include an image selected in the course of the current activation of the specific application. And, the previously selected image may include an image selected in the course of the previous activation of the specific application. Alternatively, the currently selected image may include an image selected today. And, the previously selected image may include an image selected before today.

Figure 14A:
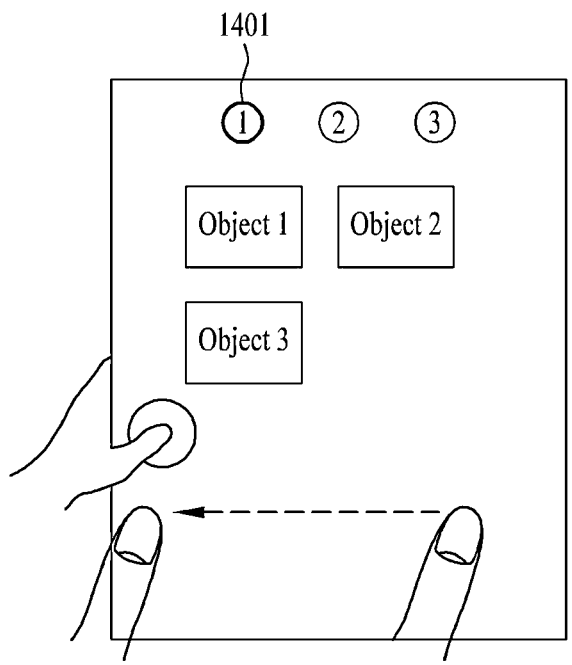
FIGS. 14A to 14C are diagrams for performing a page turning operation within a specific region according to the present invention.
Figure 14A:
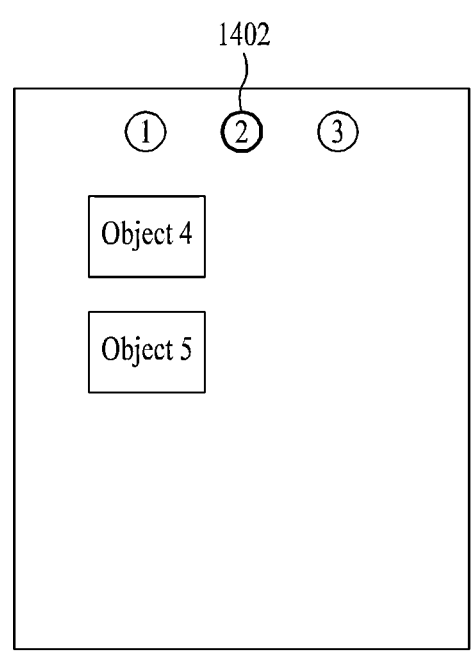
Figure 14B:
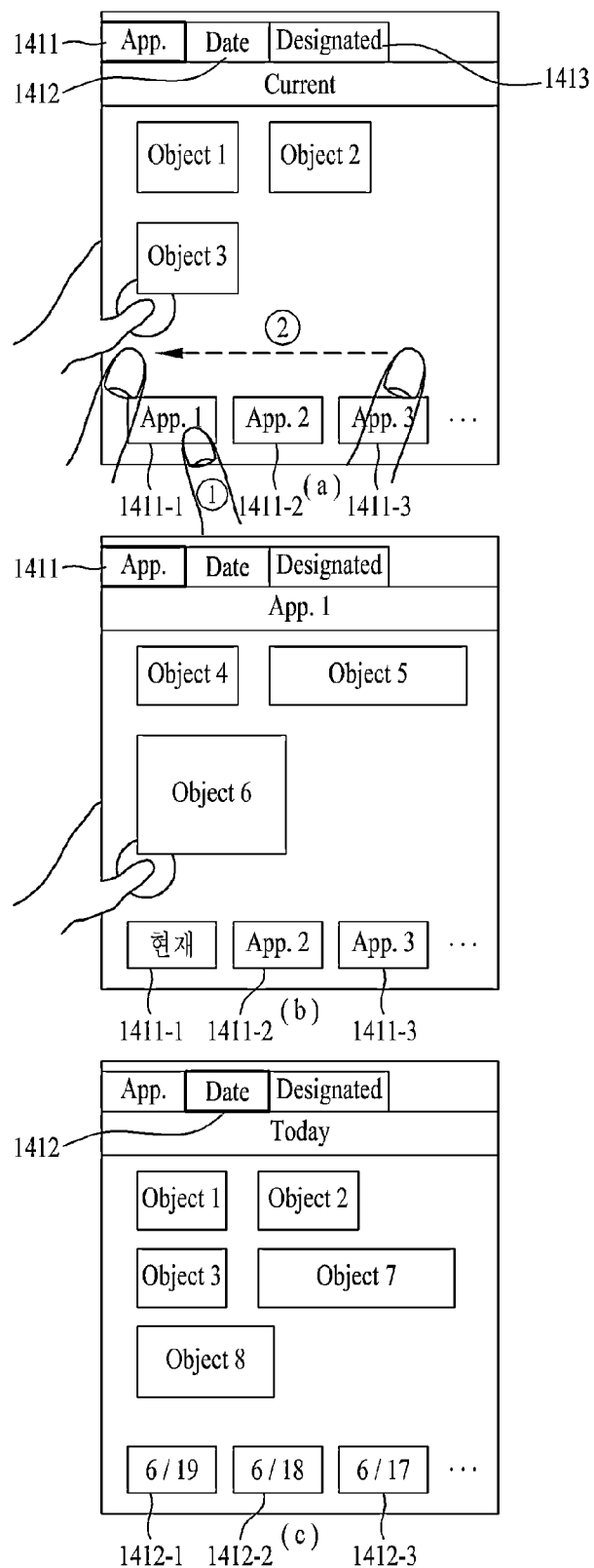
Figure 14C:
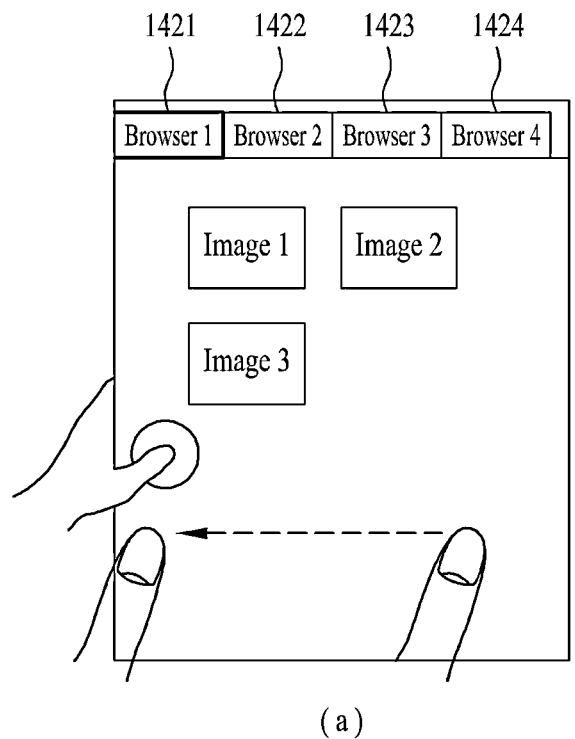
Figure 14C:
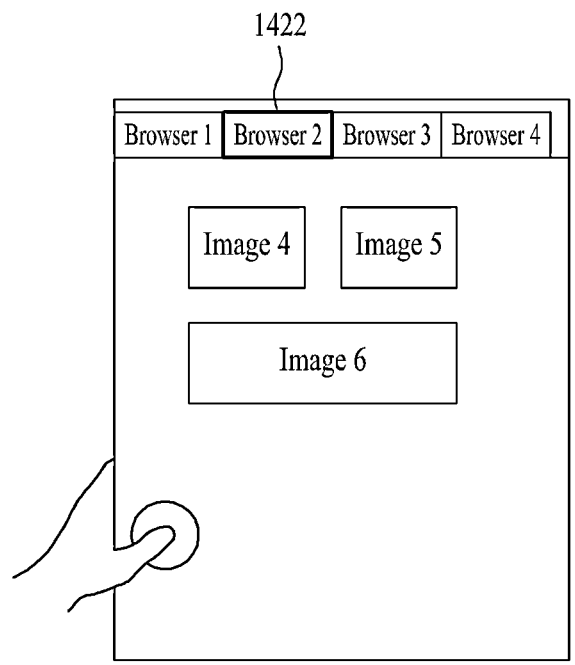

FIGS. 14A to 14C are diagrams for performing a page turning operation within a specific region according to the present invention. For clarity and convenience of the following description, assume that a specific region may include a plurality of pages. And, assume that a page turning operation may be performed within the specific region.

Referring to FIG. 14A, while a $1^{st}$ page containing $1^{st}$ to $3^{rd}$ objects of a specific region is displayed, if a user inputs a touch action for a page turning [FIG. 14A (a)], the mobile terminal 100 may display another page of the specific region by performing a page turning operation within the specific region [FIG. 14A (b)].

Moreover, a plurality of page indicators may be displayed on the specific region and an indicator corresponding to a currently displayed page may be identifiably displayed. For instance, if a $1^{st}$ page of a current specific region is displayed, a $1^{st}$ page indicator 1401 may be identifiably displayed. For another instance, if a $2^{nd}$ page of a current specific region is displayed, a $2^{nd}$ page indicator 1402 may be identifiably displayed.

Referring to FIG. 14B, the mobile terminal 100 may configure a specific region differing in application, date or user specification. Moreover, the mobile terminal 100 may configure a specific region differing per application, date or user-specific item.

In particular, the mobile terminal 100 may be able to create a specific region corresponding to an application and may basically create a specific region corresponding to a currently active application [FIG. 14B (a)].

In doing so, the mobile terminal 100 may display tags 1411 to 1413 respectively indicating application, date and user specification within the specific region and may identifiably display the tag 1411 corresponding to a currently created specific region. Moreover, the mobile terminal 100 may be able to display zones 1411-1 to 1411-3 for selecting other applications within the specific region.

If the $1^{st}$ application zone 1411-1 is selected in FIG. 14B (a) [φ], the mobile terminal 100 may create a specific region corresponding to a $1^{st}$ application [FIG. 14B (b)].

If a touch action for a page turning is inputted in FIG. 14B (a) [φ], the mobile terminal 100 creates a specific region corresponding to date and may basically create a specific region corresponding to today [FIG. 14B (c)]. In doing so, the tag 1412 of the date corresponding to the currently created specific region may be identifiably displayed. And, zones 1412-1 1412-3 for selecting other dates may be displayed within the specific region.

Referring to FIG. 14C, the mobile terminal 100 may display tags 1421 to 1424 respectively indicating $1^{st}$ to $4^{th}$ available web browsers within a specific region. The mobile terminal 100 may be then able to identifiably display the tag 1421 indicating a $1^{st}$ web browser corresponding to a currently created specific region [FIG. 14C (a)].

Moreover, if a user inputs a touch action for a page turning or a web browser turning to a specific region, the mobile terminal 100 may create a specific region corresponding to a different web browser and may identifiably display the tag 1422 indicating the different web browser [FIG. 14C (b)].

In this case, a specific region corresponding to a specific application may mean a specific region for displaying an image selected by a $2^{nd}$ touch action during activation of the specific application. And, a specific region corresponding to a specific date may mean a specific region for displaying an image selected by a $2^{nd}$ touch action during the specific date. Moreover, a specific region corresponding to a specific web browser may mean a specific region for displaying an image selected by a $2^{nd}$ touch action during an access of the specific web browser.

Figure 15A:
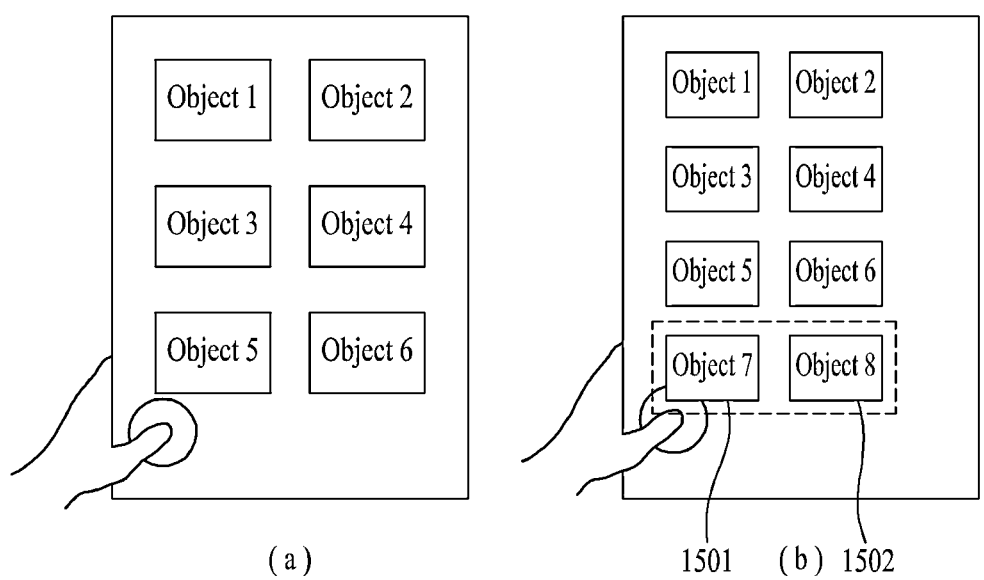
FIGS. 15A to 15C are diagrams for controlling a specific region or a specific object displayed on the specific region according to the present invention.
Figure 15A:
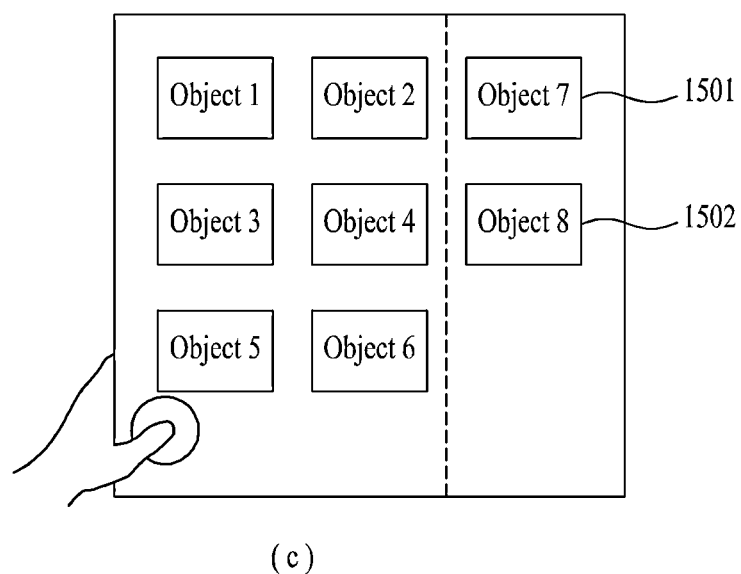
Figure 15B:
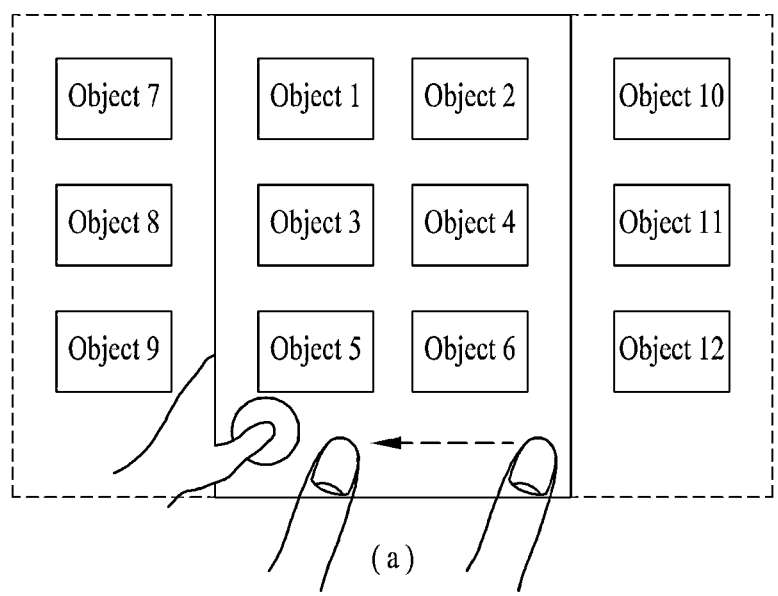
Figure 15B:
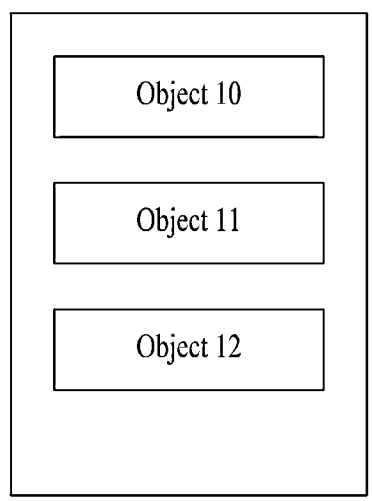
Figure 15C:
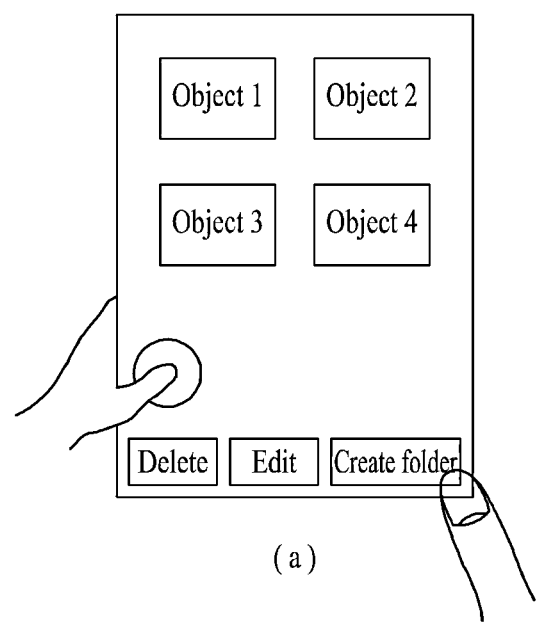
Figure 15C:
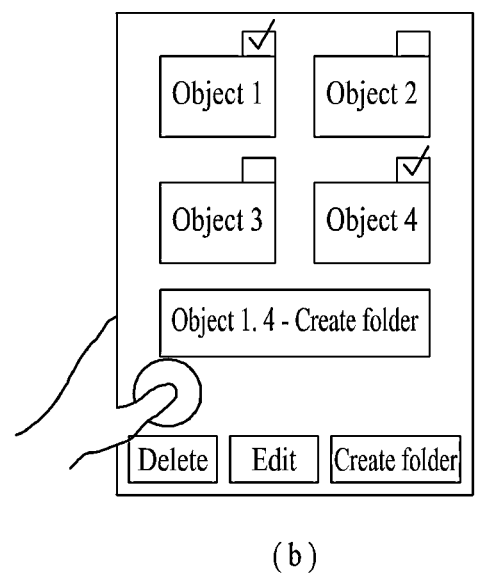

FIGS. 15A to 15C are diagrams for controlling a specific region or a specific object displayed on the specific region according to the present invention.

Referring to FIG. 15A, while object 1 to object 6 are displayed within a specific region [FIG. 15A (a)], if object 7 1501 and object 8 1502 are further selected by a $2^{nd}$ touch action, the mobile terminal 100 may reduce and display the objects 1 to 8 within the specific region [Maintain specific region, Reduce objects] [FIG. 15A (b)]. Alternatively, the mobile terminal may increase a size of the specific region and may then display the objects 1 to 8 within the enlarged specific region [Enlarge specific region, Maintain objects] [FIG. 15A (c)].

Referring to FIG. 15B, the mobile terminal 100 may be able to display some (e.g., object 1 to object 6) of all objects (e.g., object 1 to object 12) displayable within a specific region [FIG. 15B (a)]. In case of receiving an input of a touch action for object scroll on the specific region, the mobile terminal 100 may display the rest of the objects (e.g., object 10 to object 12) within the specific region [FIG. 15B (b)].

Referring to FIG. 15C, the mobile terminal 100 may display a control region, which is to control a specific region itself or a specific object displayed on the specific region, within the specific region.

For instance, if a folder creating zone is selected, the mobile terminal 100 may be able to create a folder containing object 1 and object 4 selected by a user from object 1 to object 4 displayed within the specific region. On the other hand, if a folder creating zone is selected, the mobile terminal 100 may be able to create a folder containing all objects displayed within the specific region without an object selecting action by a user.

If a delete zone is selected, the mobile terminal 100 may be able to delete all specific objects displayed within the specific region or a specific object selected by a user from all specific objects displayed on the specific region. If an edit zone is selected, the mobile terminal 100 may edit a specific object selected by a user from all specific objects displayed on the specific region.

The above-mentioned examples are just exemplary, by which any region for controlling a specific region or a specific object displayed on the specific region is non-limited.

Figure 16A:
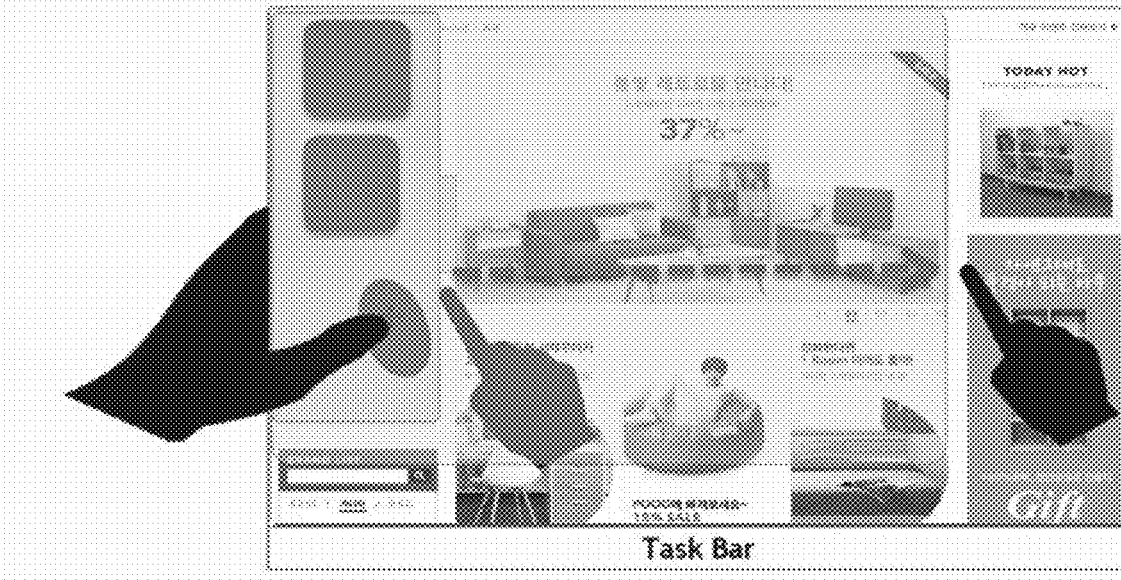

FIG. 16A and FIG. 16B are diagrams for displaying an integrated region according to the present invention. For clarity and convenience of the following description, a specific region created by being sorted with reference to application, date, user specification or the like shall be named an individual region. And, a specific region common to all statuses shall be named an integrated region irrespective of the above-mentioned references.

Referring to FIG. 16A, while an individual region 1610 is displayed [Maintain a touch by $1^{st}$ touch action via $1^{st}$ pointer], the mobile terminal 100 may receive an input of a touch action for commanding an integrated region display via a $2^{nd}$ pointer. For instance, the touch action for commanding the integrated region display may include a touch & drag action starting with a prescribed point within the individual region 1610 or a prescribed point of a vertical outline of the individual region 1610 to an opposed screen end or a touch & drag action in a predetermined distance.

Referring to FIG. 16B, in case of receiving an input of a touch action for commanding an integrated region display in FIG. 16A, the mobile terminal 100 may be able to display an integrated region on a whole screen. In this case, the $1^{st}$ touch action may not need to be maintained.

For instance, the integrated region may equally provide objects contained therein irrespective of a currently activated application or a currently accessed web browser (i.e., irrespective of a current terminal status). In the integrated region, objects selected by a $2^{nd}$ touch action in all application activations, objects selected by a $2^{nd}$ touch action on all dates, and objects selected by a $2^{nd}$ touch action in all web browser activations may be contained. Of curse, specific objects may be provided within the integrate region in a manner of being sorted per application, web browser or date.

Meanwhile, in case of receiving a touch action for commanding an individual region display in FIG. 16B, the mobile terminal 100 may return to the status shown in FIG. 16A. For instance, the touch action for commanding the individual region display may have an input pattern contrary or corresponding to that of the touch action for commanding the integrated region display.

Figure 17A:
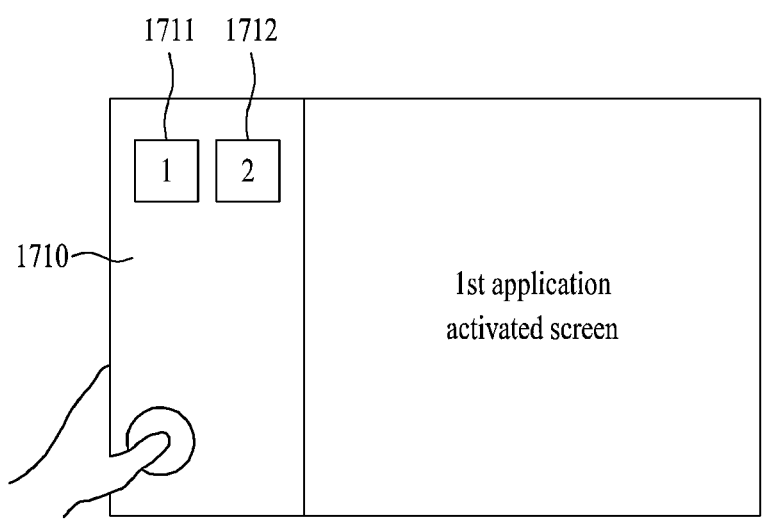
FIGS. 17A to 17C are diagrams for controlling a specific object displayed on a specific region in accordance with a currently activated application according to the present invention.
Figure 17B:
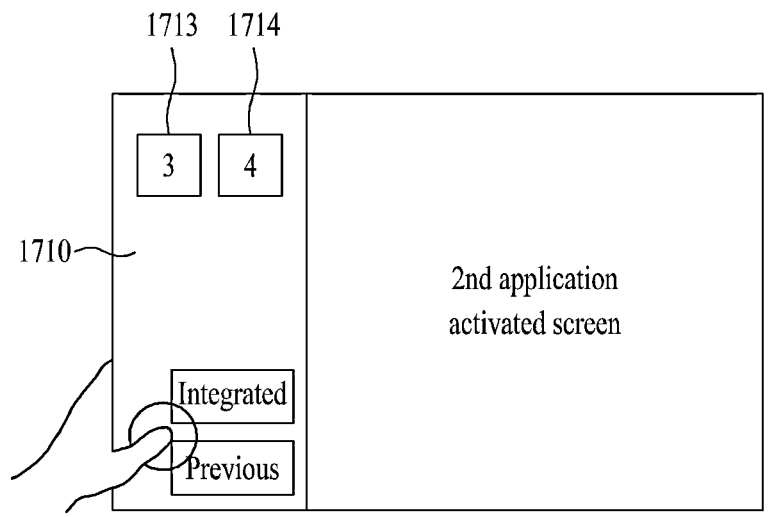
Figure 17B:
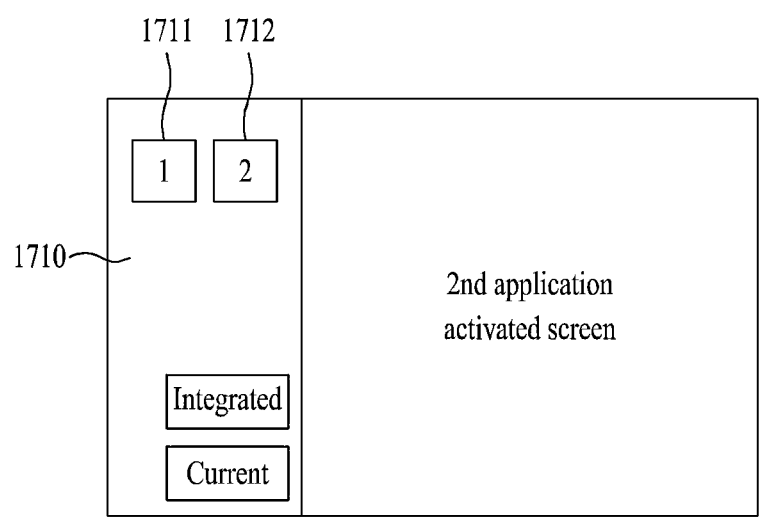
Figure 17C:
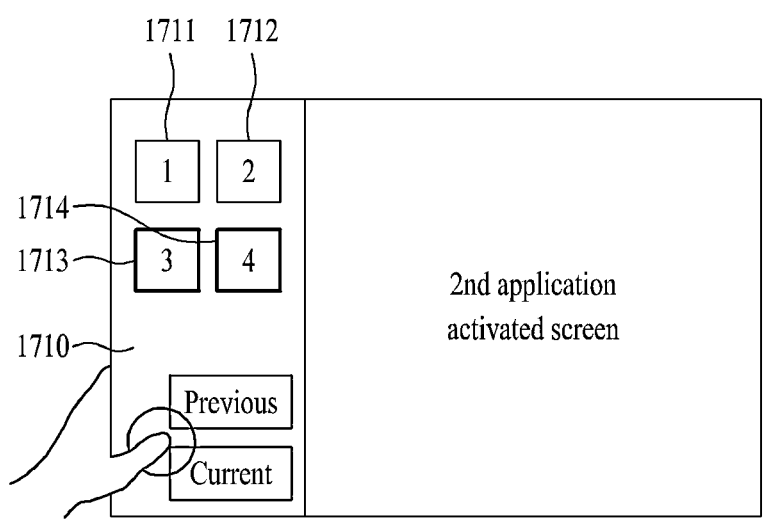

FIGS. 17A to 17C are diagrams for controlling a specific object displayed on a specific region in accordance with a currently activated application according to the present invention.

Referring to FIG. 17A, when a $1^{st}$ application is active, the mobile terminal 100 may be able to display object 1 1711 and object 2 1712, which are selected by a $2^{nd}$ touch action, on a specific region 1710 during the $1^{st}$ application activation.

Referring to FIG. 17B, after the $1^{st}$ application has been ended, if a $2^{nd}$ application is activated, the mobile terminal 100 may display object 3 1713 and object 4 1714, which are selected by a $2^{nd}$ touch action, on the specific region 1710 while the $2^{nd}$ application is active [FIG. 17B (a)]. If a zone 'previous' displayed within the specific region 1710 is selected, the mobile terminal 100 may display the object 1 1711 and the object 2 1712, which correspond to the $1^{st}$ application and used to be previously active, on the specific region 1710 [FIG. 17B (b)].

Referring to FIG. 17C, after the $1^{st}$ application has been ended, if a $2^{nd}$ application is activated, the mobile terminal 100 may display the object 3 1713 and the object 4 1714, which are selected by the $2^{nd}$ touch action, on the specific region during the $2^{nd}$ application activation together with the object 1 1711 and the object 2 1712 selected by the $2^{nd}$ touch action during the $1^{st}$ application activation. In doing so, the object 3 1713 and the object 4 1714 corresponding to the currently active $2^{nd}$ application may be identifiably displayed.

Moreover, if the integrated region displayed within the specific region 1710 is selected in FIG. 17B, the mobile terminal 100 may enter the status shown in FIG. 17C. If the zone 'previous' or the zone 'current' displayed within the specific region is selected in FIG. 17B, the mobile terminal 100 may enter the status shown in FIG. 17B (b) or FIG. 17B (a).

Figure 18A:
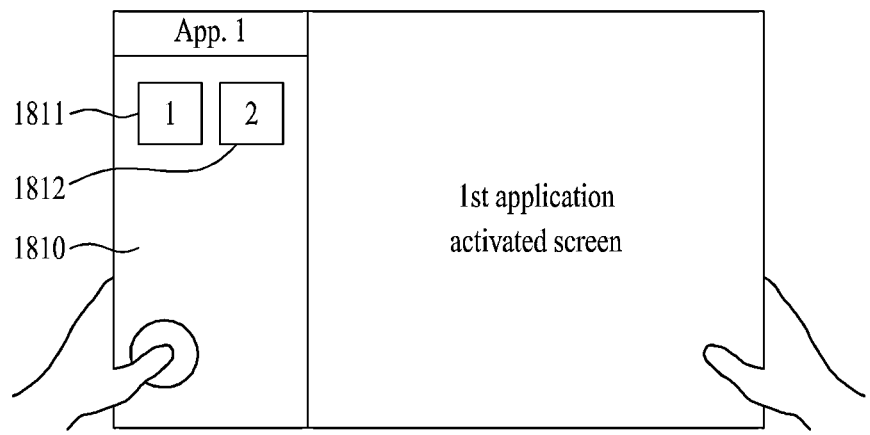
FIG. 18A and FIG. 18B are diagrams for displaying a new region containing a comparative target object in a specific region maintained status according to the present invention.
Figure 18B:
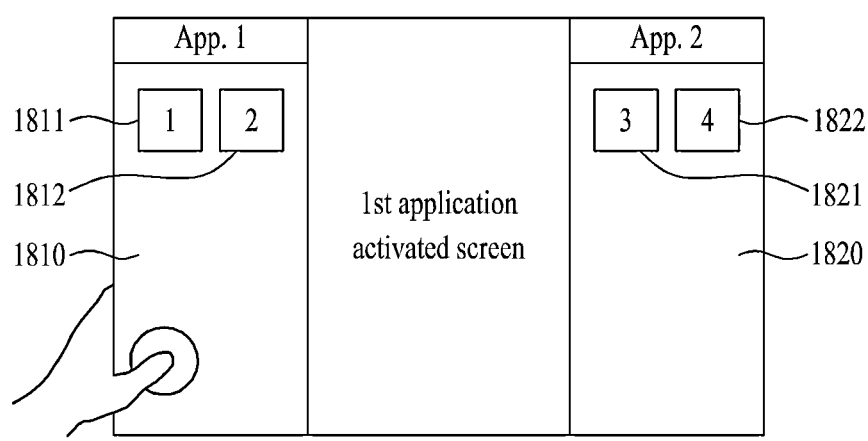

FIG. 18A and FIG. 18B are diagrams for displaying a new region containing a comparative target object in a specific region maintained status according to the present invention.

Referring to FIG. 18A, while a $1^{st}$ application is active, the mobile terminal 100 displays object 1 1811 and object 2 1812 on a specific region 1810 corresponding to the $1^{st}$ application. While a $1^{st}$ touch action is maintained, the mobile terminal 100 may receive an input of a $3^{rd}$ touch action on a random point on the screen. In this case, the $3^{rd}$ touch action may mean a touch action for commanding a creation of a new specific region on which objects to be compared to the object 1 and the object 2 displayed on the specific region 1810 are displayed.

Referring to FIG. 18B, in case receiving the input of the $3^{rd}$ touch action, the mobile terminal 100 may create a new specific region 1820 and may be then able to display object 3 1821 and object 4 1822, which will be compared to the object 1 1811 and the object 2 1812, within the new specific region 1820. For instance, the new specific region 1820 may include a specific region corresponding to a $2^{nd}$ application. Moreover, the new specific region 1820 may not disappear from the screen despite that the $3^{rd}$ touch action is removed.

Meanwhile, if a $1^{st}$ web browser is currently active, the specific region 1810 may correspond to the $1^{st}$ web browser and the new specific region 1820 may correspond to a different web browser. Alternatively, the specific region 1810 may correspond to a date of today and the new specific region 1820 may correspond to a random date previous to today. If a $1^{st}$ web side is currently accessed, the specific region 1810 may correspond to the $1^{st}$ website and the new specific region 1820 may correspond to a different website. If an application is currently active, the specific region 1810 corresponds to the application and the new specific region 1820 may correspond to a web browser.

Referring now to FIG. 3, if the touch by the $1^{st}$ touch action inputted in the inputting step S310 is removed, the mobile terminal 100 may control the specific region to disappear from the screen under the control of the controller 180 [S350].

In this case, if the specific region disappears from the screen, it may mean that the display of the specific object within the specific region is interrupted in a manner that the specific region itself is not displayed on the screen.

In case that the specific region disappears from the screen, the controller 180 may save the specific object, which was displayed on the specific region, in the memory 160, may create a folder containing the specific object previously displayed on the specific region, or may display the specific object, which was displayed on the specific region, on a specific page. Moreover, since the specific object is temporarily saved in the memory 160, the controller 180 may be able to automatically delete the specific object after predetermined duration.

The mobile terminal 100 may receive a $1^{st}$ touch action again via the touchscreen 151 [S360]. In this case, since the $1^{st}$ touch action is identical to the former $1^{st}$ touch action inputted in the inputting step S310, its details shall be omitted from the following description.

If the $1^{st}$ touch action is inputted again, the mobile terminal 100 may determine whether a current terminal status meets an object maintaining condition, under the control of the controller 180 [S370].

In this case, the object maintaining condition may mean the condition that the specific object previously displayed on the specific region may keep being displayed on a new specific region created by the re-input of the $1^{st}$ touch action in case of removing the $1^{st}$ touch action.

For instance, the controller 180 may determine that the object maintaining condition is met in one of a case that the $1^{st}$ touch action is re-inputted within predetermined duration after removal of the $1^{st}$ touch action, a case that the $1^{st}$ action is re-inputted during the $1^{st}$ application activation after removal of the $1^{st}$ touch action (e.g., a case that a specific region per application is created), a case that the $1^{st}$ touch action is removed and then re-inputted during activation of the $1^{st}$ web browser (e.g., a case that a specific region per web browser is created), and a case that the $1^{st}$ touch action is removed and then re-inputted during an access to the $1^{st}$ website (e.g., a case that a specific region per website is created).

Moreover, if a user inputs a command for maintaining the specific object, which was displayed on the specific region in case of removing the $1^{st}$ touch action, in re-inputting the $1^{st}$ touch action, the controller 180 may determine that the object maintaining condition is met.

In case of determining that the object maintaining condition is met, under the control of the controller 180, the mobile terminal 100 may recreate the specific region to correspond to the re-inputted $1^{st}$ touch action and may display a specific object selected by the $2^{nd}$ touch action inputted in the inputting step S330 on the recreated specific region [S380].

So to speak, in case of determining that the object maintaining condition is met, the mobile terminal 100 may be able to display the specific object, which was displayed on the specific region in case of removing the $1^{st}$ touch action, on the specific region created by re-inputting the $1^{st}$ touch action as it was.

Meanwhile, in case of determining that the object maintaining condition is not met, under the control of the controller 180, the mobile terminal 100 may recreate a specific object to correspond to the re-input of the $1^{st}$ touch action but may not display the specific object, which was selected by the $2^{nd}$ touch action inputted in the inputting step S330, on the recreated specific region [S390].

So to speak, in case of determining that the object maintaining condition is not met, the mobile terminal 100 may be able to generate a new specific region on which a previously selected specific object is not displayed.

Occasionally, irrespective of the determination regarding whether the object maintaining condition is met or not, the mobile terminal 100 may intactly display a previously selected specific object within the specific region as a default or in accordance with a user setting [cf. the step S380] or may not [S390]. Alternatively, the mobile terminal 100 may create a specific region for not displaying a previously selected specific object thereon as a default and may page and display the previously selected specific object in accordance with a user selection.

In the following description, a process for displaying a specific object selected by a $2^{nd}$ touch action with reference to an input point of a $1^{st}$ touch action according to a second embodiment of the present invention is explained with reference to the accompanying drawings.

Figure 19:
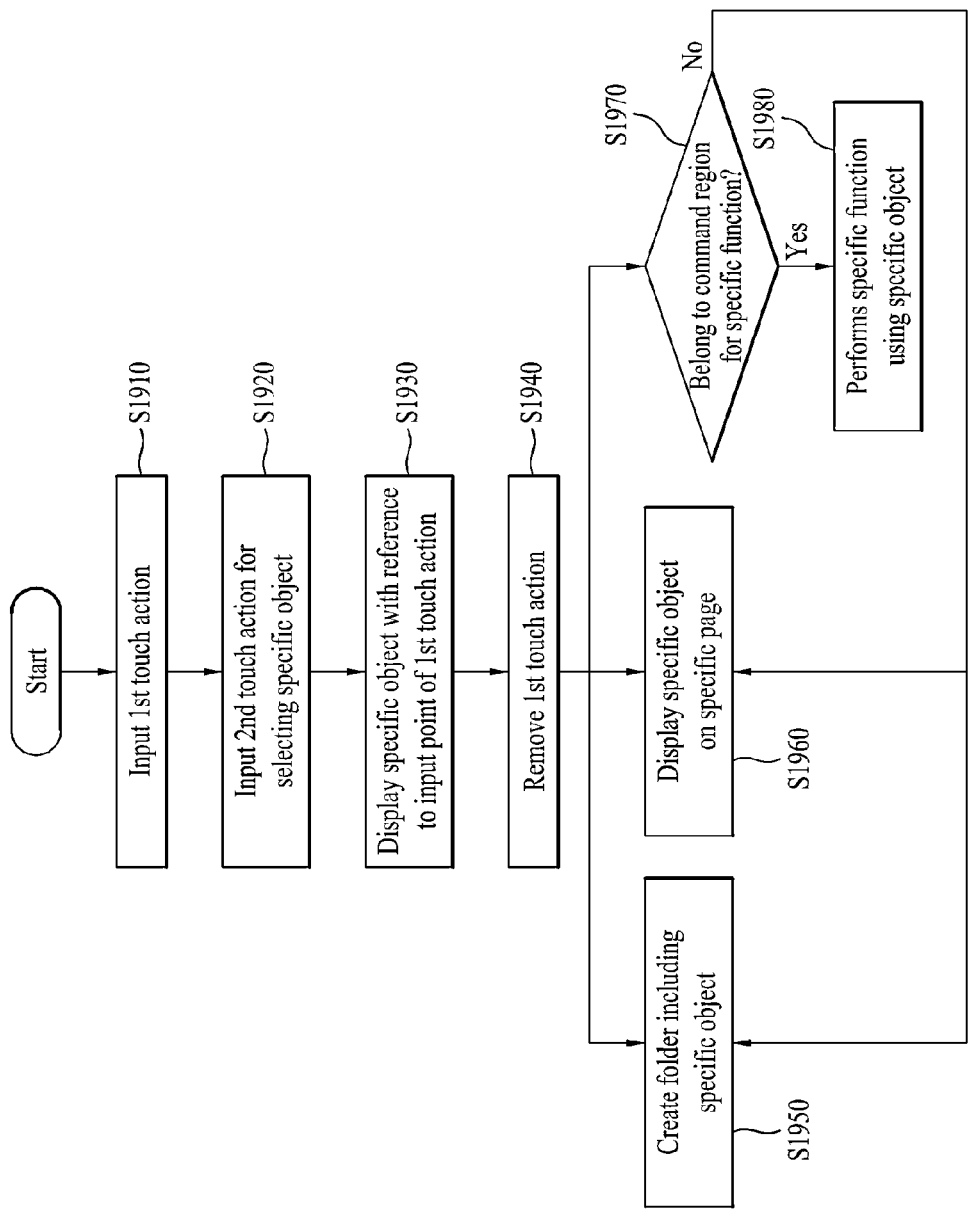
FIG. 19 is a $2^{nd}$ flowchart for a method of controlling a display in a mobile terminal according to one embodiment of the present invention.

FIG. 19 is a $2^{nd}$ flowchart for a method of controlling a display in a mobile terminal according to one embodiment of the present invention.

Referring to FIG. 19, the mobile terminal 100 may receive an input of a touch action on a prescribed point on a screen from a user using the touchscreen 151 [S1910].

In this case, the $1^{st}$ touch action may be non-limited by its type but is only requested to keep the touch to the touchscreen 151 continuously.

While the touch by the $1^{st}$ touch action is maintained, the mobile terminal 100 may receive an input of a $2^{nd}$ touch action for selecting a specific object from a plurality of objects displayed on the screen using the touchscreen 151 [S1920].

For instance, the $2^{nd}$ touch action may include a touch to a specific object (e.g., a predetermined touch duration or a predetermined touch count may be requested if necessary), a flocking action on a specific object, a touch & drag action starting with a prescribed point of a specific object to a touch point by the $1^{st}$ touch action.

Of course, the above-mentioned examples are just exemplary, by which a type of the $2^{nd}$ touch action may be non-limited of if performing a function of a specific object selection. Moreover, at least one or more specific objects may be selectable.

If a plurality of pages are configured, the mobile terminal 100 may shift a current page to a specific page to correspond to a touch action for a page turning, which is inputted by a user. The mobile terminal 100 may receive an input of a $2^{nd}$ touch action for selecting a specific object from a plurality of objects contained in a currently situated page.

While the touch by the $1^{st}$ touch action is maintained, under the control of the controller 180, the mobile terminal 100 may display the specific object selected by the $2^{nd}$ touch action with reference to the input point of the $1^{st}$ touch action (or a current touch point) [S1930].

In this case, the controller 180 may copy the specific object [Copy] and may display the copied specific object with reference to the input point of the $1^{st}$ touch action [Keep displaying the specific object among a plurality of the objects]. Moreover, the controller 180 may shift the specific object [Cut] and may display the shifted specific object with reference to the input point of the $1^{st}$ touch action [Stop displaying the specific object among a plurality of the objects].

If the specific object is displayed with reference to the input point of the $1^{st}$ touch action, it may mean one of the followings. First of all, the specific object is displayed at the input point of the 1st touch action. Secondly, the specific object is displayed on a display region created at the input point of the 1st touch action. Thirdly, the specific object is displayed as attached to the input point of the 1st touch action (e.g., similar to magnet and steel). Fourthly, if a plurality of specific objects exist, the specific objects are displayed at the input point of the 1st touch action in a manner of overlapping with each other. In particular, contents contained in the specific objects overlap with each other in part to be partially viewable. Fifthly, if a plurality of specific objects exist, the specific objects are displayed as if hung at the input point of the 1st touch action.

If the touch point by the 1st touch action is shifted, the specific object displayed with reference to the 1st touch action may be shifted together. Moreover, while the touch by the 1st touch action is maintained, if the page shift is performed, the specific object displayed with reference to the input point of the 1st touch action may be displayed on a shifted page as well.

If the 1st touch action is removed [S1940], under the control of the controller 180, the mobile terminal may create a folder containing the specific object displayed with reference to the input point of the 1st touch action [S1950]. The created folder may be saved in the memory 160.

In particular, if the specific object is an audio file item (or a video file item), a corresponding audio file (or a corresponding video file) may be contained in the created folder. If the specific object is a message item, a corresponding message may be contained in the created folder. If the specific object is a counterpart item (e.g., name, nickname, etc.) contained in a contact list, corresponding counterpart information (i.e., name, nickname, phone number, email address, blog address, etc.) may be contained in the created folder.

If the 1st action is removed [S1940], under the control of the controller 180, the mobile terminal 100 may display the specific object, which is displayed with reference to the input point of the 1st touch action, on a specific page [S1960].

In this case, the specific page may include a currently displayed page or a page at which a specific one (e.g., specific object selected first or last) of the specific objects displayed with reference to the input point of the 1st touch action is situated.

A process for displaying a specific object with reference to the input point of the 1st touch action may be described in detail with reference to the accompanying drawings as follows.

FIGS. 20A to 20E are diagrams for displaying a specific image selected with reference to an input point of a 1st touch action, while a photo album application is activated, according to the present invention. For clarity and convenience of the following description, assume that an image is a specific object.

Figure 20A:
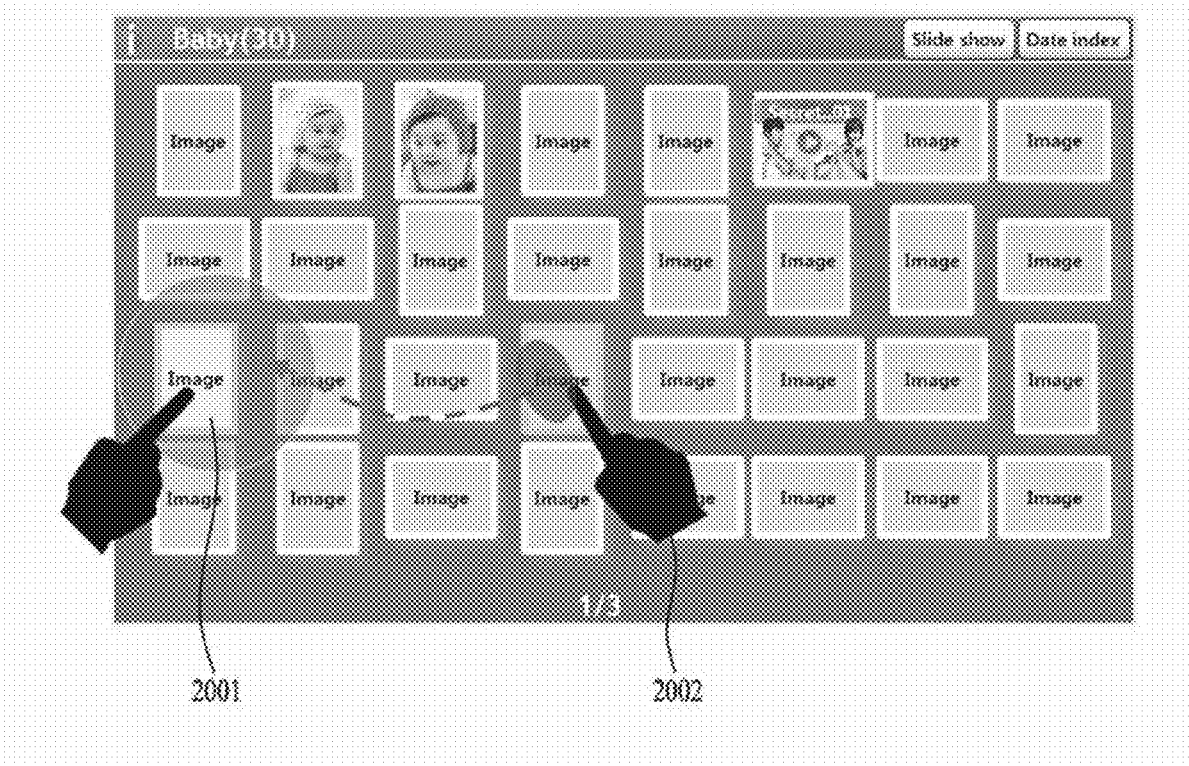
FIGS. 20A to 20E are diagrams for displaying a specific image selected with reference to an input point of a $1^{st}$ touch action, while a photo album application is activated, according to the present invention.
Figure 20B:
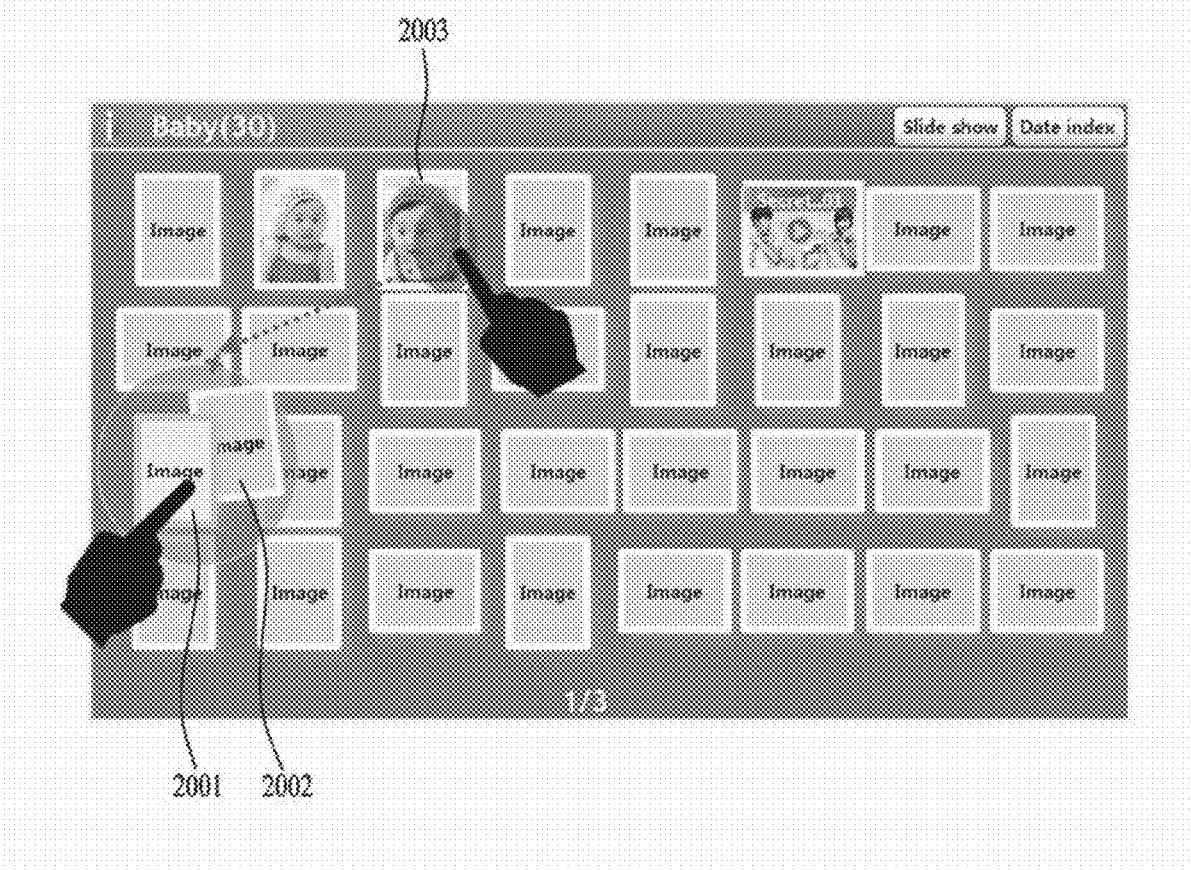

Referring to FIG. 20A and FIG. 20B, after a 1st touch action has been inputted to a prescribed point on a screen, while the 1st touch action is maintained, if a 2nd touch action is inputted, a 2nd image 2002 and a 3rd image 2003 may be selected in the mobile terminal 100.

For instance, if the prescribed point belongs to a 1st image 2001, the 1st image 2001 may be selected as a specific image without inputting a 2nd touch action separately. In this case, the 2nd touch action may include a touch & flicking action on an image to select.

Figure 20C:
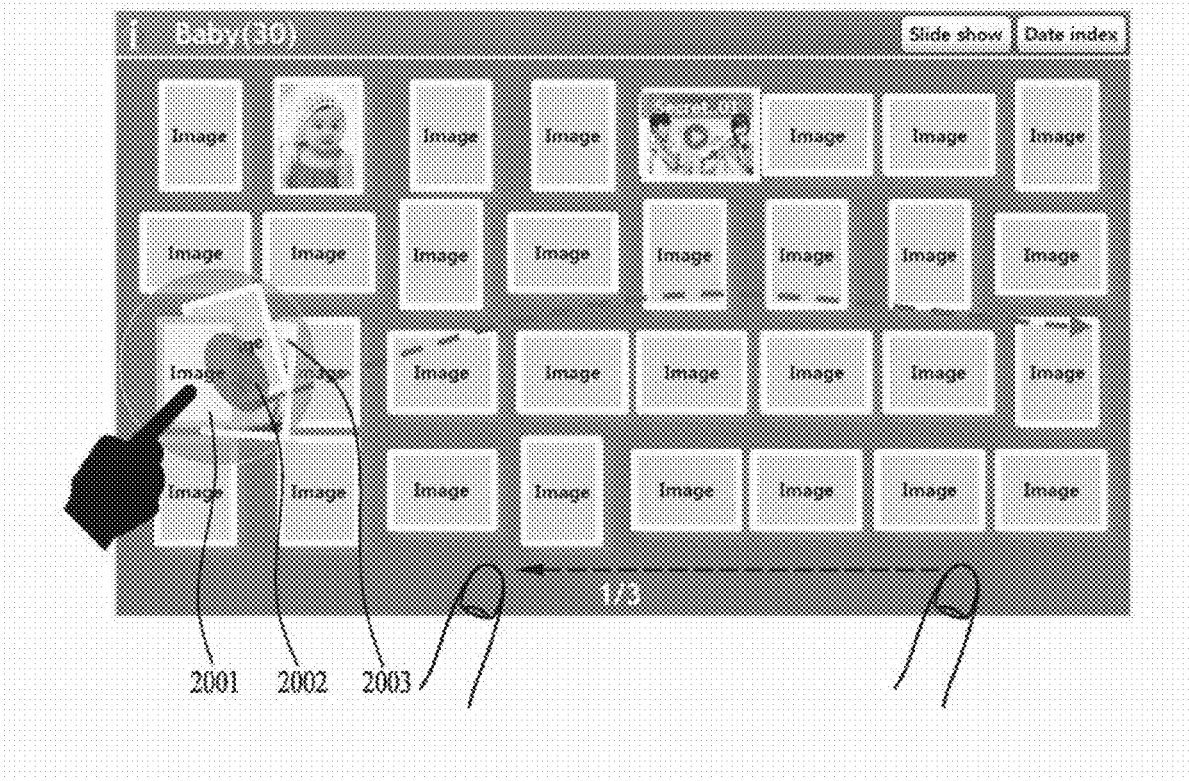

Moreover, the 1st to 3rd images 2001 to 2003 may be displayed in a manner of overlapping with each other in part by being attached to a touch point of the 1st touch action [cf. FIG. 20C].

Figure 20D:
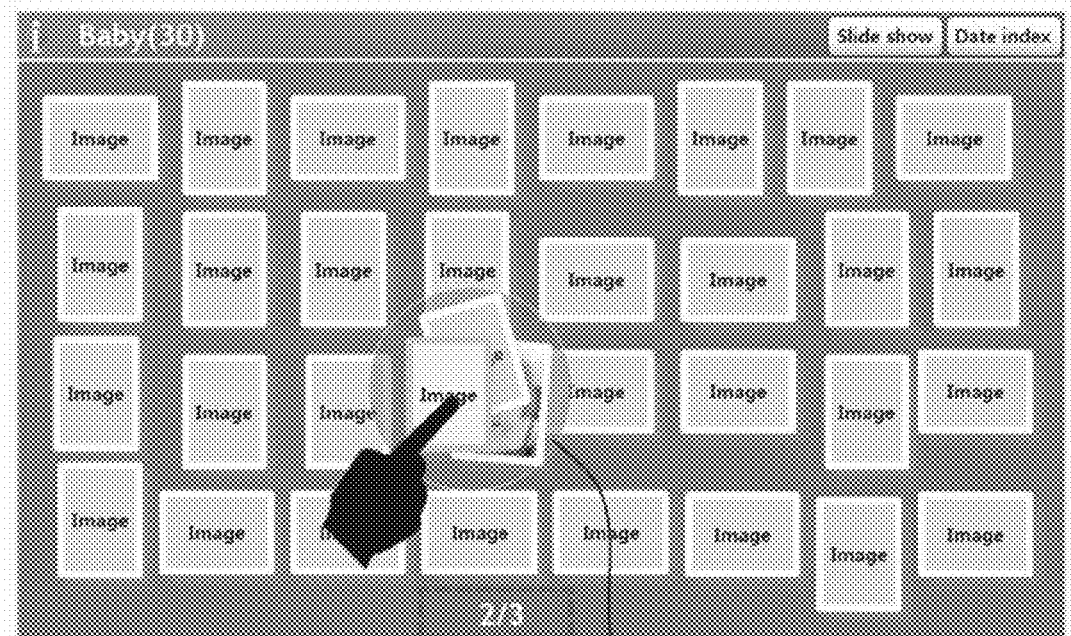

Referring to FIG. 20C and FIG. 20D, while a 1st touch action is maintained, the mobile terminal 100 may receive an input of a touch action for a page shift using a different finger and may be then able to display 1st to 3rd images 2010 with reference to the touch point of the 1st touch action. Moreover, the touch action for the page shift may include an action performed in a manner of shifting the touch point of the 1st touch action to an edge of the touchscreen and then maintaining the touch for predetermined duration.

Figure 20E:
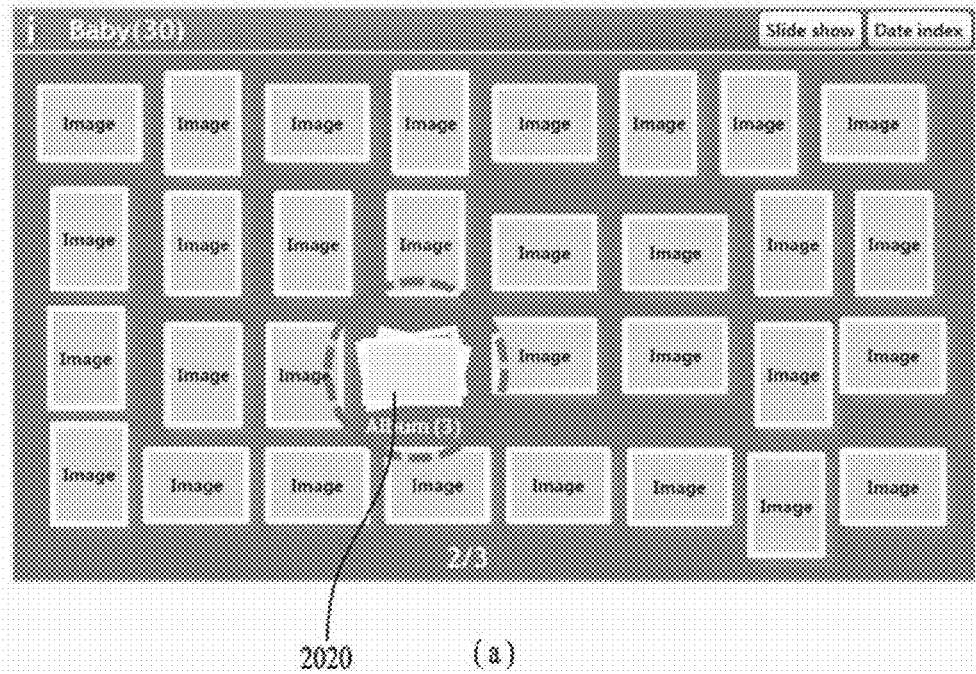
Figure 20E:
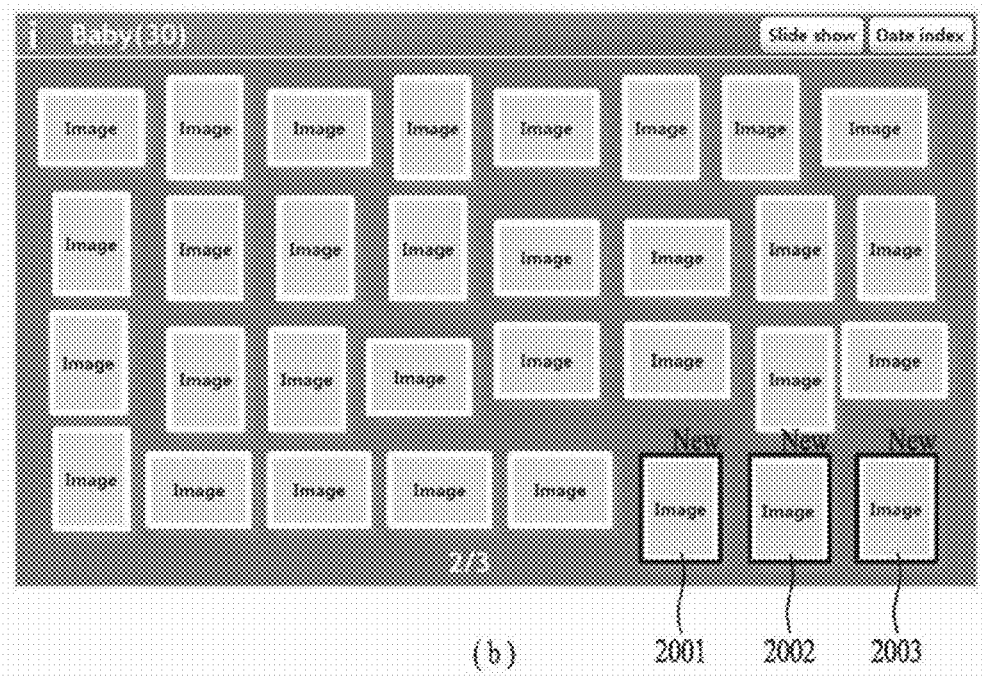

Referring to FIG. 20E, if the 1st touch action is removed in FIG. 20D, the mobile terminal 100 may create a folder containing the 1st to 3rd images 2001 to 2003 and may then display an indicator 2020 of the created folder on a currently situate page [FIG. 20E (a)]. Alternatively, the mobile terminal 100 may display the 1st to 3rd image 2001 to 2003 on the currently situated page [FIG. 20E (b)].

Alternatively, the mobile terminal 100 may display the folder indicator 2020 or the 1st to 3rd images 2001 to 2003 at the touch point on removing the 1st touch action or at a previously designated point.

Figure 21A:
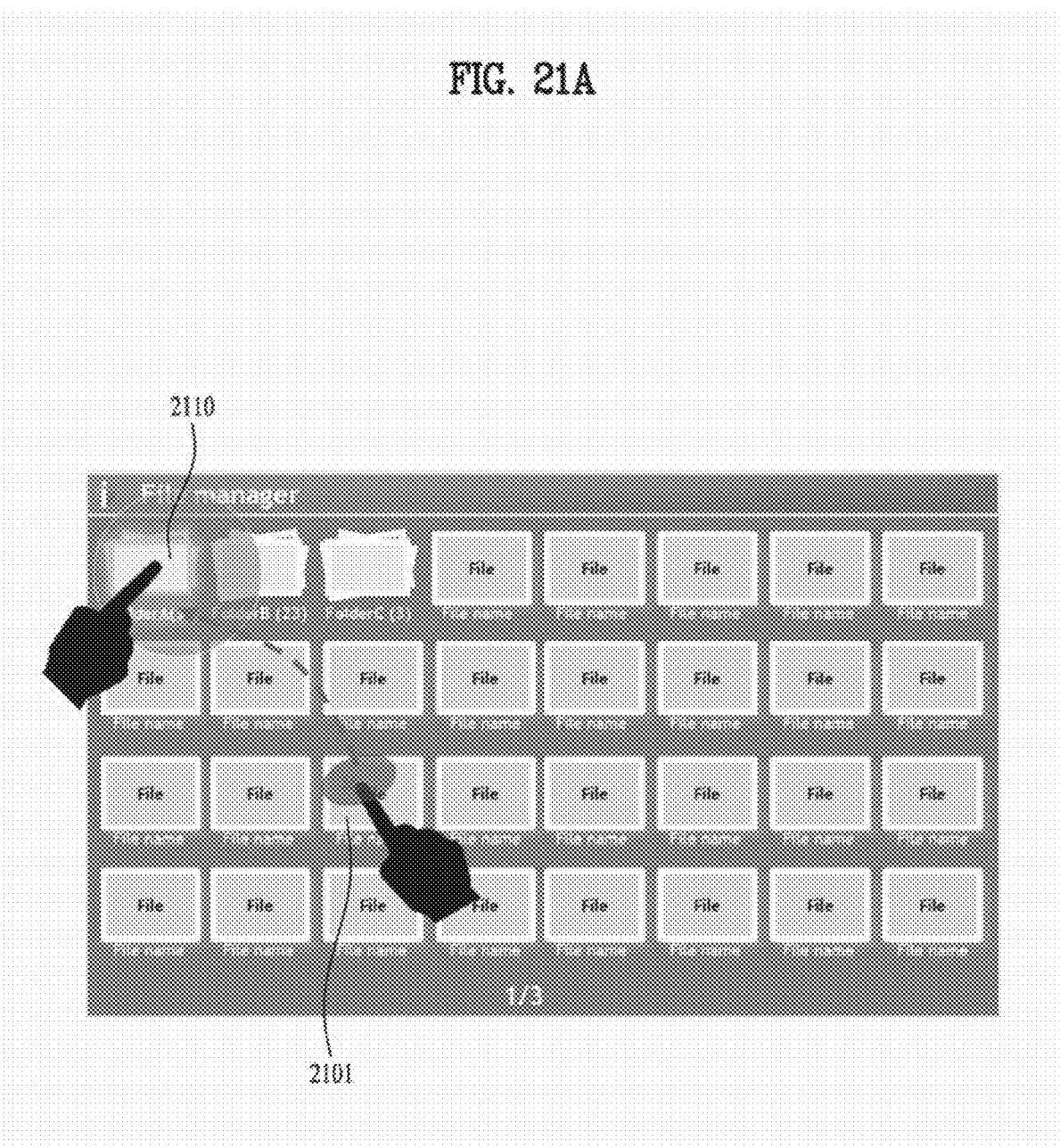
FIGS. 21A to 21C are diagrams for displaying a file indicator selected with reference to an input point of a $1^{st}$ touch action, while a folder management application is activated, according to the present invention.
Figure 21B:
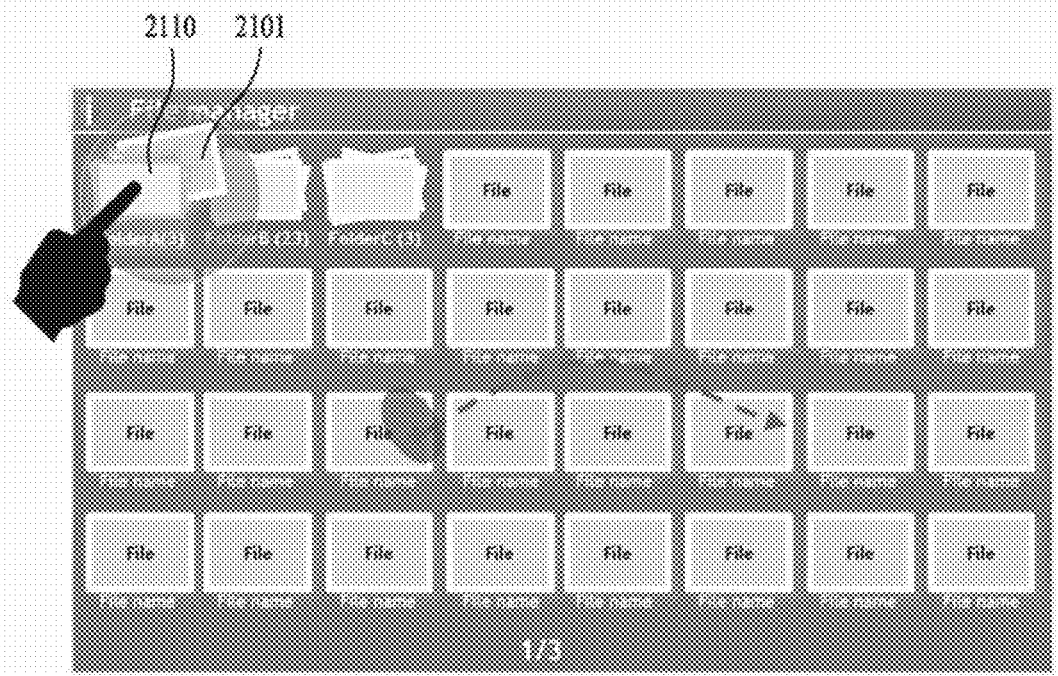
Figure 21B:
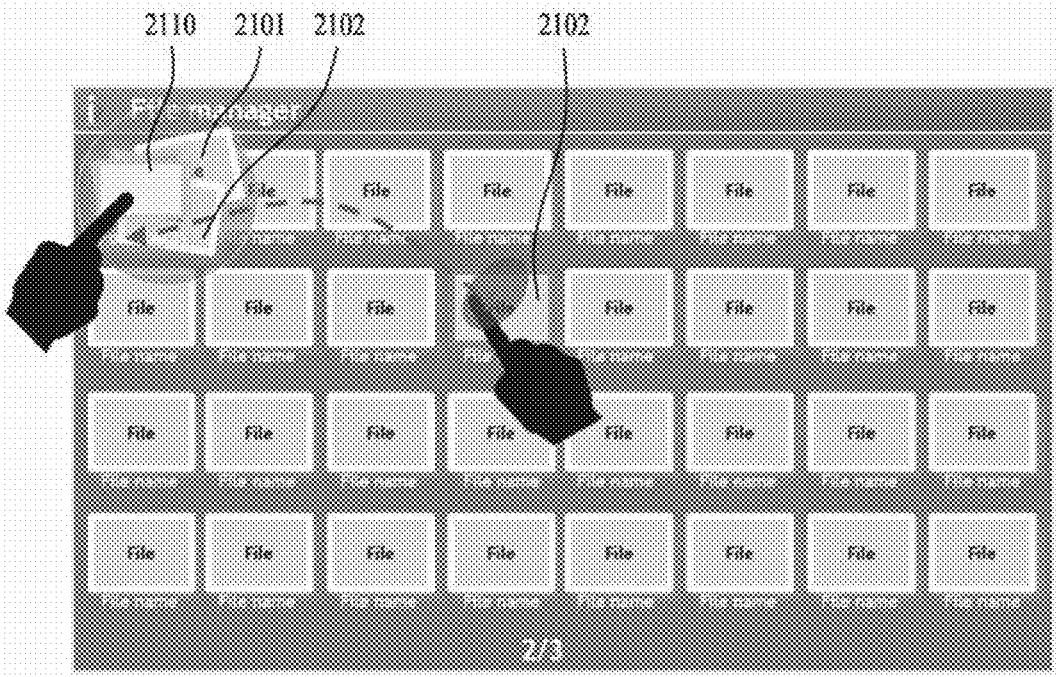
Figure 21C:
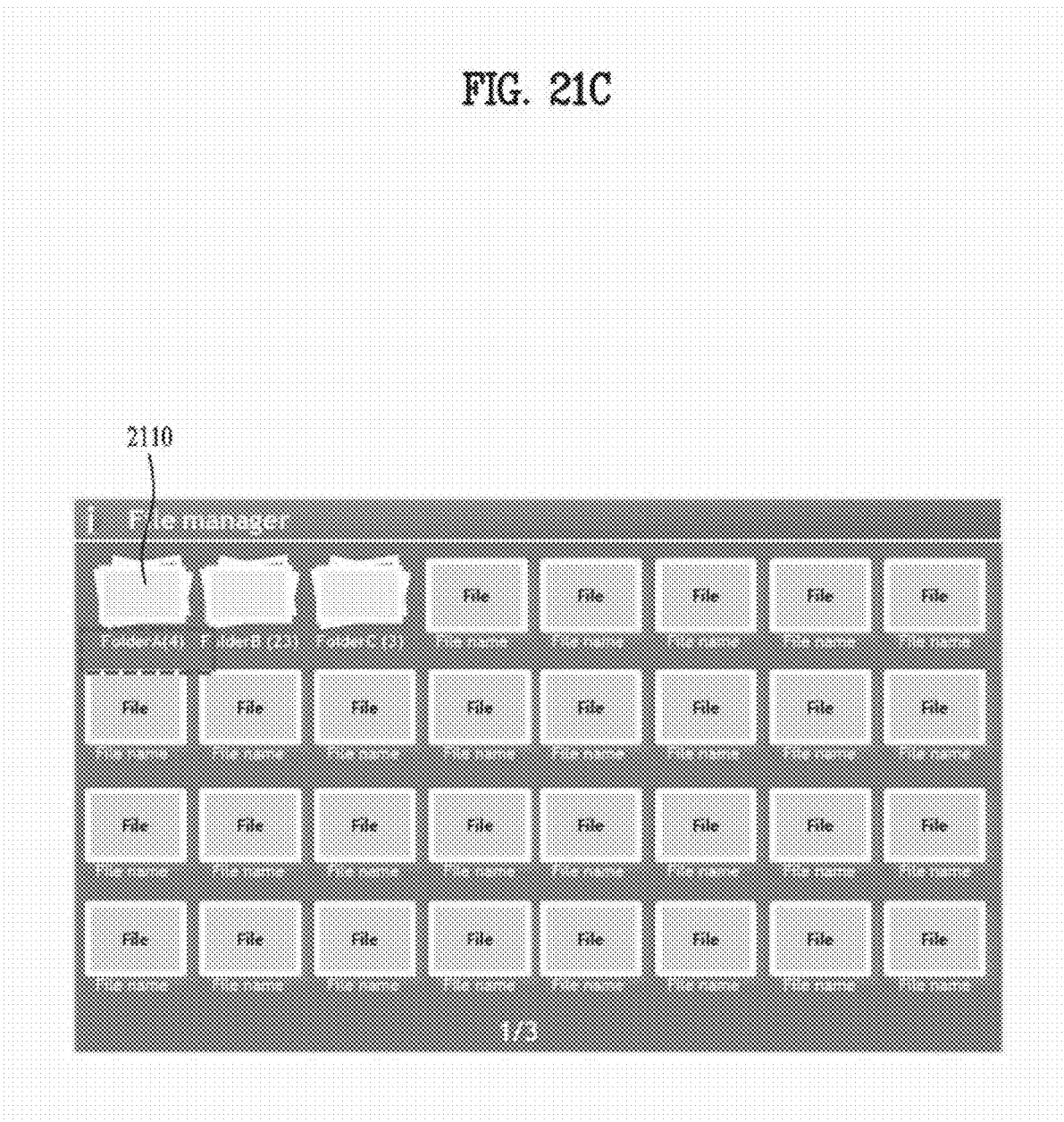

FIGS. 21A to 21C are diagrams for displaying a file indicator selected with reference to an input point of a 1st touch action, while a folder management application is activated, according to the present invention. For clarity and convenience of the following description, assume that a file indicator is a specific object. Assume that the file indicator indicates a specific file. And, assume that a folder indicator indicates a folder containing at least one file.

Referring to FIG. 21A, while a plurality of folder indicators and a plurality of files are displayed, the mobile terminal 100 may receive an input of a 1st touch action on a specific folder indicator 2110. While the 1st touch action is maintained, the mobile terminal 100 may receive an input of a touch & drag action (i.e., example of 2nd touch action) starting with a 1st file indicator 2101 to the specific folder indicator 2110.

Referring to FIG. 21B, the mobile terminal 100 may display the 1st file indicator with reference to the touch point of the 1st touch action [FIG. 21B (a)]. In case of receiving an input of a touch action for a page shift, the mobile terminal 100 may receive an input of a touch & drag action starting with a 2nd file indicator 2102 displayed on the shifted page to the specific folder indicator 2110 [FIG. 21B (b)]. Hence, the 1st and 2nd file indicators 2101 and 2102 may be displayed at the touch point of the 1st touch action.

Referring to FIG. 21C, if the 1st touch action is removed in FIG. 21B (b), the specific file indicator 2110 may return to an originally situated page. The mobile terminal 100 may be then able to display the specific folder indicator 2110 indicating that a 1st file indicated by the 1st file indicator 2101 and a 2nd file indicated by the 2nd file indicator 2102 are contained in the specific folder.

For instance, it may be indicated that the number of files contained in the specific folder indicator 2110 is incremented from 2 to 4. Moreover, if the specific folder indicator 2110 is selected, it may be checked that the 1st and 2nd files are contained in the specific folder indicated by the specific folder indicator 2110.

Of course, if the 1st touch action is removed, the specific folder indicator 2110 may be displayed on the currently situated page.

FIGS. 22A to 22D are diagrams for displaying a specific application indicator selected with reference to an input point of a 1$^{st}$ touch action in the course of editing application indicators according to the present invention. For clarity and convenience of the following description, assume that an application indicator includes a specific object.

Referring to FIG. 22A, the mobile terminal 100 may receive an input of a 1$^{st}$ touch action on a prescribed point on a screen. The mobile terminal 100 may be then able to receive an input of a flicking action (i.e., example of 2$^{nd}$ touch action) on a specific application indicator 2202 among a plurality of application indicators displayed on a currently situated page.

For instance, if a 1$^{st}$ application indicator 2201 is situated at a point to which the 1$^{st}$ touch action is inputted, the 1$^{st}$ application indicator 2201 may be selectable without a separate input of a 2$^{nd}$ touch action for selecting the 1$^{st}$ application indicator 2201.

Figure 22B:
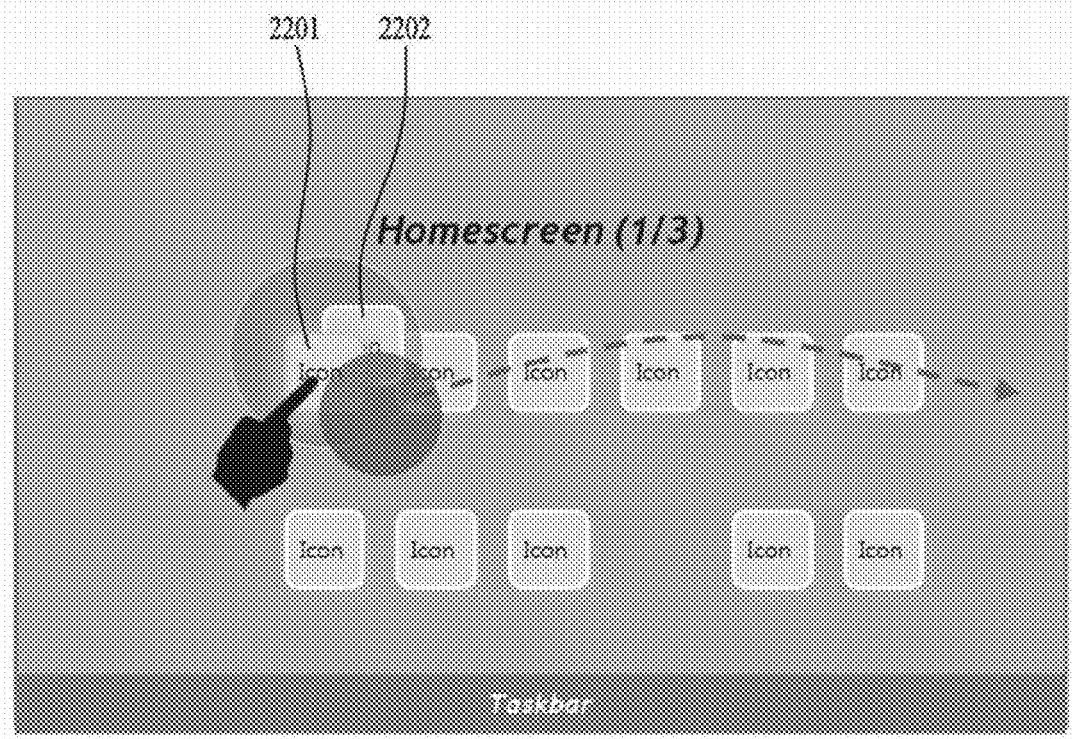

Hence, the 1$^{st}$ and 2$^{nd}$ application indicators 2201 and 2202 may be displayed at the input point of the 1$^{st}$ touch action [cf. FIG. 22B].

Figure 22C:
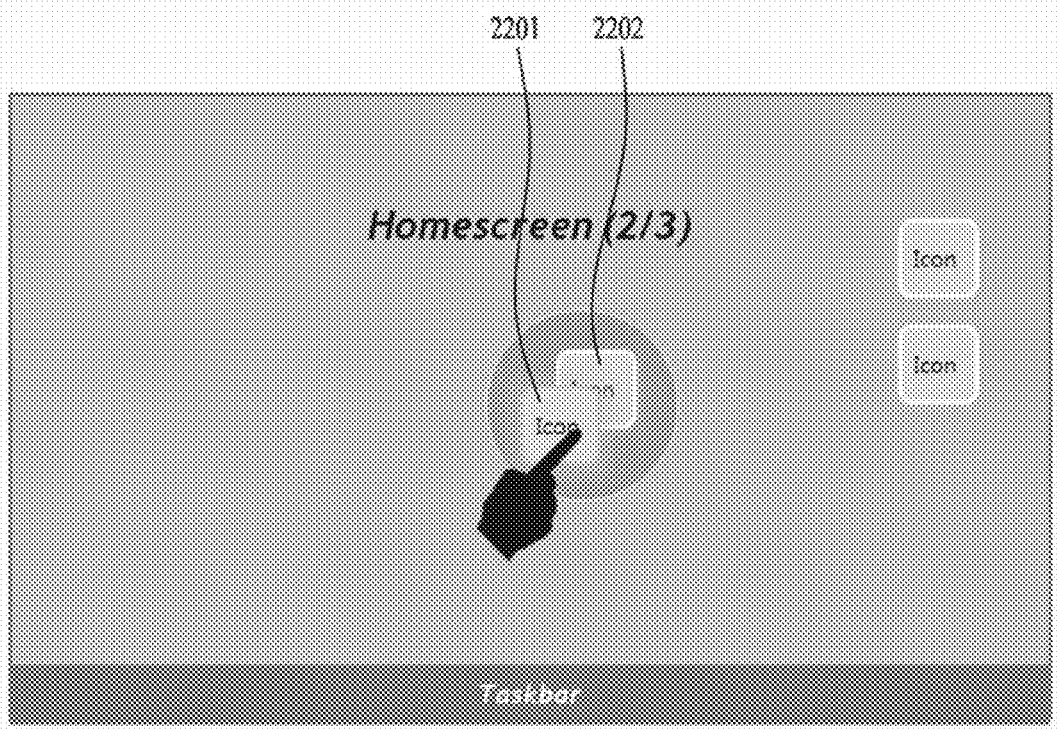

Referring to FIG. 22B and FIG. 22C, while the 1$^{st}$ touch action is maintained, if a touch action for a page shift is inputted, the mobile terminal 100 may perform the page shift to correspond to the inputted touch action and may be then able to display the 1$^{st}$ and 2$^{nd}$ application indicators 2201 and 2202 on the shifted page with reference to the touch point of the 1$^{st}$ touch action.

Figure 22D:
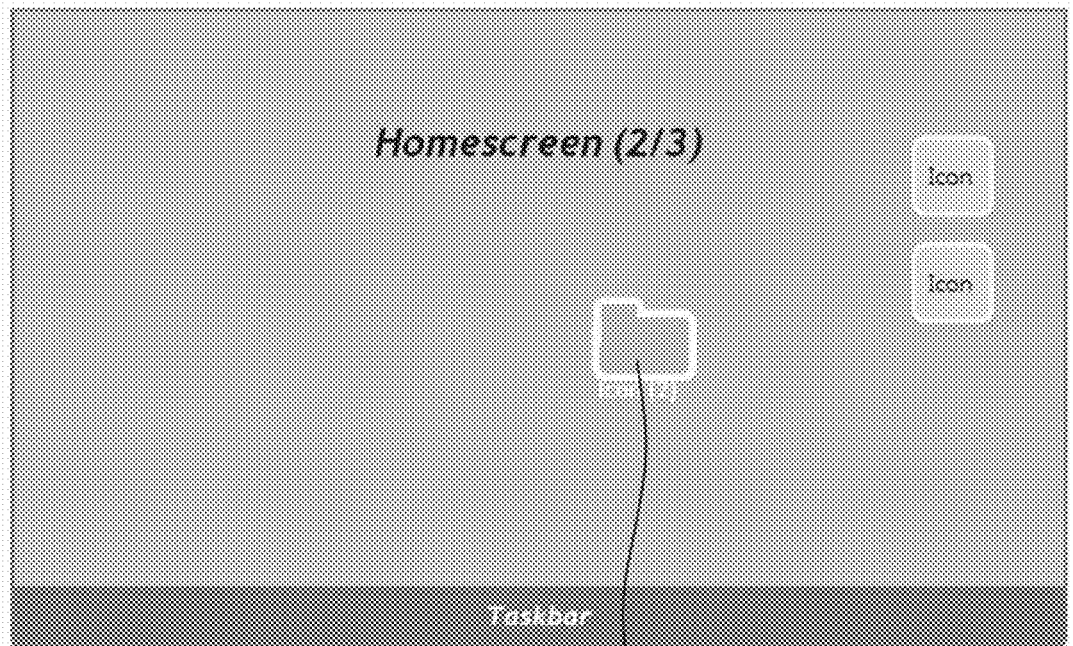

Referring to FIG. 22D, if the 1$^{st}$ touch action is removed, the mobile terminal 100 may create a folder containing the 1$^{st}$ and 2$^{nd}$ application indicators 2201 and 2202 and may display a folder icon 2210 corresponding to the created folder on a currently situated page. Hence, if a user selects the folder icon 2210, the mobile terminal 100 may display the 1$^{st}$ and 2$^{nd}$ application indicators 2201 and 2202 on the screen.

FIGS. 23A to 23F are diagrams for displaying a text selected as a memo content with reference to an input point of a 1$^{st}$ action according to the present invention. For clarity and convenience of the following description, assume that a text includes a specific object.

Figure 23A:
FIGS. 23A to 23F are diagrams for displaying a text selected as a memo content with reference to an input point of a $1^{st}$ action according to the present invention.

Referring to FIG. 23A, while a file including a text is outputted, if a 1$^{st}$ touch action is inputted to a prescribed point on a screen, the mobile terminal 100 may create a region 2310 (hereinafter named a memo input region) for inputting a memo content at an input point of the 1$^{st}$ touch action.

For instance, if the input point of the 1$^{st}$ touch action belongs to a 1$^{st}$ text region 2301, a text corresponding to the 1$^{st}$ text region 2301 may be automatically selected as a memo text. And, the text corresponding to the 1$^{st}$ text region 2301 may be displayed on the memo input region 23120.

Figure 23B:
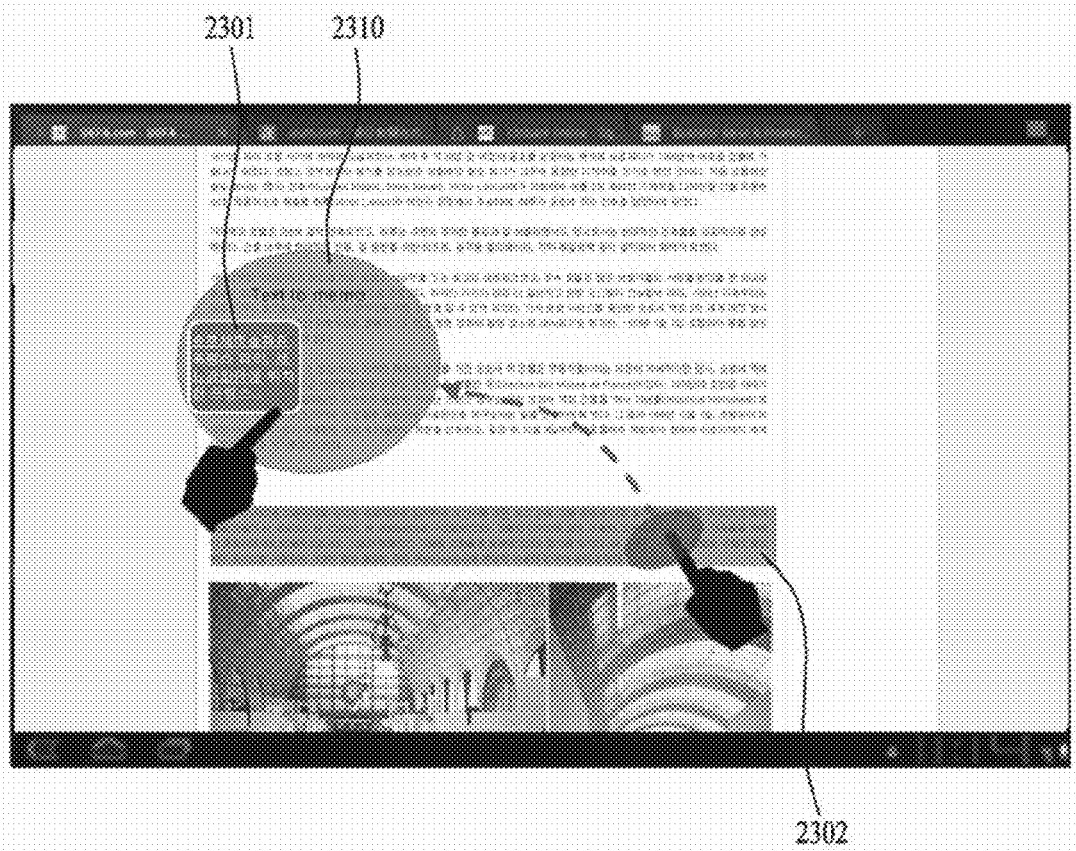
Figure 23C:
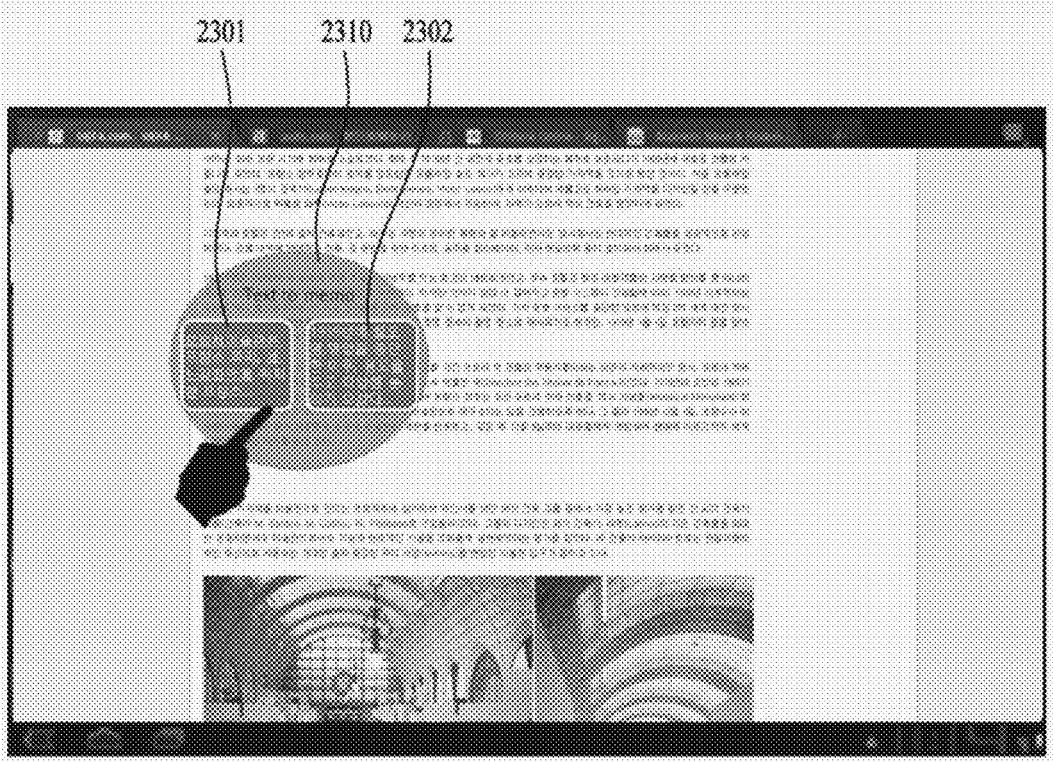

Referring to FIG. 23B and FIG. 23C, while the 1$^{st}$ touch action is maintained, in case of receiving an input of a touch & drag action (i.e., example of 2$^{nd}$ touch action) starting with a 2$^{nd}$ text region 2302 to the memo input region 2310, the mobile terminal 100 may display a text corresponding to the 2$^{nd}$ text region 2302 on the memo input region 2310.

Figure 23D:
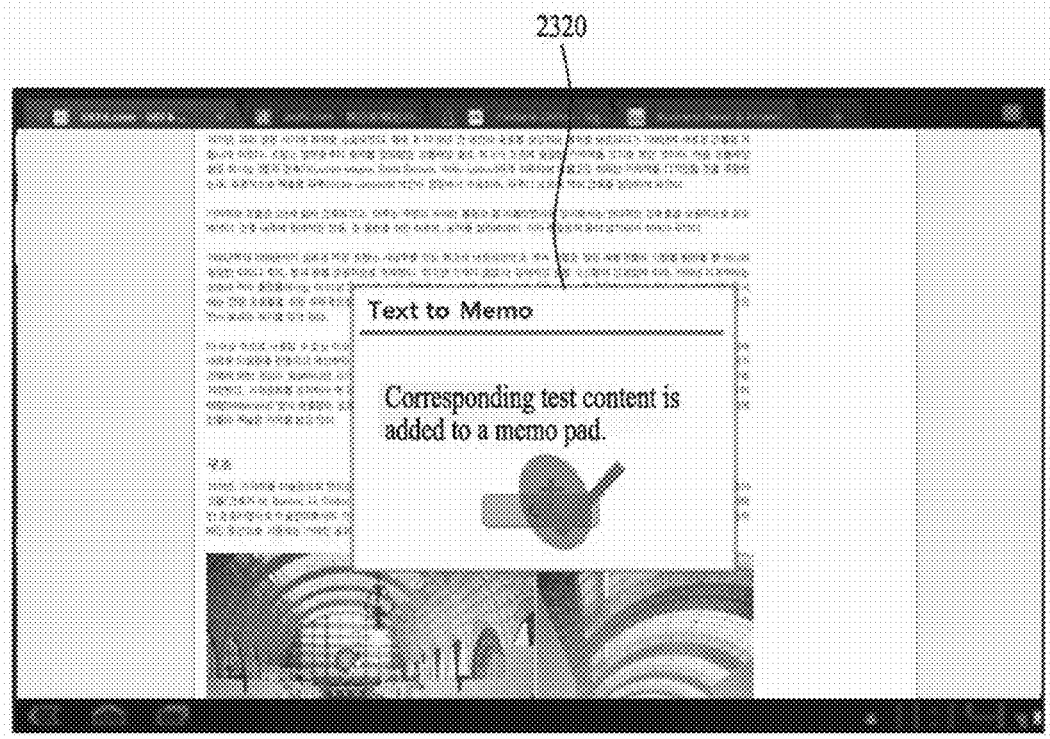

Referring to FIG. 23D, if the 1$^{st}$ touch action is removed, the mobile terminal 100 may add texts contained in the memo input region 2310 to a memo pad and may output an information 2320 indicating that the texts are added to the memo pad.

Figure 23E:
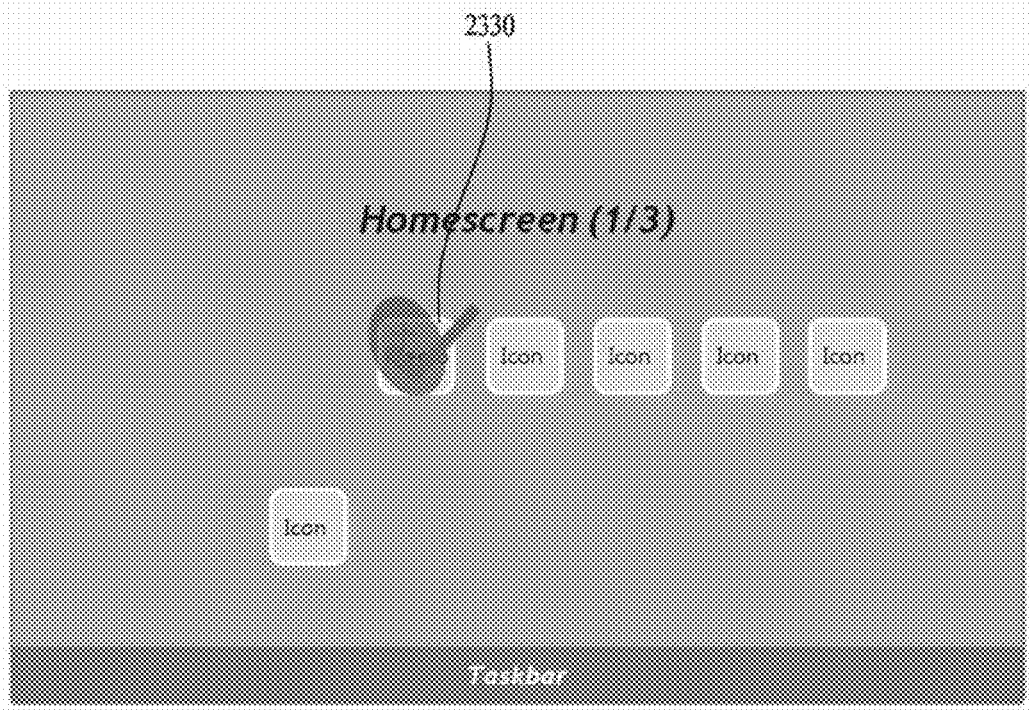

Referring to FIG. 23E, the mobile terminal 100 displays an application indicator 2330 (hereinafter named a memo indicator) indicating a memo application on the screen and may then receive an input of a selection action on the memo indicator 2330 from a user.

Figure 23F:
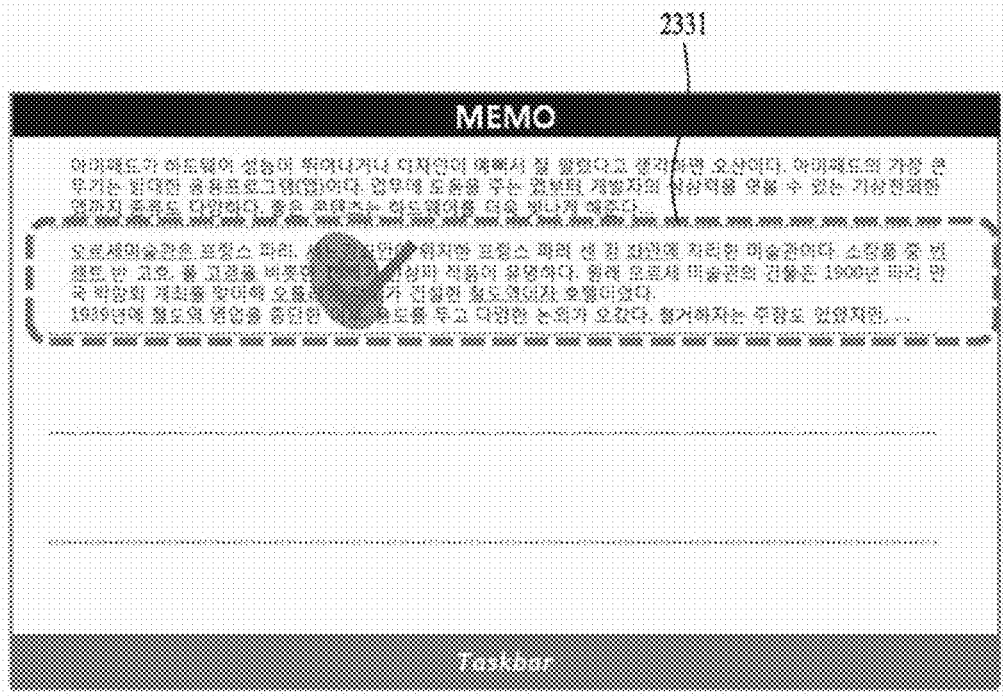
Figure 23F:
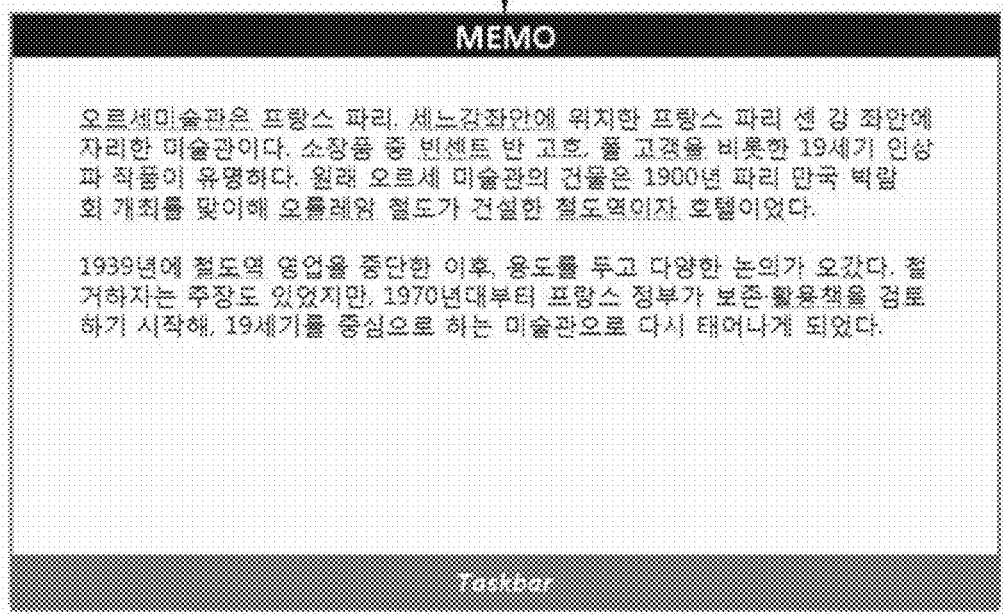

Referring to FIG. 23F, if the memo indicator 2330 is selected, the mobile terminal 100 may activate the memo application and may be able to check the texts corresponding to the added 1$^{st}$ and 2$^{nd}$ text regions 2301 and 2302. Moreover, in the case of receiving an input of a selection action on a specific memo part 2331 from a user, the mobile terminal 100 may be able to provide whole contents corresponding to the specific memo part 2331.

Figure 24A:
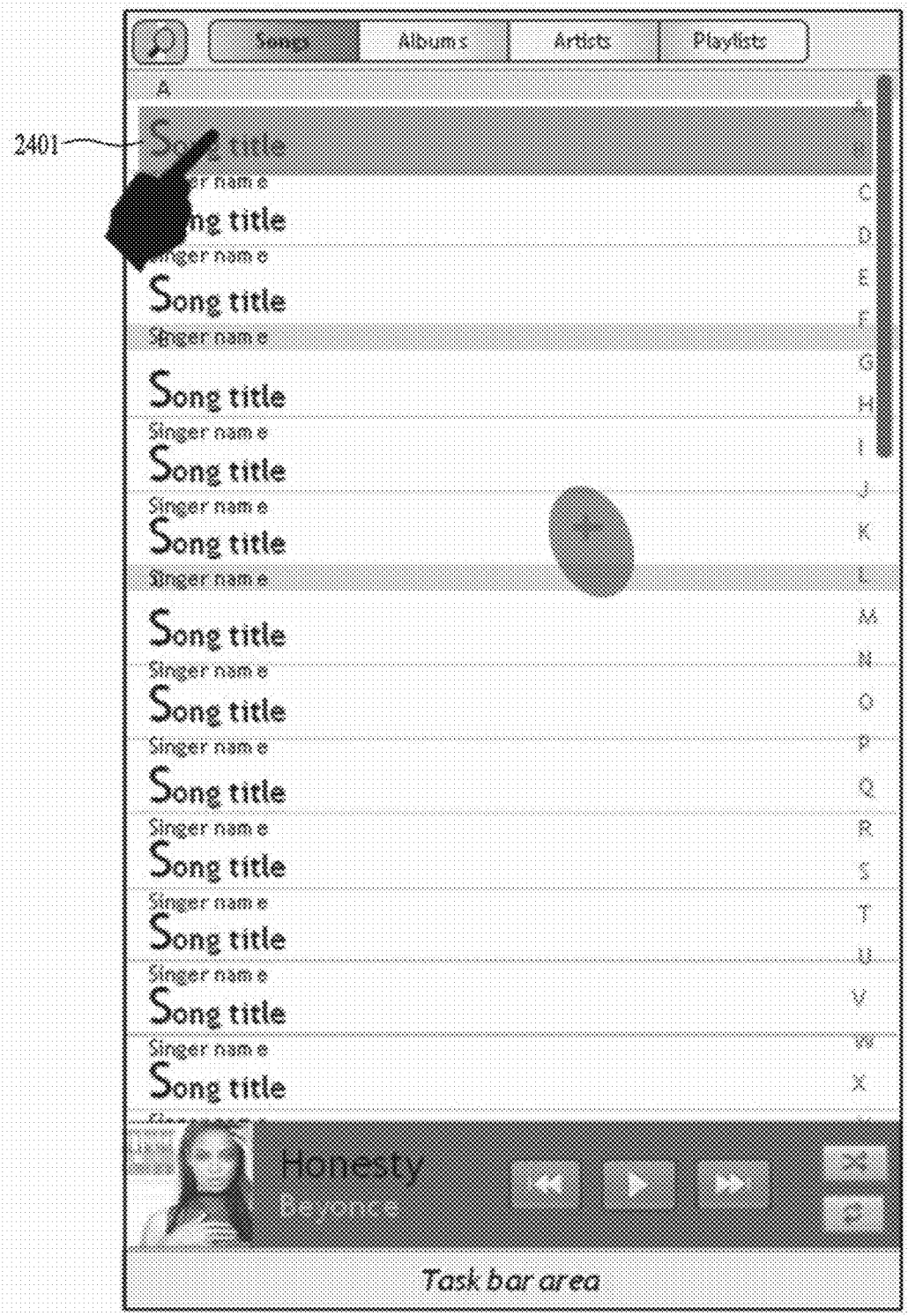
FIGS. 24A to 24C are diagrams for displaying an audio file item selected with reference to an input point of a $1^{st}$ touch action, while an audio play application is activated, according to the present invention.
Figure 24B:
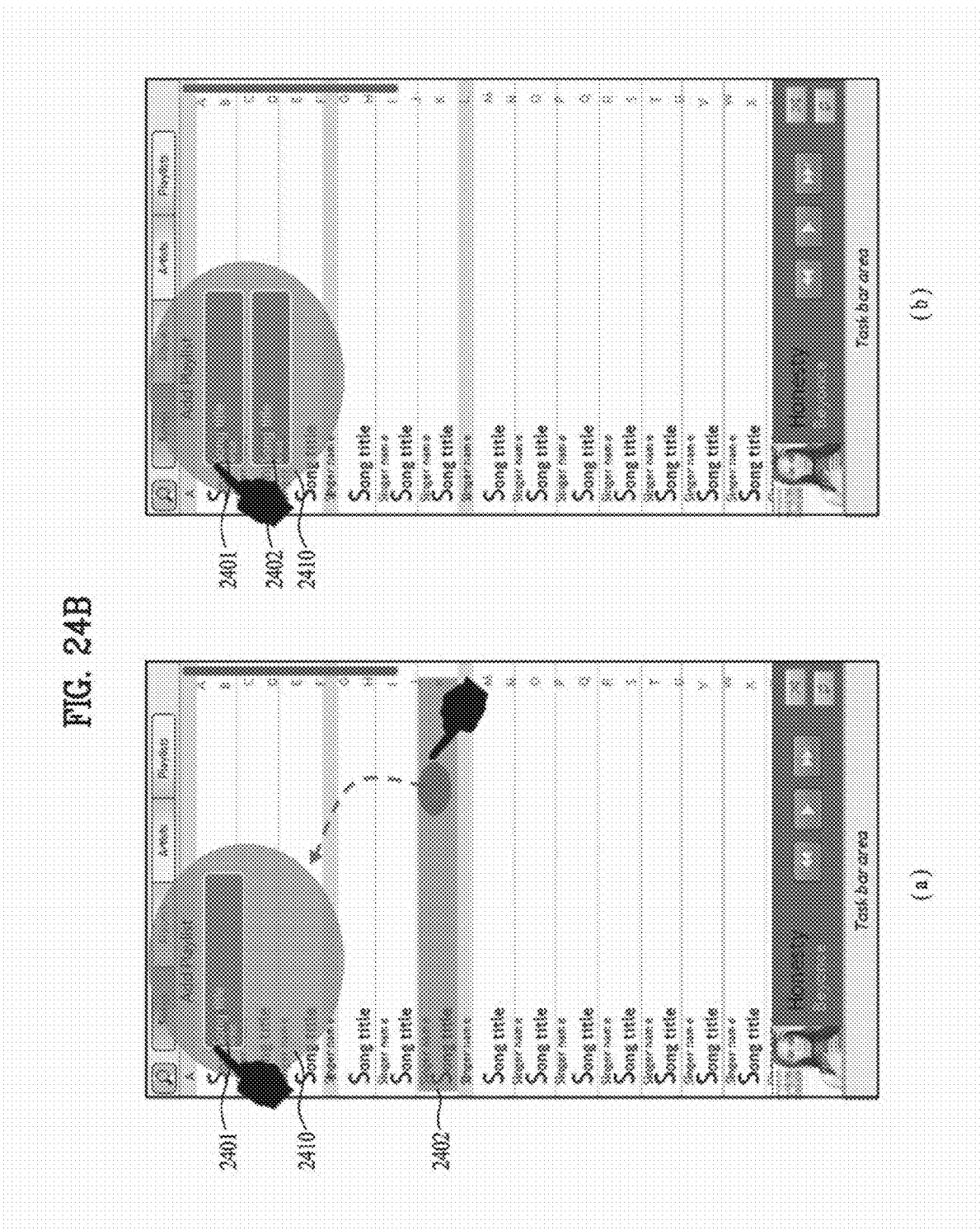
Figure 24C:
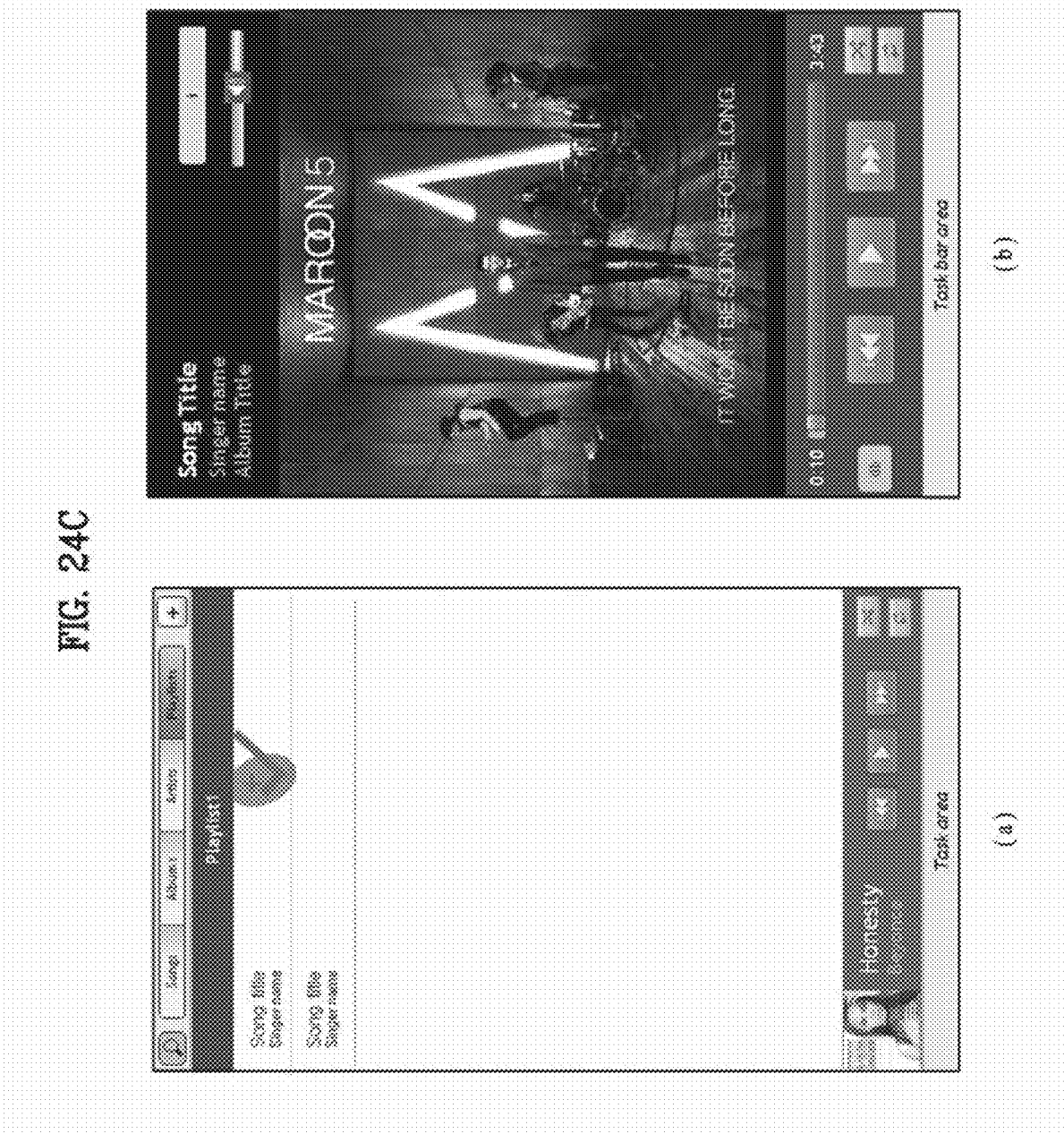

FIGS. 24A to 24C are diagrams for displaying an audio file item selected with reference to an input point of a 1$^{st}$ touch action, while an audio play application is activated, according to the present invention. For clarity and convenience of the following description, assume that an audio file item includes a specific object.

Referring to FIG. 24A, while an audio file list containing a plurality of audio file items is displayed, the mobile terminal 100 may be able to receive an input of a 1$^{st}$ touch action on a 1$^{st}$ audio file item 2401 and may be then able to select the 1$^{st}$ audio file item 2401 without receiving a separate input of a 2$^{nd}$ touch action on the 1$^{st}$ audio file item 2401.

Referring to FIG. 24B, in case of receiving the 1$^{st}$ touch action, the mobile terminal 100 may display a play list add region 2410 at the input point of the 1$^{st}$ touch action and may be then able to display the 1$^{st}$ audio file item 2401 on the play list add region 2410.

Moreover, while the 1$^{st}$ touch action is maintained, the mobile terminal 100 may receive an input of a touch & drag action (example of 2$^{nd}$ touch action) starting with a 2$^{nd}$ audio file item 2402 to the play list add region 2410 and may be then able to further display the 2$^{nd}$ audio file item 2402 on the play list add region 2410.

Referring to FIG. 24C, if the 1$^{st}$ touch action is removed, the mobile terminal 100 may create a play list containing 1$^{st}$ and 2$^{nd}$ audio files respectively indicated by the 1$^{st}$ and 2$^{nd}$ audio file items 2401 and 2402 displayed on the play list add region 2410 and may be then able to display the created play list on the screen.

In particular, if a specific audio file item is selected from the created play list, the mobile terminal 100 may be able to play a specific audio file indicated by the selected audio file item.

Referring now to FIG. 19, if the touch by the 1$^{st}$ touch action is removed, under the control of the controller 180, the mobile terminal 100 determines whether the input point of the 1$^{st}$ touch action belongs to a command region for a specific function [S1970].

In case of determining that the input point of the 1$^{st}$ touch action belongs to the command region for the specific function, under the control of the controller 180, the mobile terminal 100 performs the specific function using a specific object selected by a 2$^{nd}$ touch action [S1980].

For instance, the command region for the specific function may include a region for receiving an input of a message reception counterpart in a message writing mode and the specific object may include at least one counterpart information. If the 1$^{st}$ touch action is removed, the controller 180 may set the at last one counterpart information as the message reception counterpart. And, the at least one counterpart information may be displayed on the region for receiving an input of the message reception counterpart.

For instance, the command region for the specific function may include a file delete region and the specific object may include at least one file. If the 1$^{st}$ touch action is removed, the controller 180 may be able to delete the at least one file.

For instance, the command region for the specific function may include a file attach region in an email write mode and the specific object may include at least one file. If the 1$^{st}$ touch action is removed, the controller 180 may set the at least one file as an attachment file of a currently written email and may be then able to display an indicator of the at least one file on the file attach region.

On the contrary, in case of determining that the input point of the 1$^{st}$ touch action does not belong to the command region for the specific function, under the control of the controller 180, the mobile terminal 100 may be able to execute the step S1950 or the step S1960.

Regarding the case that the 1$^{st}$ touch action belongs to the command region for the specific function, the following description may be made with reference to the accompanying drawings.

FIGS. 25A to 25F are diagrams for displaying an address, which is selected if an input point of a 1$^{st}$ touch action belongs to a command region for an address search, while a map application is activated, according to the present invention.

Figure 25A:
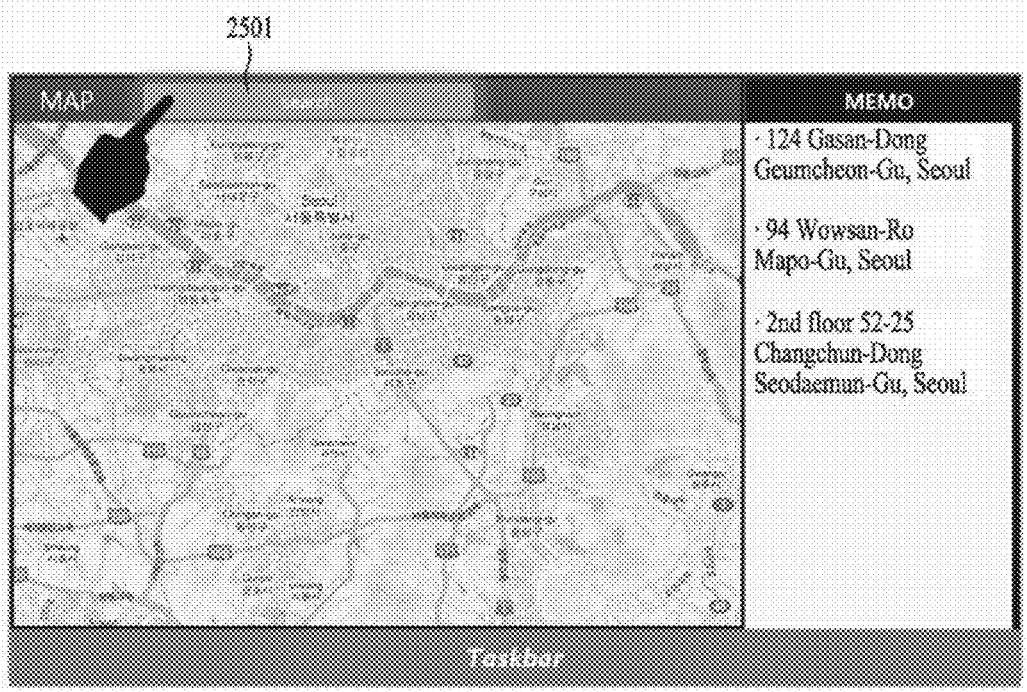
FIGS. 25A to 25F are diagrams for displaying an address, which is selected if an input point of a $1^{st}$ touch action belongs to a command region for an address search, while a map application is activated, according to the present invention.
Figure 25B:
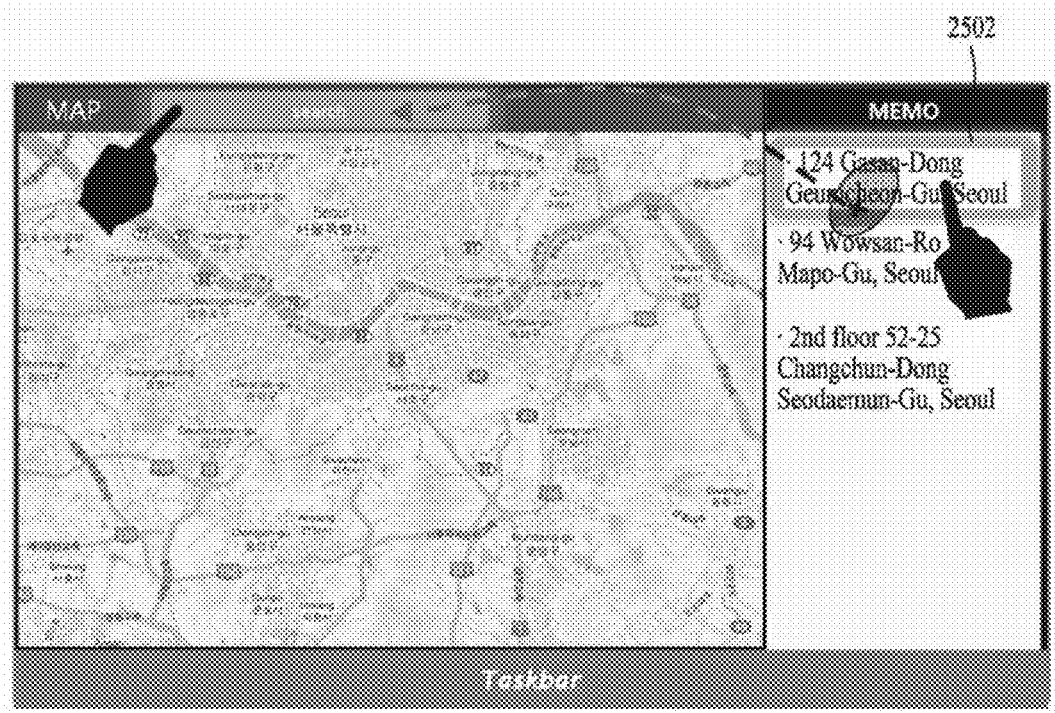
Figure 25C:
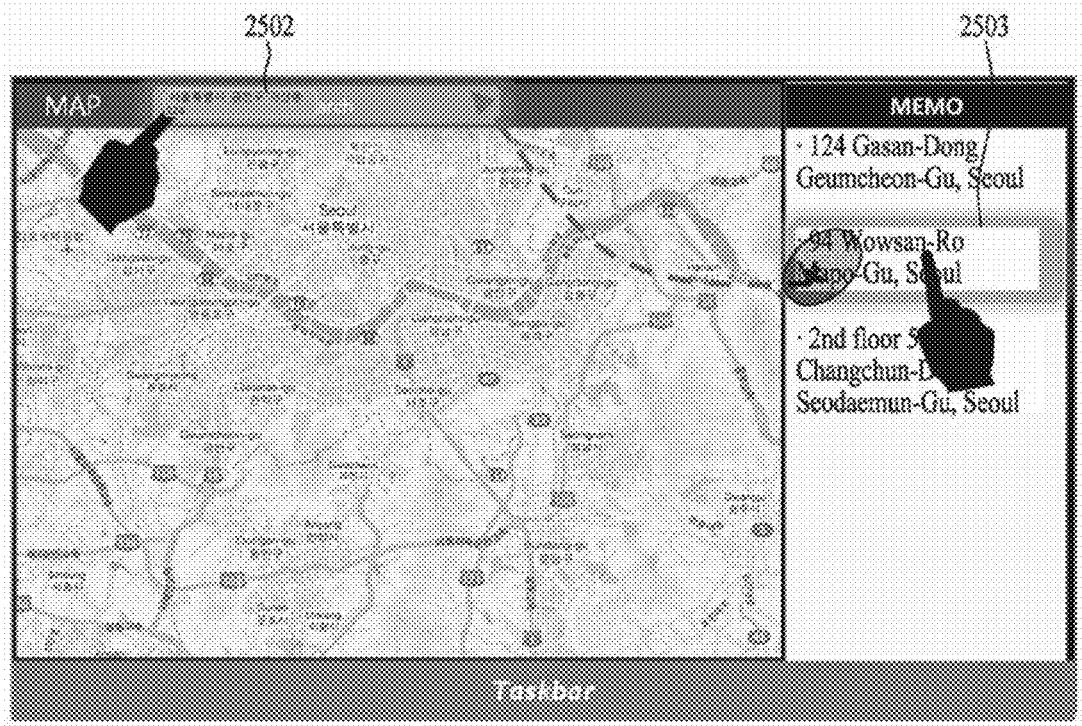
Figure 25D:
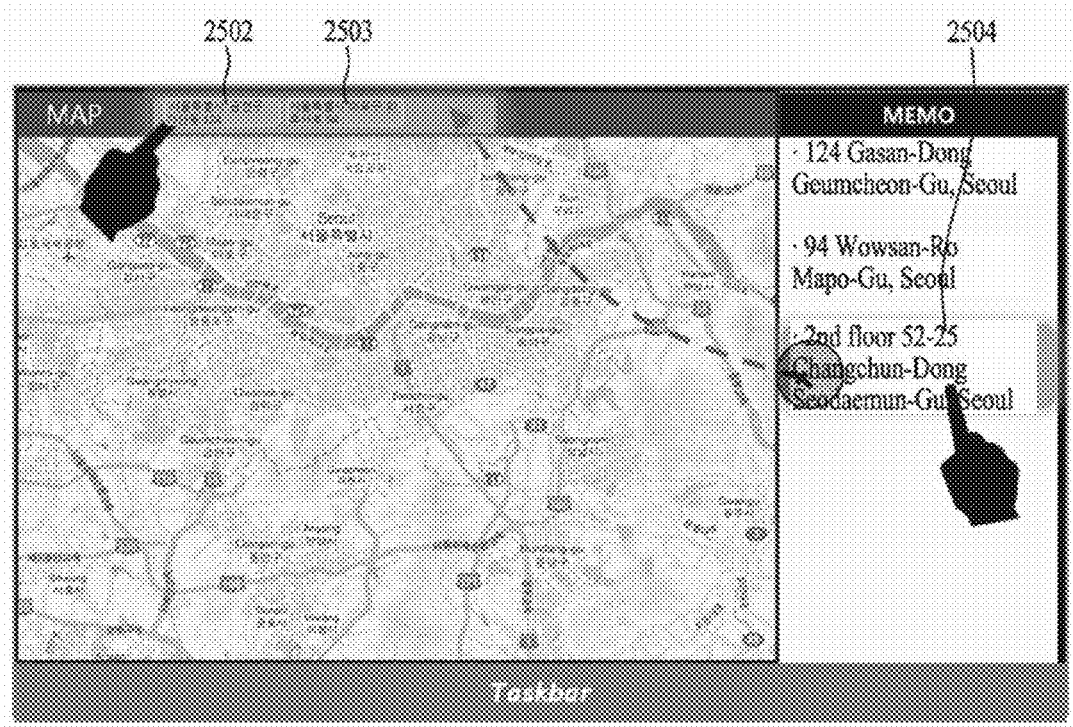
Figure 25E:
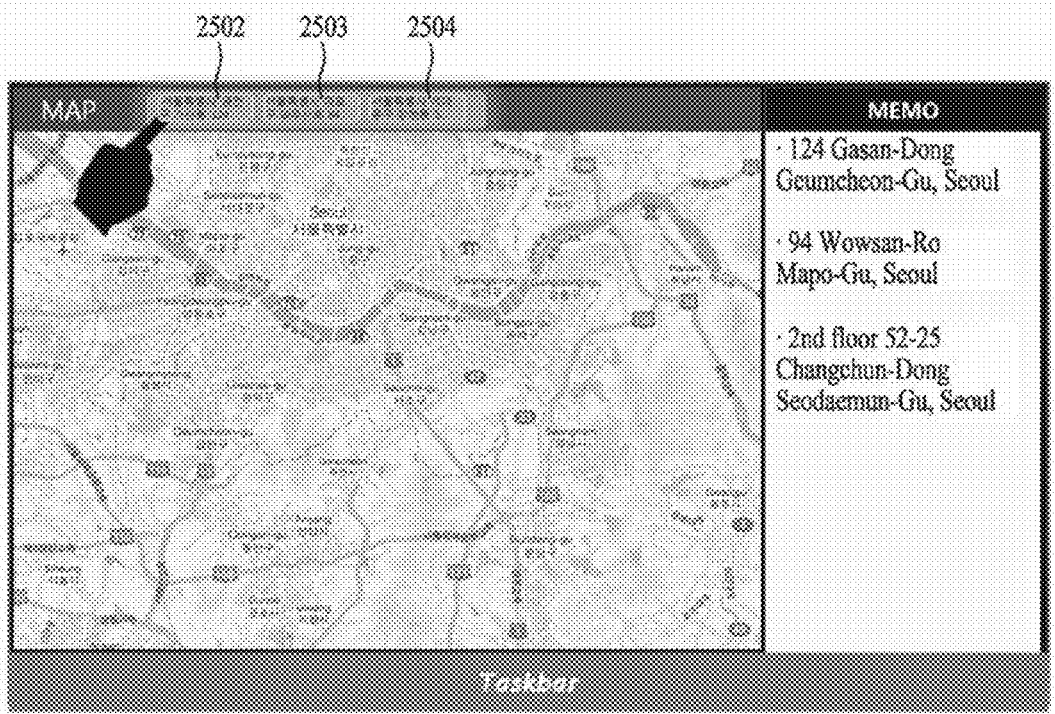

Referring to FIG. 25A, in case of receiving an input of a 1$^{st}$ touch action on a command region 2501 for an address search, the mobile terminal 100 may display an address list containing at least one or more searchable addresses on a prescribed region of a screen. Moreover, it may be requested that the 1$^{st}$ touch action may be maintained for predetermined duration.

In brief, if a 1$^{st}$ touch action is inputted to a command region for a specific function, the mobile terminal 100 may be able to display a plurality of objects usable for executing the specific function on a screen.

Of course, while the address list is displayed, the mobile terminal 100 may receive an input of a 1$^{st}$ touch action on the address search command region 2501.

Referring to FIGS. 25B to 25E, while the 1$^{st}$ touch action is maintained, the mobile terminal 100 may receive an input of a touch & drag action (i.e., example of 2$^{nd}$ touch action) starting with each of 1$^{st}$ to 3$^{rd}$ addresses 2502 to 2504 contained in the address list to the address search command region 2501 and may be then able to display the 1$^{st}$ to 3$^{rd}$ addresses 2502 to 2504 on the address search command region 2501.

Figure 25F:
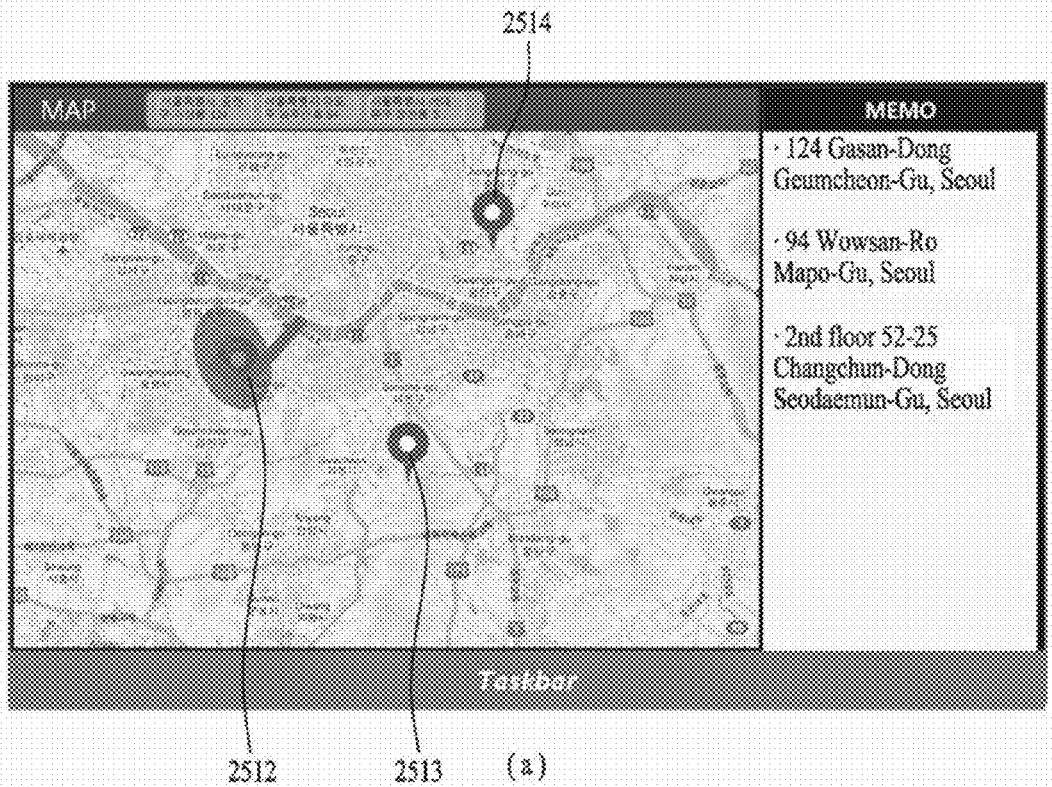
Figure 25F:
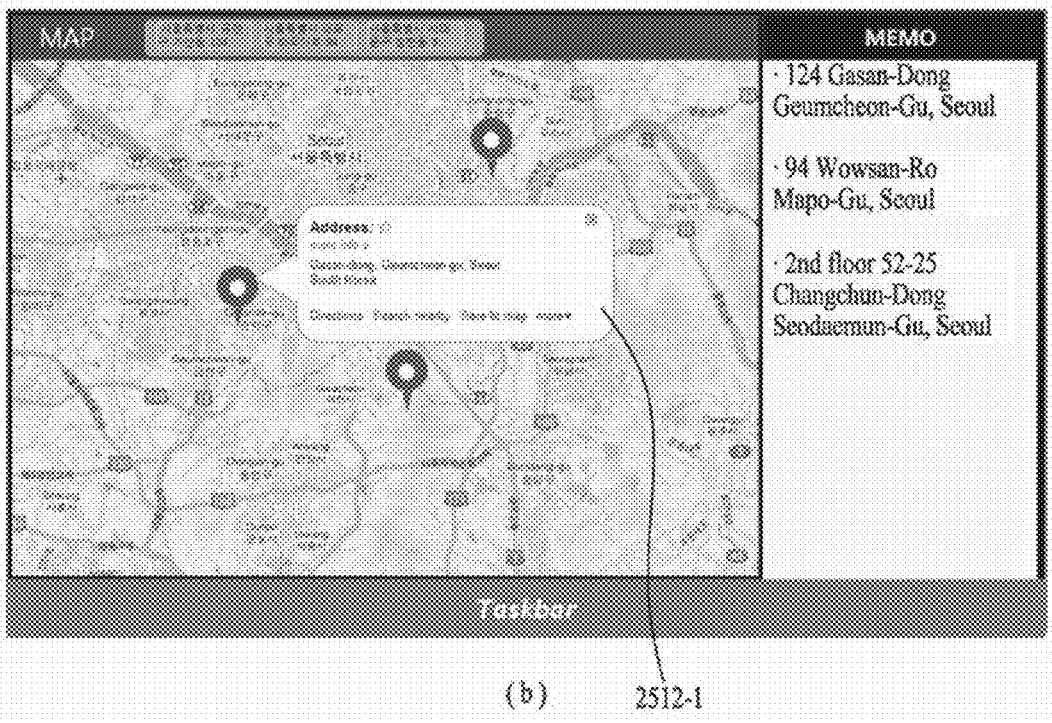

Referring to FIG. 25F, if the 1$^{st}$ touch action is removed, the mobile terminal 100 may search for a location of each of the 1$^{st}$ to 3$^{rd}$ addresses 2502 to 2504 and may be then able to display 1$^{st}$ to 3$^{rd}$ points 2512 to 2514 respectively corresponding to the found locations of the 1$^{st}$ to 3$^{rd}$ addresses 2502 to 2504 on a map image [FIG. 25F (a)]. If the 1$^{st}$ point 2512 is selected, the mobile terminal 100 may display a detail information 2512-1 on the selected 1$^{st}$ point 2512.

Figure 26A:
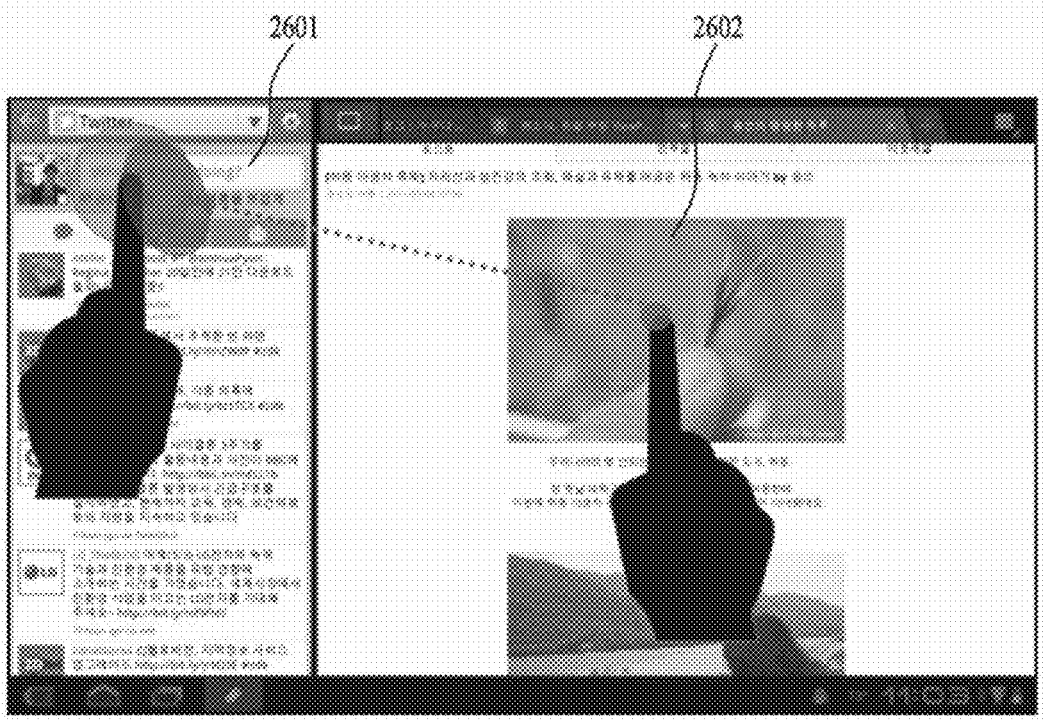
FIG. 26A and FIG. 26B are diagrams for displaying an image, which is selected if an input point of a $1^{st}$ touch action belongs to a command region for a data upload, while a web application is activated, according to the present invention.
Figure 26B:

FIG. 26A and FIG. 26B are diagrams for displaying an image, which is selected if an input point of a 1$^{st}$ touch action belongs to a command region for a data upload, while a web application is activated, according to the present invention.

Referring to FIG. 26A, the mobile terminal 100 may receive an input of a 1$^{st}$ touch action on a command region 2601 for a data upload. While the 1$^{st}$ touch action is maintained, the mobile terminal 100 may receive an input of a touch % drag action (i.e., example of 2$^{nd}$ touch action) starting with a specific image 2602 (i.e., example of specific object) displayed on a screen to the data upload command region 2601.

In doing so, the mobile terminal 100 may partition the screen into a plurality of regions including a 1$^{st}$ region and a 2$^{nd}$ region. The mobile terminal 100 may display a 1$^{st}$ webpage including the data upload command region 2601 on the 1$^{st}$ region and may display a 2$^{nd}$ web page containing the specific image 2602 on the 2$^{nd}$ region. In this case, the 1$^{st}$ webpage and the 2$^{nd}$ webpage may be provided by the same website or may be provided by different webpages, respectively.

While the 1$^{st}$ touch action is maintained, the mobile terminal 100 may receive an input of a touch action for changing a website or an input of a touch action for changing a website. The mobile terminal 100 may be then able to change a webpage or a website to correspond to the inputted touch action. This is to select specific object(s) from a plurality of webpages or websites.

Referring to FIG. 26B, if the 1$^{st}$ touch action is removed, the mobile terminal 100 may be able to upload the specific image 2602 to the corresponding website. Moreover, in case that the data upload command region 2601 is the region for commanding an upload to my blog, an upload to a blog of a counterpart or an upload to a twitter content, the mobile terminal 100 may be able to upload to the specific image 2602 correspondingly.

According to the present invention, the mobile terminal 100 may receive an input of a 1$^{st}$ touch action on a 1$^{st}$ object using a touchscreen. While the 1$^{st}$ touch action is maintained, the mobile terminal 100 may receive an input of a 2$^{nd}$ touch action for finding objects to compare to the 1$^{st}$ object using the touchscreen. In this case, the 1$^{st}$ object may include a reference object. And, the objects comparative to the 1$^{st}$ object may include comparative target objects.

This may be described in detail with reference to FIGS. 27A to 28C as follows.

FIGS. 27A to 28C are diagrams for receiving an input of a 2$^{nd}$ touch action for searching or selecting a comparative target object for a reference object selected by a 1$^{st}$ touch action according to the present invention.

Figure 27A:
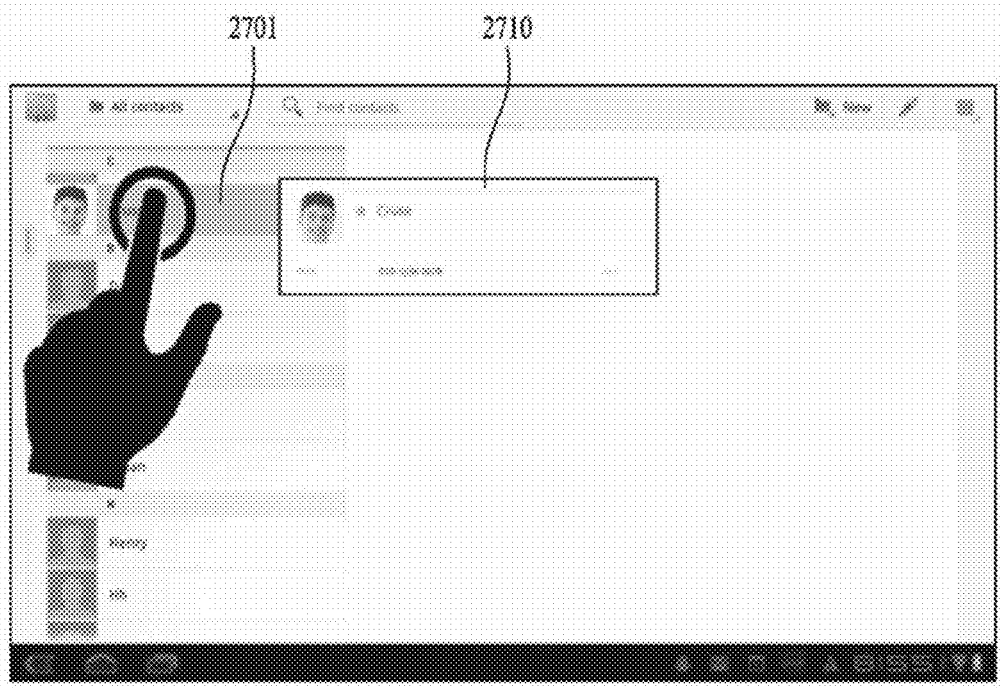
FIGS. 27A to 28C are diagrams for receiving an input of a $2^{nd}$ touch action for searching or selecting a comparative target object for a reference object selected by a $1^{st}$ touch action according to the present invention.
Figure 27A:
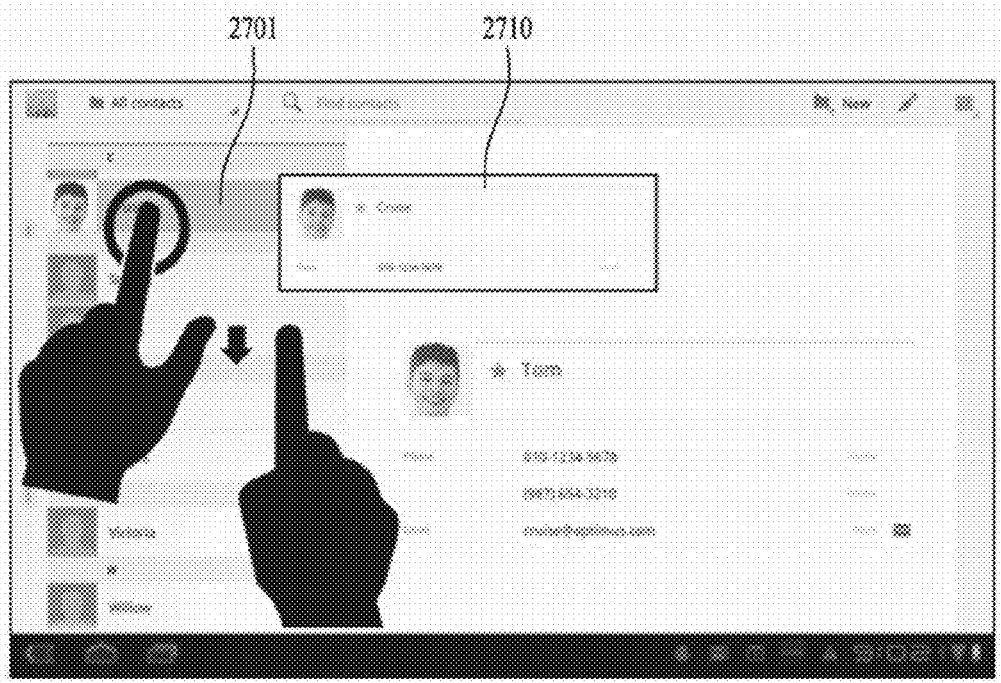
Figure 27B:
Figure 27B:

First of all, the following description is made with reference to FIG. 27A and FIG. 27B.

Referring to FIG. 27A, while a counterpart list containing counterpart informations is displayed, in case of receiving an input of a 1$^{st}$ touch action on a 1$^{st}$ counterpart information 2701, the mobile terminal 100 may display a content 2710 of the 1$^{st}$ counterpart information 2701 as a popup window [FIG. 27A (a)].

While the 1$^{st}$ touch action is maintained, the mobile terminal 100 may receive an input of a touch action (i.e., example of 2$^{nd}$ touch action) for scrolling the counterpart list and may be then able to scroll the counterpart list [FIG. 27A (b)]. In particular, if a specific counterpart information is selected, the mobile terminal 100 may display a content of the selected specific counterpart information on the screen and may compare the displayed content with the content of the 1$^{st}$ counterpart information 2701.

Referring to FIG. 27B, while a web browser is active, in case of receiving a 1$^{st}$ touch action on a 1$^{st}$ content 2702 displayed on the screen [FIG. 27B (a)], the mobile terminal 100 may display information available for navigation on a prescribed region of the screen and may then receive an input of a 2$^{nd}$ touch action to search the display information [FIG. 27B (b)]. Hence, while the 1$^{st}$ touch action is maintained, a user may be able to search informations to compare with the 1$^{st}$ content 2702. This may be useful when an original text is viewed in Facebook or Blog together with comments or reply messages or when a list of internet search result is created long.

Figure 28A:
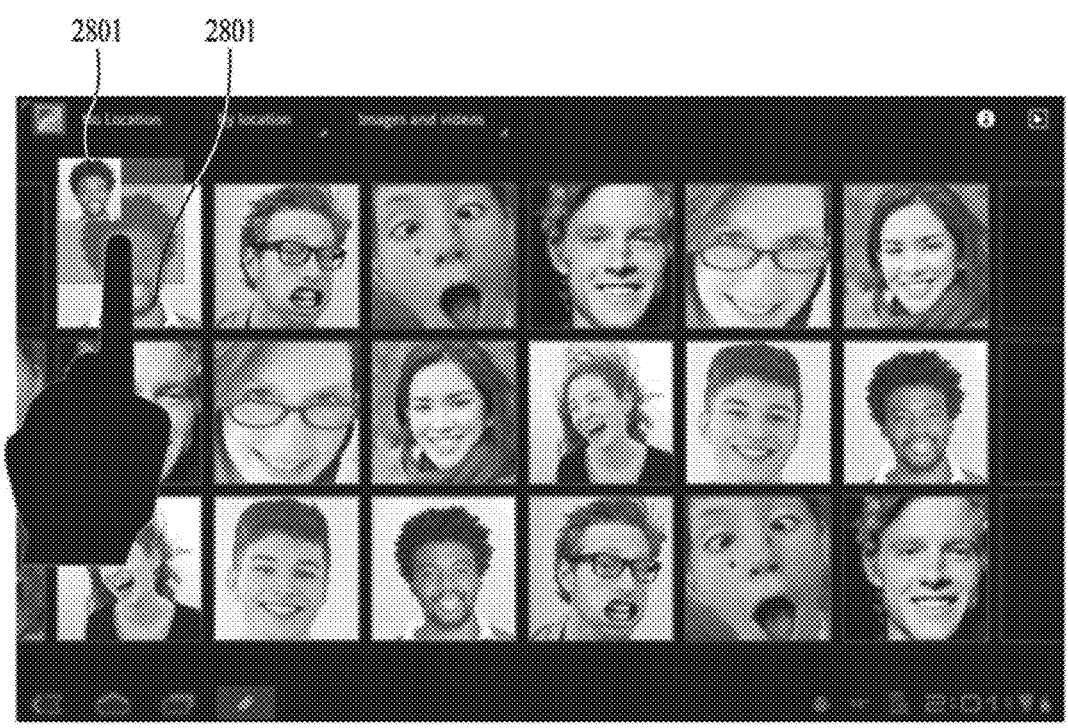
Figure 28B:
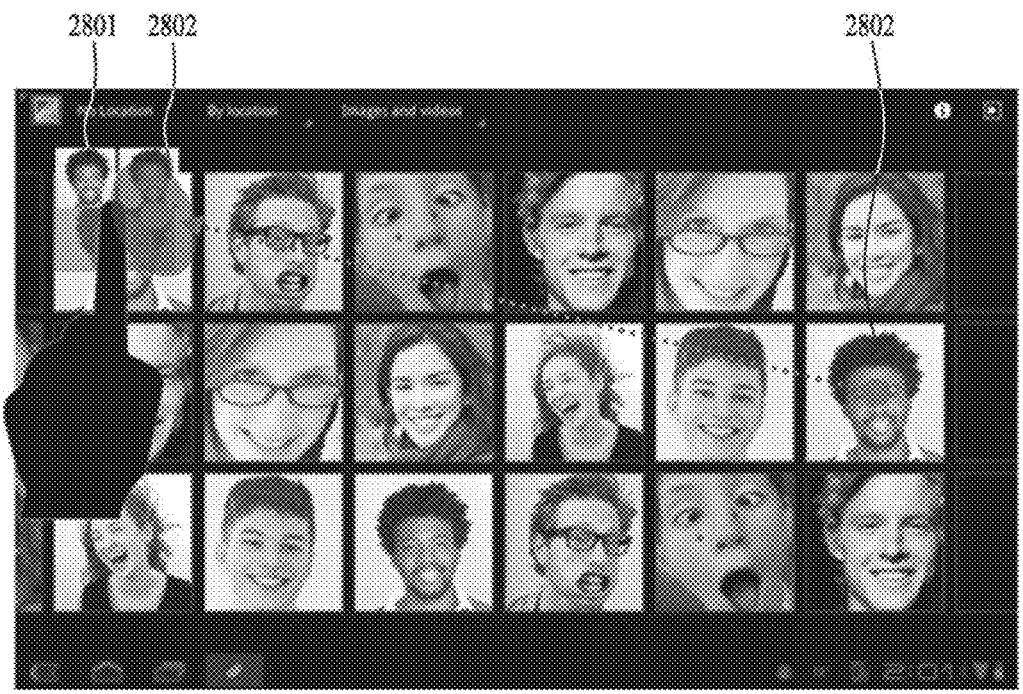
Figure 28B:
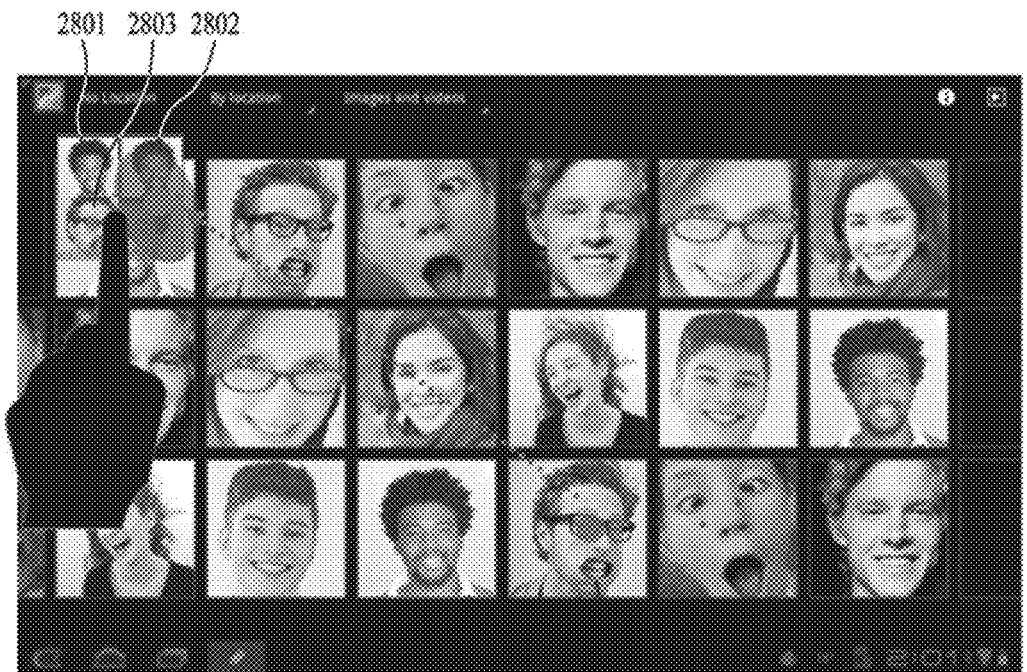
Figure 28C:

The following description is made with reference to FIGS. 28A to 28C.

Referring to FIG. 28A, while a plurality of images are displayed, in case of receiving a 1$^{st}$ touch action on a 1$^{st}$ image, the mobile terminal 100 may display the 1$^{st}$ image 2801 in a reduced size at the input point of the 1$^{st}$ touch action.

Referring to FIG. 28B, while the 1$^{st}$ touch action is maintained, the mobile terminal 100 may receive an input of a 2$^{nd}$ touch action for selecting a 2$^{nd}$ image 2802 and a 3$^{rd}$ image 2803. The mobile terminal 100 may be then able to display the 1$^{st}$ to 3$^{rd}$ images in a reduced size at the input point of the 1$^{st}$ touch action.

Referring to FIG. 28C, if the 1$^{st}$ touch action is removed, the mobile terminal 100 may display the 1$^{st}$ to 3$^{rd}$ images 2801 to 2803 on the screen. Hence, a user may be able to compare the 1$^{st}$ to 3$^{rd}$ images 2801 to 2803 with one another on one screen. Moreover, the user may be able to delete or edit a specific one of the 1$^{st}$ to 3$^{rd}$ images 2801 to 2803 at least.

According to one embodiment of the present invention, the above-described touch recognizing methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

Accordingly, the present invention provides the following effects and/or advantages.

First of all, a specific object selected by a 2$^{nd}$ touch action may be displayed on a specific region created by a 1$^{st}$ touch action. And, the displayed specific object may be temporarily saved. Therefore, a commanding for saving specific object(s) displayed on a plurality of pages may be conveniently inputted.

Secondly, I a 1$^{st}$ touch action is removed from a specific object displayed with reference to an input point of the 1$^{st}$ touch action, the present invention may perform folder creation of a display on a specific page.

Thirdly, in case that an input point of a 1$^{st}$ touch action belongs to a command region for a specific function, the present invention may perform the specific function using a specific object selected by a 2$^{nd}$ touch action.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
    displaying a first list of a plurality of media files on a touchscreen in response to execution of a media play application;
    receiving a first touch input via the touchscreen, the first touch input comprising a touch maintained at a first position of the touchscreen;
    displaying a first region on the touchscreen in response to the first touch input, wherein an area of the first region includes the first position and wherein display of the first region is maintained while the first touch input is maintained at the first position;
    receiving a second touch input on a media file of the first list while display of the first region is maintained, wherein the first list is displayed outside of the first region and the second touch input comprises a touch and drag of the media file into the first region;
    displaying a copy of the media file in the first region in response to the second touch input while maintaining display of the media file outside of the first region;
    creating a second list comprising the copy of the media file in the first region in response to the first touch input being released from the first position included in the first region;
    displaying the created second list on the touchscreen; and
    ceasing display of the first list of the plurality of media files while maintaining display of the created second list in response to the first touch input being no longer maintained.

2. The method of claim 1, further comprising:
    receiving a third touch input via the touchscreen while the first touch input is maintained;
    displaying a second region on the touchscreen in response to the third touch input.

3. The method of claim 1, further comprising creating a folder comprising the copy of the media file when the first touch input is no longer maintained.

4. The method of claim 1, further comprising performing a function using information associated with the copy of the media file when the first touch input is no longer maintained, wherein the location of the first touch input is associated with the function.

5. The method of claim 1, further comprising creating a folder comprising the copy of the media file when the first touch input is no longer maintained and displaying the folder.

6. The method of claim 1, further comprising grouping the copy of the media file with one or more media files displayed at the first position and storing information in a memory of the grouped media files when the first touch input is no longer maintained.

7. A mobile terminal, comprising:
    a touchscreen configured to display a first list of a plurality of media files in response to execution of a media play application; and
    a controller configured to:
    receive, via the touchscreen, a first touch input comprising a touch maintained at a first position of the touchscreen;
    cause the touchscreen to display a first region in response to the first touch input, wherein an area of the first region includes the first position and wherein display of the first region is maintained while the first touch input is maintained at the first position;
    receive, via the touchscreen, a second touch input on a media file of the first list while display of the first region is maintained, wherein the first list is displayed outside of the first region and the second touch input comprises a touch and drag of the media file into the first region;
    cause the touchscreen to display a copy of the media file in the first region in response to the second touch input while maintaining display of the media file outside of the first region;
    create a second list comprising the copy of the media file in the first region in response to the first touch input being released from the first position included in the first region;
    cause the touchscreen to display the created second list; and
    cause the touchscreen to cease display of the first list of the plurality of media files while maintaining display of the created second list in response to the first touch input being no longer maintained.

8. The mobile terminal of claim 7, wherein the controller is further configured to:
create a folder comprising the copy of the media file when the first touch input is no longer maintained; and
cause the touchscreen to display the folder.

9. The mobile terminal of claim 7, wherein the controller is further configured to cause the touchscreen to display a second region in response to a third touch input received while the first touch input is maintained.

10. The mobile terminal of claim 7, further comprising a memory, wherein the controller is further configured to:
group the copy of the media file with one or more media files displayed at the first position; and
cause the memory to store information of the grouped media files when the first touch input is no longer maintained.

11. The mobile terminal of claim 7, wherein the controller is further configured to cause the touchscreen to display the copy of the media file at a second location in response to a third touch input received at the second location while the copy of the media file is displayed at the location of the first touch input.

12. The mobile terminal of claim 7, wherein the controller is further configured to execute a function using information associated with the copy of the media file when the first touch input is no longer maintained, wherein the first position is associated with the function.

* * * * *